(12) United States Patent
McCauley et al.

(10) Patent No.: US 9,773,250 B2
(45) Date of Patent: Sep. 26, 2017

(54) PRODUCT ROLE ANALYSIS

(75) Inventors: Sean McCauley, Minneapolis, MN (US); Steve Colten, Reno, NV (US); Sean Kervin, Denver, CO (US); Paritosh Desai, Santa Clara, CA (US); Howard Yihzan Wu, Belmont, CA (US); Jason Lee Gunnink, Arlington, VA (US); Phil Delurgio, San Mateo, CA (US); Stephanie Taylor Delurgio, legal representative, San Mateo, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 766 days.

(21) Appl. No.: 12/773,826

(22) Filed: May 4, 2010

(65) Prior Publication Data

US 2010/0306031 A1    Dec. 2, 2010

(51) Int. Cl.
G06Q 10/00 (2012.01)
G06Q 30/02 (2012.01)

(52) U.S. Cl.
CPC ......... *G06Q 30/0201* (2013.01); *G06Q 30/02* (2013.01)

(58) Field of Classification Search
CPC .............................. G06Q 30/02; G06Q 10/063
(Continued)

(56) References Cited

U.S. PATENT DOCUMENTS 3,017,610 A    1/1962   Auerbach et al.
4,744,026 A    5/1988   Vanderbei
(Continued)

FOREIGN PATENT DOCUMENTS

WO    WO 97/46950    12/1997
WO    WO 98/53415    11/1998
(Continued)

OTHER PUBLICATIONS

Kim et al., "Modeling the Distribution of price Sensitivity and Implications for Optimal Retail Pricing", Journal of Business & Economic Statistics, Jul. 1995, vol. 13, No. 3., pp. 291-303.
(Continued)

*Primary Examiner* — Sun Li
(74) *Attorney, Agent, or Firm* — Rahan Uddin; Edell, Shapiro & Finnan, LLC

(57) ABSTRACT

The present invention relates to a system and method for analyzing product roles. The system receives a listing of products for classification into roles. The system receives volume data for each item, as well as demand coefficient. Elasticity of the products may be determined from the demand coefficients. Product volumes and elasticities may then be compared against one another by graphing the product by its volume versus elasticity. From this comparison the products may be classified into one or more roles. These roles include image items, niche products, assortment completers, and profit drivers. The assortment completer role is populated with products which have high relative elasticity and low relative volume. Niche product role is populated with products which have low relative elasticity and low relative volume. The image item role is populated with products which have high relative elasticity and high relative volume. And lastly, the profit driver role is populated with products which have low relative elasticity and high relative volume. This comparison may also include generating an "image value" for the product.

32 Claims, 48 Drawing Sheets

(58) Field of Classification Search
USPC ......... 705/10, 7.29, 7, 35, 1, 400, 14, 14.71, 705/7.31, 7.11; 703/2; 725/400
See application file for complete search history.

(56) References Cited

U.S. PATENT DOCUMENTS

| | | |
|---|---|---|
| 4,862,357 A | 8/1989 | Ahistrom et al. |
| 4,907,170 A | 3/1990 | Bhattacharya |
| 4,916,443 A | 4/1990 | Barrett et al. |
| 5,063,506 A | 11/1991 | Brockwell et al. |
| 5,117,354 A | 5/1992 | Long et al. |
| 5,189,606 A | 2/1993 | Burns et al. |
| 5,212,791 A | 5/1993 | Damian et al. |
| 5,249,120 A | 9/1993 | Foley |
| 5,299,115 A | 3/1994 | Fields et al. |
| 5,377,095 A | 12/1994 | Maeda et al. |
| 5,459,656 A | 10/1995 | Fields et al. |
| 5,521,813 A | 5/1996 | Fox et al. |
| 5,615,109 A | 3/1997 | Eder |
| 5,694,551 A | 12/1997 | Doyle et al. |
| 5,712,985 A | 1/1998 | Lee et al. |
| 5,732,401 A | 3/1998 | Conway |
| 5,765,143 A | 6/1998 | Sheldon et al. |
| 5,774,868 A | 6/1998 | Cragun et al. |
| 5,790,643 A | 8/1998 | Gordon et al. |
| 5,799,286 A | 8/1998 | Morgan et al. |
| 5,822,736 A | 10/1998 | Hartman et al. |
| 5,832,456 A | 11/1998 | Fox et al. |
| 5,832,458 A | 11/1998 | Jones |
| 5,873,069 A | 2/1999 | Reuhl et al. |
| 5,878,400 A | 3/1999 | Carter, III |
| 5,902,351 A | 5/1999 | Streit et al. |
| 5,918,209 A | 6/1999 | Campbell et al. |
| 5,933,813 A | 8/1999 | Teicher et al. |
| 5,987,425 A | 11/1999 | Hartman et al. |
| 6,009,407 A | 12/1999 | Garg |
| 6,009,415 A | 12/1999 | Shurling et al. |
| 6,025,686 A | 2/2000 | Wickert et al. |
| 6,029,139 A | 2/2000 | Cunningham et al. |
| 6,032,123 A | 2/2000 | Jameson |
| 6,032,125 A | 2/2000 | Ando |
| 6,044,357 A | 3/2000 | Garg |
| 6,052,686 A | 4/2000 | Fernandez et al. |
| 6,078,893 A | 6/2000 | Ouimet et al. |
| 6,094,641 A | 7/2000 | Ouimet et al. |
| 6,125,355 A | 9/2000 | Bekaert et al. |
| 6,134,534 A | 10/2000 | Walker et al. |
| 6,173,345 B1 | 1/2001 | Stevens |
| 6,202,070 B1 | 3/2001 | Nguyen et al. |
| 6,205,431 B1 | 3/2001 | Willemain et al. |
| 6,219,649 B1 | 4/2001 | Jameson |
| 6,308,162 B1 | 10/2001 | Ouimet et al. |
| 6,321,207 B1 | 11/2001 | Ye |
| 6,341,268 B2 | 1/2002 | Walker et al. |
| 6,341,269 B1 | 1/2002 | Dulaney et al. |
| 6,378,066 B1 | 4/2002 | Lewis |
| 6,397,193 B1 | 5/2002 | Walker et al. |
| 6,405,175 B1 | 6/2002 | Ng |
| 6,430,539 B1 | 8/2002 | Lazarus et al. |
| 6,456,986 B1 | 9/2002 | Boardman et al. |
| 6,536,935 B2 | 3/2003 | Parunak et al. |
| 6,546,387 B1 | 4/2003 | Triggs |
| 6,553,352 B2 | 4/2003 | Delurgio et al. |
| 6,567,824 B2 | 5/2003 | Fox |
| 6,609,101 B1 | 8/2003 | Landvater et al. |
| 6,684,193 B1 | 1/2004 | Chavez et al. |
| 6,697,824 B1 | 2/2004 | Bowman-Amuah |
| 6,725,208 B1 | 4/2004 | Hartman et al. |
| 6,731,998 B2 | 5/2004 | Walser et al. |
| 6,735,572 B2 | 5/2004 | Landesmann |
| 6,745,184 B1 | 6/2004 | Choi et al. |
| 6,826,538 B1 | 11/2004 | Kalyan et al. |
| 6,910,017 B1 | 6/2005 | Woo et al. |
| 6,934,931 B2 | 8/2005 | Plumer et al. |
| 6,965,867 B1 | 11/2005 | Jameson |
| 6,988,076 B2 | 1/2006 | Ouimet |
| 7,058,617 B1 | 6/2006 | Hartman et al. |
| 7,062,447 B1 | 6/2006 | Valentine et al. |
| 7,072,848 B2 | 7/2006 | Boyd et al. |
| 7,092,929 B1 | 8/2006 | Dvorak et al. |
| 7,155,402 B1* | 12/2006 | Dvorak ..................... 705/14.41 |
| 7,302,410 B1 | 11/2007 | Venkatraman et al. |
| 7,523,047 B1 | 4/2009 | Neal et al. |
| 7,899,691 B1 | 3/2011 | Lee et al. |
| 2001/0014868 A1 | 8/2001 | Herz et al. |
| 2002/0023001 A1 | 2/2002 | McFarlin et al. |
| 2002/0042739 A1 | 4/2002 | Srinivasan et al. |
| 2002/0042755 A1 | 4/2002 | Kumar et al. |
| 2002/0107819 A1 | 8/2002 | Ouimet |
| 2002/0116348 A1* | 8/2002 | Phillips et al. ............... 705/400 |
| 2002/0123930 A1 | 9/2002 | Boyd et al. |
| 2002/0169657 A1 | 11/2002 | Singh et al. |
| 2002/0198794 A1 | 12/2002 | Williams et al. |
| 2003/0028437 A1 | 2/2003 | Grant et al. |
| 2003/0177103 A1 | 9/2003 | Ivanov et al. |
| 2003/0200185 A1 | 10/2003 | Huerta et al. |
| 2003/0220830 A1 | 11/2003 | Myr |
| 2003/0229502 A1 | 12/2003 | Woo |
| 2004/0111358 A1 | 6/2004 | Lange et al. |
| 2004/0243432 A1 | 12/2004 | Kelly et al. |
| 2005/0096963 A1 | 5/2005 | Myr et al. |
| 2005/0108070 A1 | 5/2005 | Kelly et al. |
| 2005/0197897 A1 | 9/2005 | Veit et al. |
| 2005/0197941 A1 | 9/2005 | Veit |
| 2006/0026161 A1 | 2/2006 | Henseler |
| 2006/0047608 A1* | 3/2006 | Davis et al. .................. 705/400 |
| 2006/0161504 A1 | 7/2006 | Walser et al. |
| 2006/0224534 A1 | 10/2006 | Hartman et al. |
| 2008/0086429 A1 | 4/2008 | Venkatraman et al. |

FOREIGN PATENT DOCUMENTS

| | | |
|---|---|---|
| WO | WO 00/70519 | 11/2000 |
| WO | WO 00/70556 | 11/2000 |

OTHER PUBLICATIONS

Written Opinion of the International Searching Authority, PCT/US2009/056578, dated Dec. 22, 2009, 4 pages.
"Net Perceptions: Cascade", by Net Perceptions, Inc. 2003, 82 pages.
"Webster's New World Dictionary", 2nd College Edition, p. 721, The World Publishing Company, 1972.
Eileen Bridges et al., "A High-Tech Product Market Share Model with Customer Expectations 11", Marketing Science, vol. 14, No. 1, Winter 1995, pp. 61-81.
Byung-Do Kim et al., Modeling the Distribution of Price Sensitivity and Implications for Optimal Retail Pricing, Journal of Business & Economic Statistics, Jul. 1995, vol. 13, No. 3.
"Net Perceptions: Cascade" by Net Perceptions, Inc., 2003; pp. 1-80.
"Written Opinion of the International Searching Authority", Application No. PCT/US09/56578, dated Dec. 22, 2009.
Diebold, Francis X., "The Past, Present, and Future of Macroeconomic Forecasting" Economic Perspectives (IJEP), vol. 12, No. 2, pp. 175-192, Spring 1998.
Montgomery: "The Impact of Micro-Marketing on Pricing Strategies", 1994 The University of Chicago vol. 55/12-A of Dissertation of Abstracts International, p. 3922 (Abstract Only).
Busch: "Cost Modeling as a Technical Management Tool", Research-Technology Management, Nov./Dec. 1994, vol. 37, No. 6, pp. 50-56.
Deighton, John, et al., "The Effects of Advertising on Brand Switching and Repeat Purchasing", Journal of Marketing Research, vol. XXXI, Feb. 1994, pp. 28-43.
Kadiyali et al., "Manufacturer-retailer Channel Interactions and Implications for channel Power: An Investigation of Pricing in Local Market", Marketing Science, Spring 2000, V. 19, Issue 2.
Andrew B. Gelman et al., "Bayesian Data Analysis", pp. 439-455, Chapman & Hall/CRC, First Edition 1995, Reprinted 2000.

(56) References Cited

OTHER PUBLICATIONS

Hillier, Frederick S., et al., "Introduction to Operations Research", McGraw-Hill, Inc., 1995, Sixth Edition, pp. 1-14.
"KhiMetrics Helps Retailers Increase Margins with Two New Tools for Their Retail Revenue Management Application Suite." PR Newswire, Mar. 1, 2001.
"KhiMetrics and Retek Form Marketing Alliance for Comprehensive Retail Pricing Solution." PR Newswire, Feb. 19, 2001.
Barth, Brad. "ShopKo Holds the Price Line." Daily News Record, p. 10, Oct. 4, 2000.
"Manugistics Agrees to Acquire Talus Solutions." PR Newswire, Sep. 21, 2000.
"Goodyear Implements Trilogy's MultiChannel Pricing Solution as Its Enterprise-Wide E-Pricer Platform." Business Wire, p. 2286, Jun. 27, 2000.
"IMRglobal Signs New Product Implementation Agreement with Retek to Improve Retail Pricing and Markdown Process." Business Wire, p. 1590, Jun. 7, 2000.
"New Tools for Modeling Elasticity, Optimizing Prices and Collecting Live Pricing from the Web to Debut at Retail Systems 2000 in Chicago." Business Wire, p. 1484, Apr. 18, 2000.
Smith et al., "A Discrete Optimization Model for Seasonal Merchandise Planning." Journal of Retailing, vol. 74, No. 2, p. 193(29), Summer 1998.
Barth, Brad, "Shopko Tests Automated Markdowns", WWD Oct. 4, 2000, pp. 1-3.
Cook, Martie, "Optimizing Space and Sales with Markdown Software", Office.com, May 31, 2000, p. 1.
"Essentus and Spotlight Solutions Partnership Delivers Precise Markdown Decisions", Business Wire, Apr. 17, 2000, 3 pages.
Melcer, Rachel, "Local Tech Firm Creates Retail Markdown Tool", Business Courier online, Mar. 24, 2000, pp. 1-4.
Technology Strategy Incorporated, www.grossprofit.com, Mar. 2, 2000, pp. 1-20.
Flanagan, David, "Javascript: The Definitive Guide, 3$^{rd}$ Edition," published by O'Reilly in Jun. 1998 (ISBN 1-56592-392-8) section 14.8.
Berners-Lee, T., "Hypertext Markup Language 2.0 Working Paper," Nov. 1995 (pp. 1-3).
Tellis, Gerard J., and Fred S. Zufryden, "Tackling the Retailer Decision Maze: Which Brands to Discount, How Much, When and Why," Marketing Science, vol. 1, No. 34, 1995 (pp. 271-299).
Abraham, Magid M. and Leonard M. Lodish, "Promoter: An Automated Promotion Evaluation System," Marketing Science, vol. 6, No. 2, 1987 (p. 101-123).
Little, John D. C., "Brandaid: A Marketing-Mix Model, Part 1: Structure," Operations Research, vol. 23, No. 4, Jul.-Aug. 1975 (p. 628-655).
Cerf, Vinton G. and Robert E. Kahn, "A Protocol for Packet Network Interconnection," IEEE Transactions on Communications COM-22, May 1974, (p. 637-648).
Scherage, Dan, "You Do the Math", Chain Store Age, v76, n7, Jul. 2000.
"Gymboree Enhances Price Management", Retail Systems Alert, vol. 13, No. 6, Jun. 2000.
Binkley, James K., and John M. Connor, "Grocery Market Pricing and the New Competitive Environment." Journal of Retailing, v74, n2, Summer 1998.
"Merriam Webster's Collegiate Dictionary", 10$^{th}$ edition, p. 585, Merriam-Webster Incorporated, 1999.
Hernandez, Mauricio A., and Salvatore J. Stolfo, "Real-world Data is Dirty: Data Cleansing and the Merge/Purge Problem", Data Mining and Knowledge Discovery, vol. 2, Issue 1, Jan. 1998.
A.F.M. Smith, "A General Bayesian Linear Model," University of Oxford, Apr. 1972.
Alan L. Montgomery and Peter R. Rossi, "Estimating Price Elasticities with Theory-Based Priors," Journal of Marketing Research vol. XXXVI, Nov. 1999 (pp. 413-423).
Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).
Alan L. Montgomery, "Creating Micro-Marketing Pricing Strategies Using Supermarket Scanner Data," Marketing Science, vol. 16, No. 4, 1997 (pp. 315-337).
Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp. 304-315).
Arnold Zellner, "On Assessing Prior Distributions and Bayesian Regression Analysis With G-Prior Distributions," Elsevier Science Publishers, 1986 (pp. 233-243).
D. V. Lindley and A.F.M. Smith, "Bayes Estimates for the Linear Model," University College, Dec. 1971.
George C. Tiao and Arnold Zellner, "On the Bayesian Estimation of Multivariate Regression," University of Wisconsin, Jan. 1964.
Arnold Zellner, "An Efficient Method of Estimating Seemingly Unrelated Regressions and Tests for Aggregation Bias," University of Wisconsin, Jun. 1962.
"PCT International Search Report", Application No. PCT/US03/30488, dated Jan. 28, 2004.
"PCT International Search Report", Application No. PCT/US02/14977, dated May 5, 2003.
Dyer, Robert F., et al., "Case Studies in Marketing Decisions Using Expert Choice" Decision Support Software, 1988, pp. 2-7, 73-108.
"PCT International Search Report", Application No. PCT/US02/36710, dated Jul. 21, 2003.
Yoeman, John Cornelius, Jr. "The Optimal Offering Price for Underwritten Securities", vol. 55/01-A of Dissertation Abstracts International, p. 4743; 1993 (Abstract only).
"Pacificorp IRP: Renewables Costs Must Drop 65% to Be Competitive with Gas" McGraw-Hill Publications, Dec. 8, 1995.
"Report of Novelty Search" by Patentec, dated Feb. 9, 2001.
Rossi, Delurgio, & Kantor; "Making Sense of Scanner Data;" Harvard Business Review, Reprint F00205, 2000.
Bucklin & Gupta, "Brand Choice, Purchase Incidence, and Segmentation: An Integrated Modeling Approach," Journal of Marketing Research, May 1992, pp. 201-215, vol. XXIX.
Smith, Mathur, & Kohn; "Bayesian Semiparametric Regression: An Exposition and Application to Print Advertising;" Jan. 3, 1997; Australian Graduate School of Management, University of New South Wales, Sydney 2052, Australia.
Blattberg and Deighton, "Manage Marketing by the Customer Equity;" Harvard Business Review, Jul.-Aug. 1996, pp. 136-144.
Christen, Gupta, Porter, Staelin & Wittink; "Using Market-Level Data to Understand the Effectiveness of Promotional Activities;" Dec. 22, 1995.
Link, Ross; "Are Aggregate Scanner Data Models Biased?" Journal of Advertising Research, Sep./Oct. 1995, pp. RC8-RC12, ARF.
Russell & Kamakura, "Understanding Brand Competition Using Micro and Macro Scanner Data," Journal of Marketing Research, vol. XXXI (May 1994), pp. 289-303.
Jones, John Philip, "The Double Jeopardy of Sales Promotions," Harvard Business Review, Sep.-Oct. 1999, pp. 145-152.
Supplementary European Search Report, Application No. 02719197.2-2221, dated Feb. 2, 2007.
Buzzell, Quelch, and Salmon, "The Costly Bargain of Trade Promotion;" Harvard Business Review, reprint 90201, Mar.-Apr. 1990, pp. 1-9.
Curry, Divakar, Mathur, and Whiteman; "BVAR as a Category Management Tool: An Illustration and Comparison with Alternative Techniques;" Journal of Forecasting, vol. 14, Issue No. 3 (1995), pp. 181-199.
"Report of Novelty Search" by Patentec, dated Jul. 25, 2001.
Stephen J. Hoch et al., "Store Brands and Category Management", The Wharton School, University of Pennsylvania, Mar. 1998, pp. 1-38.
Bruce G.S. Hardie et al., "Attribute-based Market Share Models: Methodological Development and Managerial Applications", The Wharton School, University of Pennsylvania, Working Paper 98-009, pp. 1-48, 1998.
Alan Mercer, "Non-linear Price Effects", Journal of the Market Research Society, dated Jul. 1, 1996, p. 227.

(56) References Cited

OTHER PUBLICATIONS

Rockney G. Walters, "Assessing the Impact of Retail Price Promotions on Product Substitution, Complementary Purchase, and Interstore Sales Displacements", Journal of Marketing, vol. 55, Apr. 1991, pp. 17-28.
Robert C. Blattberg et al., "How Promotions Work", Marketing Science, vol. 14. No. 3, Part 2 of 2, 1995, pp. G122-G132.
Peter M. Guadagni et al., "A Logit Model of Brand Choice Calibrated on Scanner Data", Marketing Science, vol. 2, No. 3, Summer 1983, pp. 203-238.
Lee G. Cooper et al., "Standardizing Variables in Multiplicative Choice Models", Journal of Consumer Research, vol. 10, Jun. 1983, pp. 96-108.
Richard R. Batsell, et al., "A New Class of Market Share Models", Marketing Science, vol. 4, No. 3, Summer 1985, pp. 177-198.
Jagmohan S. Raju, "The Effect of Price Promotions on Variability in Product Category Sales", Marketing Science, vol. 11, No. 3, Summer 1992, pp. 207-220.
Robert J. Dolan, "How Do You Know When the Price is Right?", Harvard Business Review, Sep.-Oct. 1995, pp. 4-11.
Fusun Gonul, "Modeling Multiple Sources of Heterogeneity in Multinomial Logit Models: Methodological and Managerial Issues", Marketing Science, vol. 12, No. 3, Summer 1993, pp. 213-229.
Robert M. Schindler et al., "Increasing Consumer Sales Response Through Use of 99-Ending Prices", Journal of Retailing, Jun. 1, 1996, p. 187.
Francis J. Mulhern et al., "The Relationship between Retail Price Promotions and Regular Price Purchases", Journal of Marketing Research, vol. XXXI, Feb. 1994, pp. 28-43.
Sunil Gupta, "Reflections on 'Impact of Sales Promotions on When, What, and How Much to Buy'", Journal of Marketing Research, vol. XXX, Nov. 1993, pp. 522-524.
Richard A. Briesch, "Does It Matter How Price Promotions Are Operationalized?", Marketing Letters 8:2 (1997), pp. 167-181.
William R. Dillon et al., "A Segment-level Model of Category Volume and Brand Choice", Marketing Science, vol. 15, No. 1, 1996, pp. 38-59.
Stephen J. Hoch et al., Determinants of Store-Level Price Elasticity, Journal of Marketing Research, vol. XXXII (Feb. 1995), pp. 17-29.
Magid M. Abraham et al., "An Implemented System for Improving Promotion Productivity Using Store Scanner Data", Marketing Science, vol. 12, No. 3, Summer 1993.
Peter S. Fader et al., "Modeling Consumer Choice Among SKUs", Journal of Marketing Research, vol. XXXIII (Nov. 1996), pp. 442-452.
PCT International Search Report & the Written Opinion of the International Searching Authority, Application No. PCT/US07/20678, dated Feb. 26, 2008.

* cited by examiner

| ID | Description | Category | Overall (All Zones) | Zone 1 | Zone 2 | Zone 3 | Zone 4 |
|---|---|---|---|---|---|---|---|
| IT031 | Product 1 | Category 2 | 28.10 | 32.44 | 20.90 | 28.98 | 43.98 |
| IT032 | Product 2 | Category 2 | 26.55 | 25.54 | 30.28 | 29.68 | 24.36 |
| IT033 | Product 3 | Category 2 | 17.98 | 9.74 | 18.30 | 32.17 | 12.97 |
| IT034 | Product 4 | Category 2 | 7.57 | 4.77 | 8.46 | 11.28 | 10.47 |
| IT035 | Product 5 | Category 2 | 6.83 | 8.06 | 2.89 | 1.07 | 8.81 |
| IT036 | Product 6 | Category 2 | 6.36 | 6.79 | 8.19 | 1.62 | 4.30 |
| IT037 | Product 7 | Category 2 | 6.04 | 5.80 | 6.02 | 1.02 | 7.25 |
| IT038 | Product 8 | Category 3 | 4.79 | 3.62 | 3.39 | 3.44 | 4.02 |
| IT039 | Product 9 | Category 2 | 4.24 | 1.54 | 3.71 | 8.96 | 3.34 |
| IT040 | Product 10 | Category 2 | 4.23 | 4.79 | 0.89 | 9.88 | 7.53 |
| IT041 | Product 11 | Category 3 | 3.66 | 4.51 | 1.08 | 5.06 | 0.89 |
| IT042 | Product 12 | Category 2 | 3.52 | 0.98 | 3.45 | 3.29 | 1.86 |
| IT043 | Product 13 | Category 2 | 2.71 | 0.56 | 4.86 | 2.65 | 1.07 |
| IT044 | Product 14 | Category 2 | 2.14 | 3.69 | 3.51 | 0.33 | 1.72 |
| IT045 | Product 15 | Category 2 | 2.05 | 1.30 | 1.41 | 2.63 | 1.24 |
| IT046 | Product 16 | Category 3 | 1.62 | 1.88 | 1.25 | | 0.74 |
| IT047 | Product 17 | Category 2 | 1.57 | 0.93 | 0.77 | | 2.16 |
| IT048 | Product 18 | Category 3 | 1.55 | 0.40 | 0.98 | 5.36 | 0.43 |
| IT049 | Product 19 | Category 2 | 1.54 | 1.77 | 2.33 | 0.96 | 1.16 |
| | | Category 2 | 1.44 | | 1.99 | | 0.78 |
| | | Category 2 | 1.42 | 2.31 | 0.05 | 3.22 | 0.21 |

FIG. 38

| ID | Description | Category | Overall (All Segments) | Budget Families | Golden Oldies | Rural | Young Singles |
|---|---|---|---|---|---|---|---|
| IT031 | Product 1 | RTE Cereal | 28.10 | 32.44 | 20.90 | 28.98 | 43.58 |
| IT032 | Product 2 | RTE Cereal | 26.55 | 25.54 | 30.28 | 29.68 | 24.36 |
| IT033 | Product 3 | RTE Cereal | 17.96 | 9.74 | 16.30 | 32.17 | 12.97 |
| IT034 | Product 4 | RTE Cereal | 7.57 | 4.77 | 8.46 | 11.28 | 10.47 |
| IT035 | Product 5 | RTE Cereal | 6.63 | 8.06 | 2.89 | 1.07 | 8.81 |
| IT036 | Product 6 | RTE Cereal | 6.36 | 6.79 | 8.19 | 1.62 | 4.80 |
| IT037 | Product 7 | RTE Cereal | 6.04 | 5.80 | 6.02 | 1.02 | 7.25 |
| IT038 | Product 8 | RTE Cereal | 4.79 | 3.62 | 3.39 | 3.44 | 4.02 |
| IT039 | Product 9 | RTE Cereal | 4.24 | 1.54 | 3.71 | 8.90 | 3.34 |
| IT040 | Product 10 | RTE Cereal | 4.23 | 1.54 | 0.89 | 9.89 | 7.53 |
| IT041 | Product 11 | RTE Cereal | 3.86 | 4.79 | 1.08 | 5.06 | 0.89 |
| IT042 | Product 12 | RTE Cereal | 3.52 | 4.51 | 3.45 | 3.29 | 1.86 |
| IT043 | Product 13 | RTE Cereal | 2.71 | 0.98 | 4.86 | 2.65 | 1.07 |
| IT044 | Product 14 | RTE Cereal | 2.14 | 0.56 | 3.51 | 0.33 | 1.72 |
| IT045 | Product 15 | RTE Cereal | 2.06 | 3.69 | 1.41 | 2.68 | 1.24 |
| IT046 | Product 16 | RTE Cereal | 1.62 | 1.30 | 1.25 | 5.36 | 0.74 |
| IT047 | Product 17 | RTE Cereal | 1.57 | 1.88 | 0.77 | | 2.16 |
| IT048 | Product 18 | RTE Cereal | 1.55 | 0.93 | 0.98 | 0.96 | 0.43 |
| IT049 | Product 19 | RTE Cereal | 1.52 | 0.40 | 2.33 | 3.22 | 1.16 |
| | | RTE Cereal | 1.44 | 1.77 | 1.99 | | 0.78 |
| | | RTE Cereal | 1.42 | 2.31 | 0.05 | | 0.21 |

Category: RTE Cereal  
Zone: All Zones  
Hierarchy: Item

Image Strength Legend:
- High Image Strength
- Medium Image Strength
- Low Image Strength
- Not an Image Item

IMAGE STRENGTH BY SEGMENTS

FIG. 41

PRODUCT ROLE ANALYSIS

CROSS REFERENCE TO RELATED APPLICATIONS

This application includes subject matter related to the general area of U.S. application Ser. No. 09/741,956 filed on Dec. 20, 2000, entitled "Econometric Engine", now U.S. Pat. No. 7,899,691, which is hereby fully incorporated by reference.

This application also includes subject matter related to the general area of U.S. application Ser. No. 11/365,634 filed on Feb. 28, 2006, entitled "Computer Architecture", which is hereby fully incorporated by reference.

This application also includes subject matter related to the general area of U.S. application Ser. No. 12/208,342 filed on Sep. 11, 2008, entitled "Pricing Markdown with Model Refresh and Reoptimization", which is hereby fully incorporated by reference.

BACKGROUND

The present invention relates to a system and methods for a business tool for analyzing the role of products in a retail setting for improving the understanding of consumer perception of products. This business tool may be stand alone, or may be integrated into a pricing optimization system to provide more effective pricing of products. More particularly, the present category role analyzer system may identify products, or product categories, belonging to classes of products. These classes or "roles" include image categories, assortment completers, niche products and profit drivers. Each of these defined roles may be characterized as a function of relative elasticity of the product and relative sales volume of the product. From these generated product/category roles the system may generate further business decisions such as price optimizations, product assortments and promotion decisions. Additionally, products identified as image items may be readily compared to competitor's pricing to facilitate favorable consumer perception of pricing for the client store.

For a business to properly and profitably function there must be proper pricing of the inventory which, over a sustained period, effectively generates more revenue than costs incurred. In order to reach a profitable condition the business is always striving to increase revenue while reducing costs. Further, the perception of end consumers may likewise dictate how much patronage the business gets.

One such method to increase revenue is providing a desirable set of products and properly pricing these products or services being sold. This includes identifying "high visibility" items and pricing them accordingly. Additionally, the use of promotions may generate increased sales which aid in the generation of revenue. Likewise, costs may be decreased by ensuring that only required inventory is shipped and stored. Also, reducing promotion activity reduces costs. Thus, in many instances, there is a balancing between a business activity's costs and the additional revenue generated by said activity. The key to a successful business is choosing the best activities which maximize the profits of the business. Thus, an image item may be sold at a net loss for the business in efforts to draw in larger numbers of customers. However, this strategy relies upon accurately identifying the image items. Selling items which are not image items at a loss leads to very little additional patronage, as well as the loss incurred by the sale of the product.

Choosing these profit maximizing activities is not always a clear decision. There may be no readily identifiable result to a particular activity. Other times, the profit response to a particular promotion may be counter intuitive. Thus, generating systems and methods for identifying and generating business activities which achieves a desired business result is a prized and elusive goal.

A number of business decision suites are available to facilitate product inventory, pricing and promotional activity. In these known systems, product demand and elasticity may be modeled to project sales at a given price. The most advanced models include cross elasticity between sales of various products. While these methods of generating prices and promotions may be of great use to a particular business, there are a number of problems with these systems. Particularly, there has not previously been any mechanism for accurately and reliably identifying product roles.

For example, in the past, experienced retailers identified "Key Value Items" (KVIs) using intuition and experience in the retailing industry. These key value items are functionally equivalent to image items. These are items of high volume and subject to large shifts in sales with changes in pricing (high elasticity). KVIs/image items may likewise be referred to as a "loss leader" or "leader".

Some items are well established image items, such as milk; but with changing consumer purchasing behavior and changes in available products and product assortments, it is difficult for retailers to identify changes and new image items.

Image items may be identified by extreme experimentation, but this typically requires reducing the price of the tested item below profitable levels. For most businesses this experimentation is too risky to undergo. Thus, an improved and accurate method of identifying image items is needed. Further, although typically ignored by many businesses, other product roles exist beyond image items. By being able to identify these other item roles, product pricing and promotion activity could be further improved.

It is therefore apparent that an urgent need exists for a system and method of generating accurate and reliable sets of item and category roles. This role analyzer system may identify and classify items into roles for comparison purposes. When coupled to a pricing optimization system, the role analyzer system may generate pricing and promotions for the given products more efficiently. This role analyzer system provides businesses with an advanced competitive tool to greatly increase business profitability.

SUMMARY

To achieve the foregoing and in accordance with the present invention, a system and method for analyzing product roles is provided. In particular, the system and methods receives a listing of products for classification into roles. Roles include: image items, niche products, assortment completers, and profit drivers. The analysis of the system may be performed on a category level, or on an individual product level. The system may then utilize the role classification of the given products (or categories) for comparisons against competitors' pricing. The role classification of the products may also be fed to downstream pricing optimization and/or business decision systems.

One embodiment of the system for product role analysis may be useful in association with a price optimization system. Embodiments of this system may receive volume data for each item. This item data may include Point Of Sale (POS) data for the given product over a given historical period.

Likewise, demand modeling may be performed on the items. Elasticity of the products may be determined from the demand modeling. These elasticity values may also be received by the analysis system.

Product volumes and elasticities may then be compared against one another. This comparison may include graphing the product by its volume versus elasticity. From this comparison the products may be classified into one or more roles. These roles include image items, niche products, assortment completers, and profit drivers.

The assortment completer role is populated with products which have high relative elasticity and low relative volume. Niche product role is populated with products which have low relative elasticity and low relative volume. The image item role is populated with products which have high relative elasticity and high relative volume. And lastly, the profit driver role is populated with products which have low relative elasticity and high relative volume.

This comparison may also include generating an "image value" for the product. An image value may be generated through any number of equations, including simple addition and multiplication equations. Image values for each product may be charted and color coded to indicate high image items. Further, identified products with high image values may be compared against a business' existing list of key value items.

Role analysis may be performed for the entire business, or may be performed by business segments. These segments may be divided by zone or customer segments.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 38 shows an example screenshot of an image strength chart in accordance with some embodiment of the present invention;

FIG. 41 shows an example screenshot of an image strength chart across segments in accordance with some embodiment of the present invention.

DETAILED DESCRIPTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates to a system and methods for a business tool for analyzing the role of a given product category (or individual product) given elasticity of the category and sales volumes of the category. The role analysis may then be utilized to generate business decisions such as product pricing and promotions. This business tool may be stand alone, or may be integrated into a pricing optimization system to provide more effective pricing of products.

Role analysis may include any of generating plots for the products/categories, generation of image values for the products, pricing comparison of high image value items, and classification of products into roles. These roles include: image items, niche products, assortment completers, and profit drivers. Understanding a product's role may be useful in pricing, promotion, assortment, and for layout of products within a store.

Figure 1A:
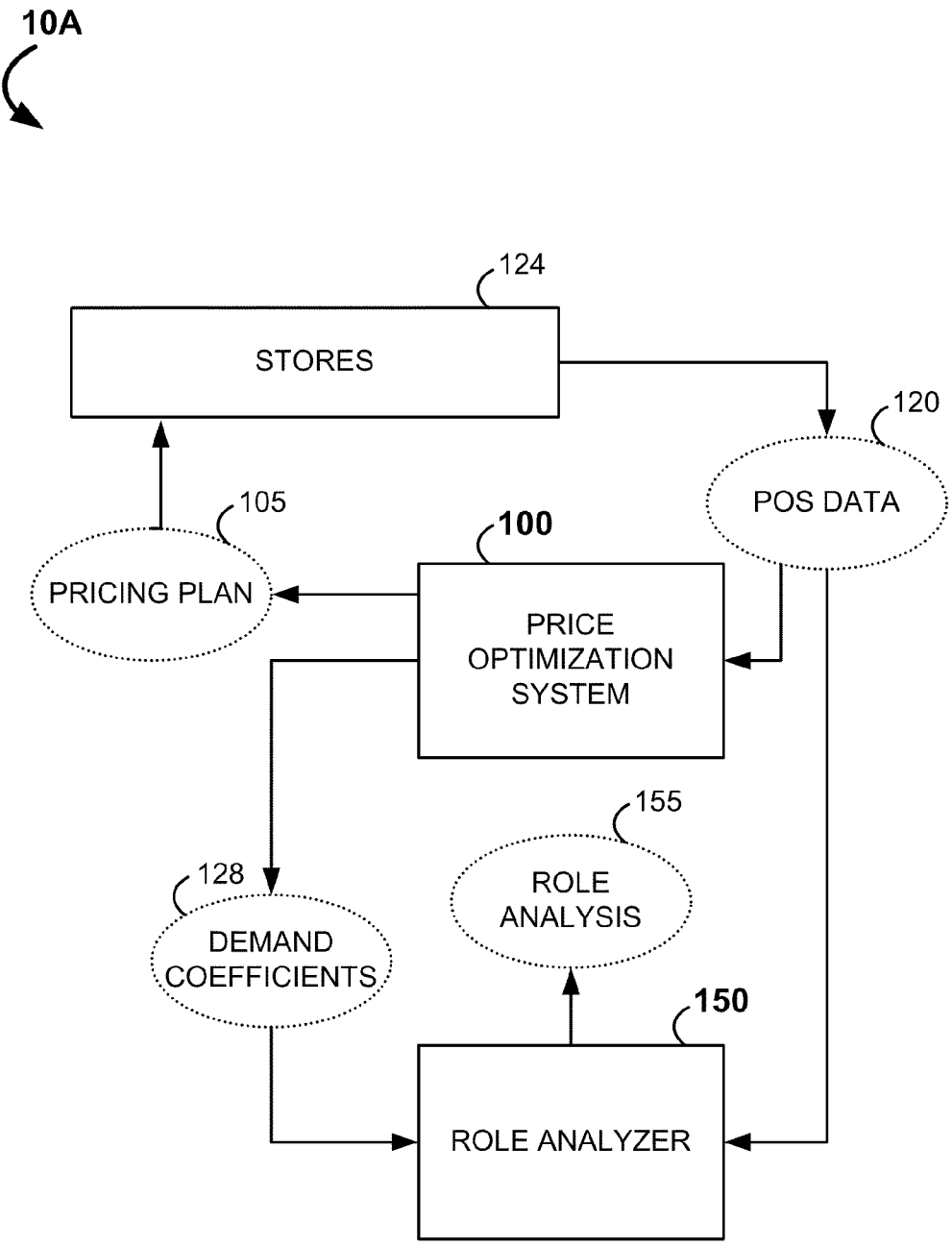
FIG. 1A provides an example logical schematic view of an embodiment of a category role analysis system in conjunction with a price optimization system in accordance with one embodiment of the invention.
Figure 1B:
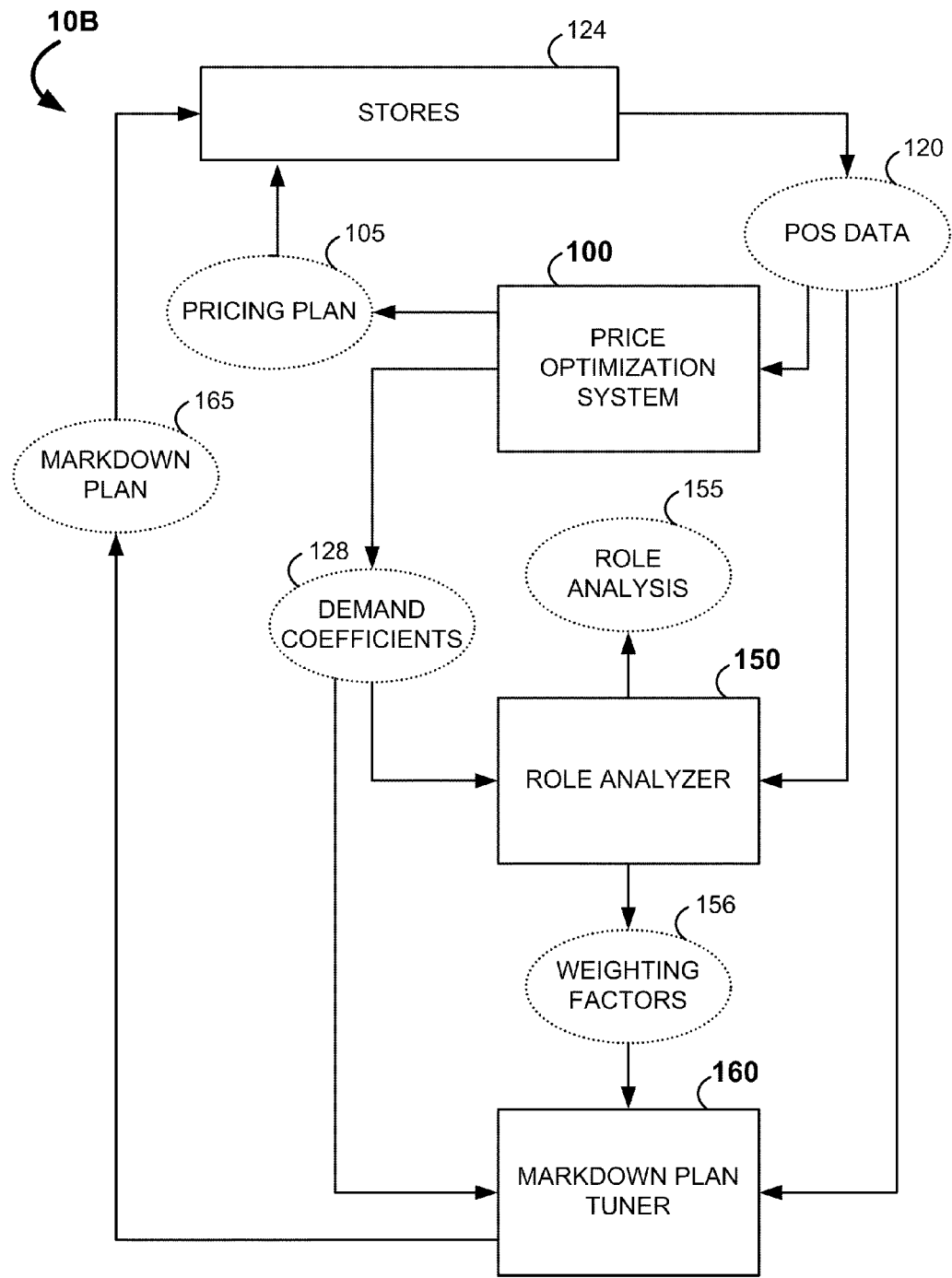
FIG. 1B provides an example logical schematic view of an embodiment of the category role analysis system in conjunction with the price optimization system and a markdown plan tuner in accordance with one embodiment of the invention.

To facilitate discussion, FIGS. 1A and 1B show a category role analyzer coupled to an optimization system. FIGS. 2-8 illustrate the optimization system and methods in more detail. General computer systems for the optimization system, role analysis system, and/or markdown plan generation system may be seen at FIGS. 9A and 9B. FIGS. 10-20 show various pricing optimization processes.

FIGS. 21 to 30 detail the markdown plan tuning system and methods. FIGS. 31 to 44 illustrate the system and method of role analysis.

The following description of some embodiments of the present invention will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Role Analysis System Overview

To facilitate discussion, FIGS. 1A and 1B illustrate a business suite structure suited for the operation of the Role Analyzer 150. The Role Analyzer 150 may, in some embodiments, include a stand alone system; however, to operate efficiently the Role Analyzer 150 requires the usage of demand elasticities of products, which may be readily gained from the Demand Coefficients 128 generated by the Optimization System 100. Thus, it is possible for some embodiments of the present invention to be coupled to the Optimization System 100.

In FIG. 1A, both the Optimization System 100 and Role Analyzer 150 may be coupled to one or more Stores 124. The Stores 124 may generate Point of Sale Data 120. The Point of Sale Data 120 may be fed to the Optimization System 100 and Role Analyzer 150 directly, or stored as a collection of transaction data. The Optimization System 100 utilizes the Point of Sale Data 120 to generate a Pricing Plan 105, as will be discussed in more detail below. As part of the generation of the Pricing Plan 105, the Optimization System 100 may further generate Demand Coefficients 128 for the products being modeled. These Demand Coefficients 128 may be provided to the Role Analyzer 150 for the generation of a Role Analysis 155.

In FIG. 1B, the Optimization System 100, Role Analyzer 150 and Stores 124 are still present. However, this embodiment of the invention also includes a Markdown Plan Tuner 160. The Markdown Plan Tuner 160 receives the Point of Sale Data 120, as well as Weighting Factors 156 derived from the role analysis by the Role Analyzer 150. The Markdown Plan Tuner 160 may then generate a Markdown Plan 165 for usage by the Stores 124. Below, each of the Optimization System 100, Role Analyzer 150 and Markdown Plan Tuner 160 will be explored in more detail.

II. Optimization System

Figure 2:
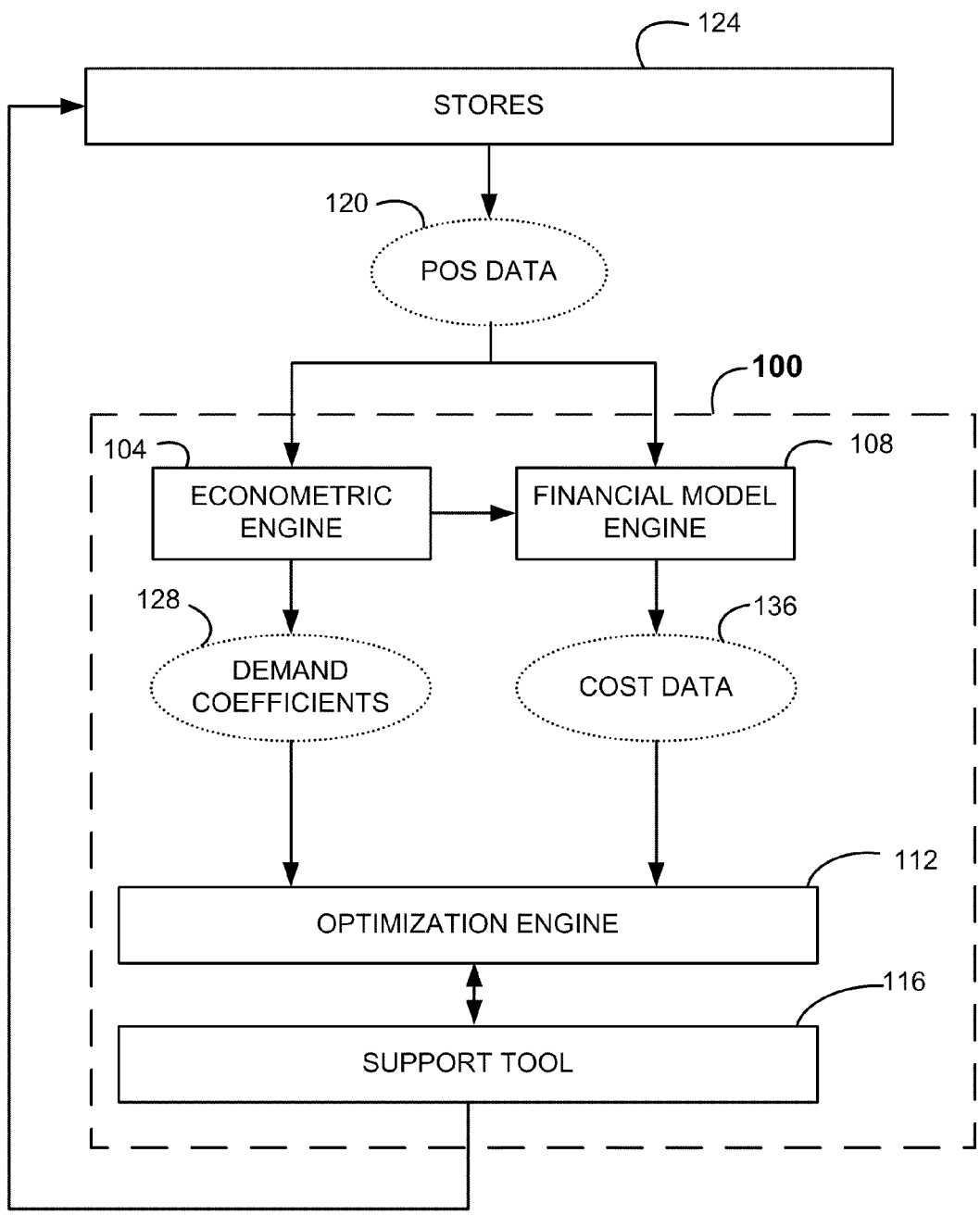
FIG. 2 is a high level schematic view of an embodiment of a price optimization system.
Figure 3:
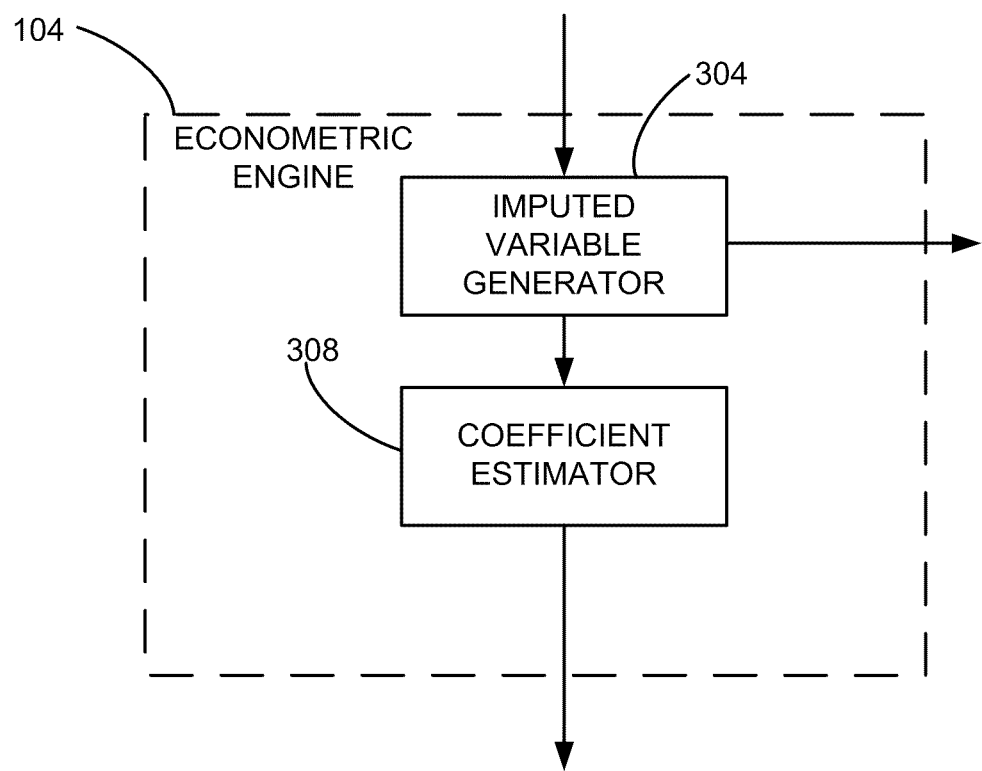
FIG. 3 is a more detailed schematic view of the econometric engine.

To facilitate discussion of the optimization system, FIG. 2 is a schematic view of a Price Optimizing System for Business Planning 100. The Price Optimizing System for Business Planning 100 comprises an Econometric Engine 104, a Financial Model Engine 108, an Optimization Engine 112, and a Support Tool 116. The Econometric Engine 104 is connected to the Optimization Engine 112, so that the output of the Econometric Engine 104 is an input of the Optimization Engine 112. The Financial Model Engine 108 is connected to the Optimization Engine 112, so that the output of the Financial Model Engine 108 is an input of the Optimization Engine 112.

The Optimization Engine 112 is connected to the Support Tool 116 so that output of the Optimization Engine 112 is provided as input to the Support Tool 116 and output from the Support Tool 116 may be provided as input to the Optimization Engine 112. The Econometric Engine 104 may also exchange data with the Financial Model Engine 108.

Figure 6:
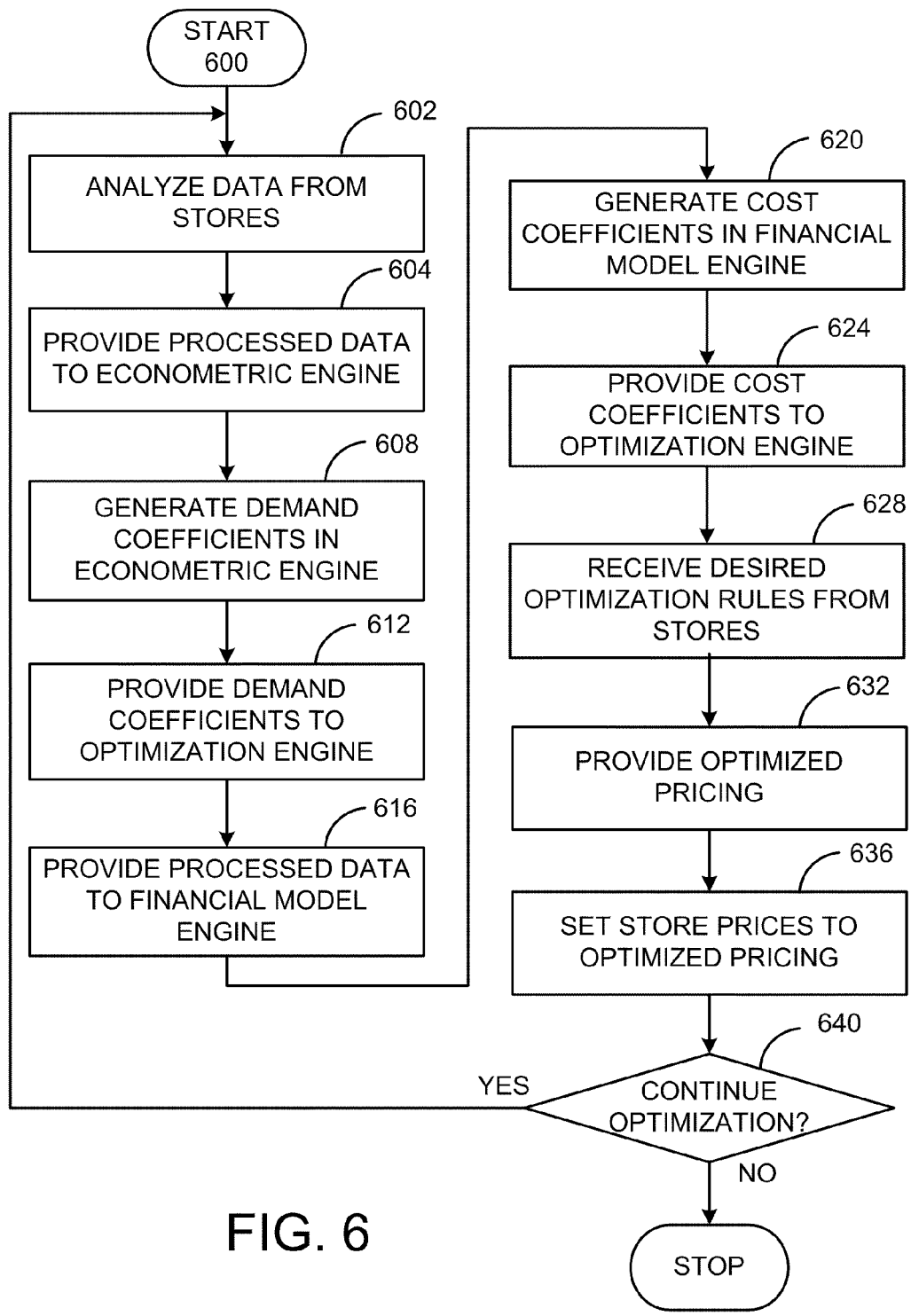
FIG. 6 is a flow chart of some embodiment of the invention for generating optimized prices.
Figure 7:
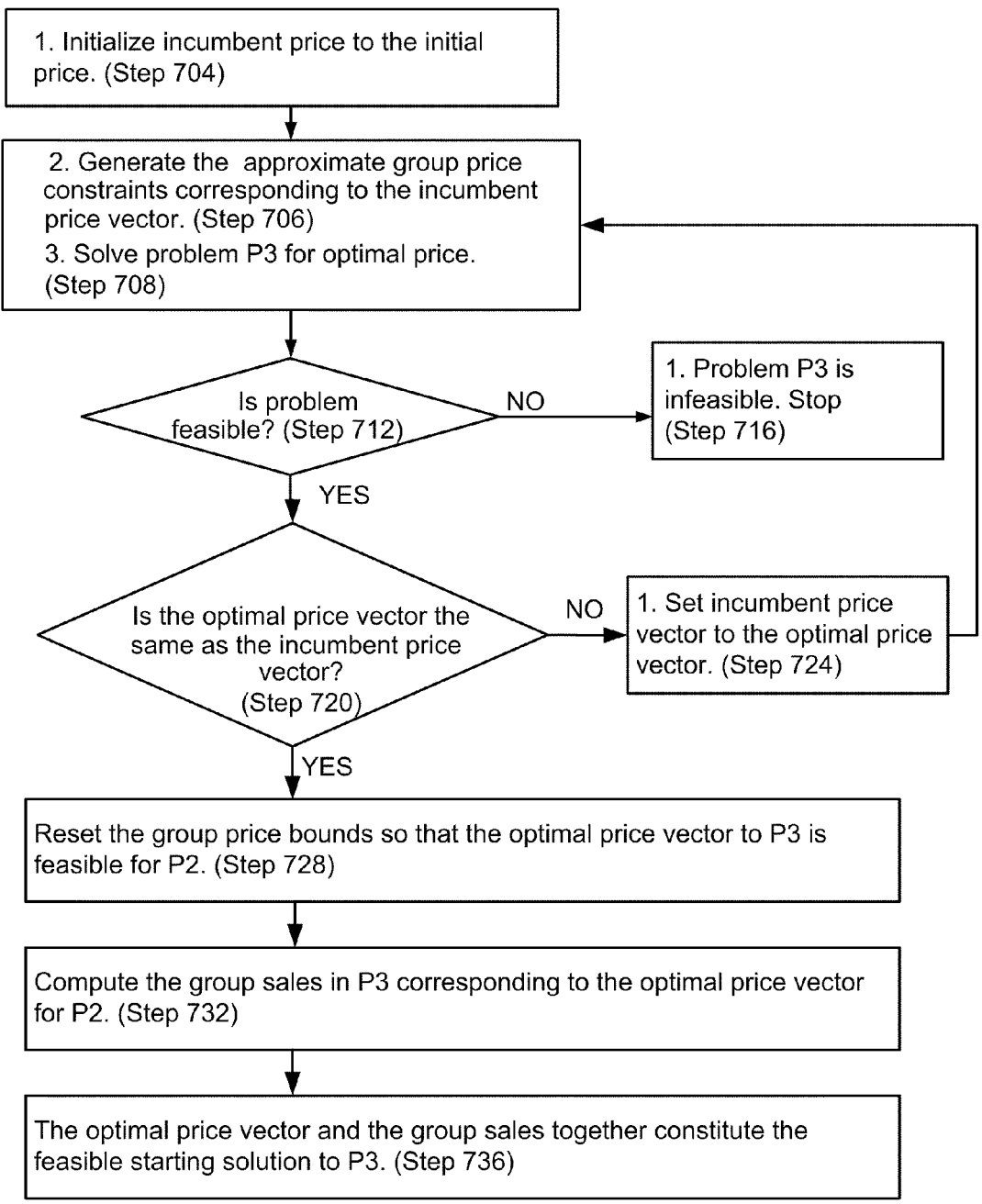
FIG. 7 is a flow chart of some embodiment of the invention for providing an initial feasible solution.

Turning briefly to FIG. 6, this figure provides a high level flow chart of a process that utilizes the Price Optimizing System for Business Planning 100. The operation of the Price Optimizing System for Business Planning 100 will be discussed in general here and in more detail further below. POS Data 120 is provided from the Stores 124 for data analysis including data cleansing (step 602). Generally, the data 120 provided may include point-of-sale information, product information, and store information. Processed data may then be provided to the Econometric Engine 104 (step 604). The Econometric Engine 104 processes the analyzed data to provide demand coefficients 128 (step 608) for a set of algebraic equations that may be used to estimate demand (volume sold) given certain marketing conditions (i.e., a particular store in the chain), including a price point. The demand coefficients 128 are provided to the Optimization Engine 112 (step 612). These demand coefficients may likewise be output to the Role Analyzer 150 for role analysis (not illustrated).

Additional processed data from the Econometric Engine 104 may also be provided to the Optimization Engine 112. The Financial Model Engine 108 may receive processed data (step 616) and processed data from the Econometric Engine 104. This data is generally cost related data, such as average store labor rates, average distribution center labor rates, cost of capital, the average time it takes a cashier to scan an item (or unit) of product, how long it takes to stock a received unit of product and fixed cost data. The Financial Model Engine 108 may process all the received data to provide a variable cost and fixed cost for each unit of product (or by demand group) in a store (step 620). The processing by the Econometric Engine 104 and the processing by the Financial Model Engine 108 may be done in parallel. Cost data 136 is provided from the Financial Model Engine 108 to the Optimization Engine 112 (step 624). The Optimization Engine 112 utilizes the demand coefficients 128 to create a demand equation. The optimization engine is able to forecast demand and cost for a set of prices to calculate net profit. The Stores 124 may use the Support Tool 116 to provide optimization rules to the Optimization Engine 112 (step 628).

The Optimization Engine 112 may use the demand equation, the variable and fixed costs, the rules, and retention data to compute an optimal set of prices that meet the rules (step 632). For example, if a rule specifies the maximization of profit, the optimization engine would find a set of prices that cause the largest difference between the total sales and the total cost of all products being measured. If a rule providing a promotion of one of the products by specifying a discounted price is provided, the optimization engine may provide a set of prices that allow for the promotion of the one product and the maximization of profit under that condition. In the specification and claims the phrases "optimal set of prices" or "preferred set of prices" are defined as a set of computed prices for a set of products where the prices meet all of the rules. The rules normally include an optimization, such as optimizing profit or optimizing volume of sales of a product and constraints such as a limit in the variation of prices. The optimal (or preferred) set of prices is defined as prices that define a local optimum of an econometric model which lies within constraints specified by the rules When profit is maximized, it may be maximized for a sum of all measured products.

Such maximization, may not maximize profit for each individual product, but may instead have an ultimate objective of maximizing total profit. The optimal (preferred) set of prices may be sent from the Optimization Engine 112 to the Support Tool 116 so that the Stores 124 may use the user interface of the Support Tool 116 to obtain the optimal set of prices. Other methods may be used to provide the optimal set of prices to the Stores 124. The price of the products in the Stores 124 are set to the optimal set of prices (step 636), so that a maximization of profit or another objective is achieved. An inquiry may then be made whether to continue the optimization (step 640).

Each component of the Price Optimizing System for Business Planning 100 will be discussed separately in more detail below.

III. Econometric Engine

Returning now to FIG. 3, which provides a more detailed view of the Econometric Engine 104. The econometric engine comprises an Imputed Variable Generator 304 and a Coefficient Estimator 308. The data 120 from the Stores 124 is provided to the Imputed Variable Generator 304. The data 120 may be raw data generated from cash register data, which may be generated by scanners used at the cash registers.

A. Imputed Variable Generator

The present invention provides methods, media, and systems for generating a plurality of imputed econometric variables. Such variables are useful in that they aid businesses in determining the effectiveness of a variety of sales strategies. In particular, such variables can be used to gauge the effects of various pricing or sales volume strategies.

Figure 10:
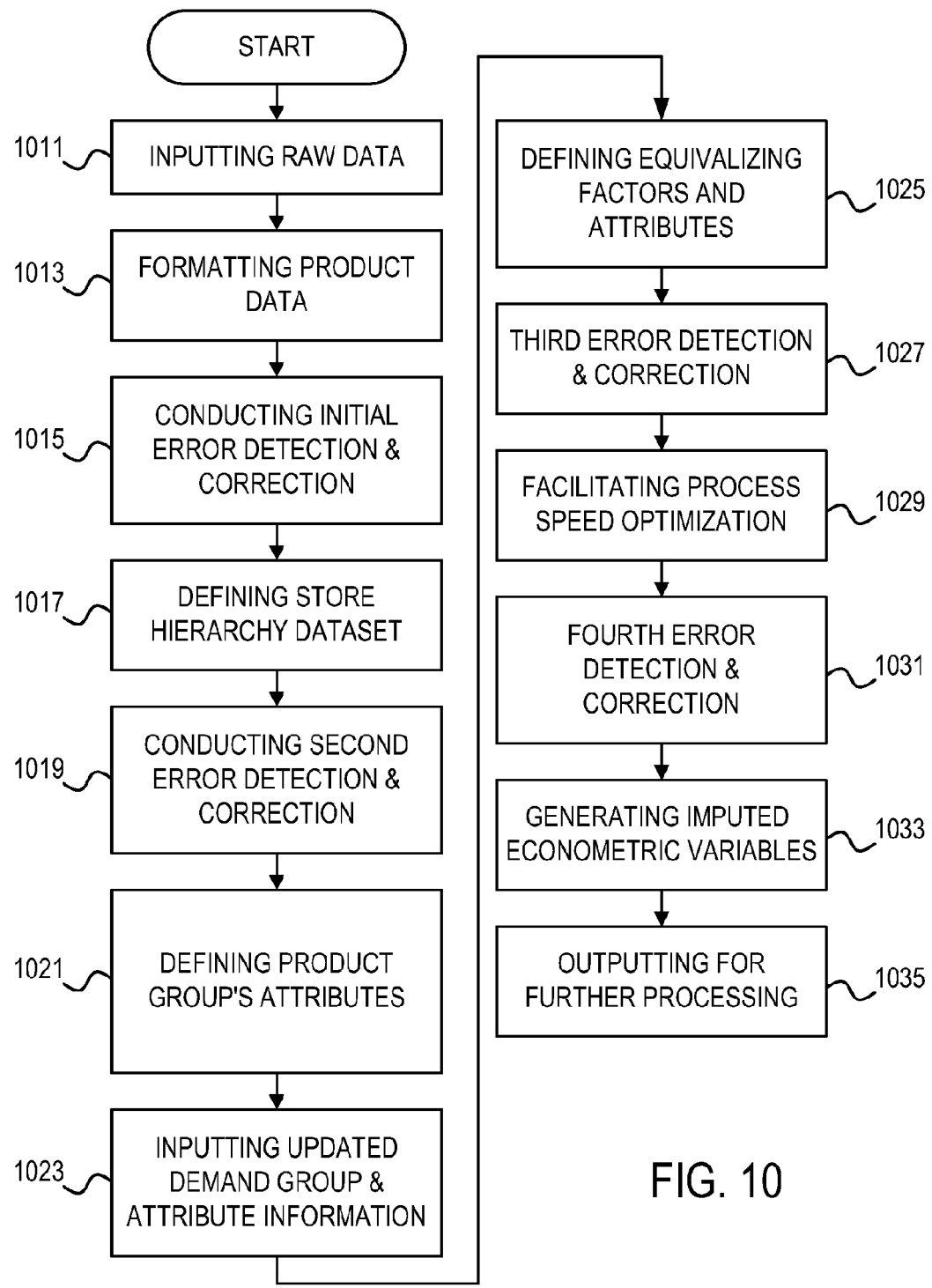
FIG. 10 is a flow chart depicting a process flow by which raw econometric data can be input, subject to "cleansing", and used to create an initial dataset which can then be used to generate imputed econometric variables in accordance with some embodiment of the present invention.

FIG. 10 illustrates a flowchart which describes steps of a method embodiment for data cleansing imputed econometric variable generation in accordance with the principles of the present invention. The process, generally described in FIG. 10, begins by initial dataset creation and data cleaning (Steps 1011-1031). This data set information is then used to generate imputed econometric variables (Step 1033) which can be output to and for other applications (Step 1035). Likewise, such dataset correction and cleansing.

1. Initial Dataset Creation and Cleaning

The process of dataset creation and cleaning (that is to say the process of identifying incompatible data records and resolving the data incompatibility, also referred to herein as "error detection and correction") begins by inputting raw econometric data (Step 1011). The raw econometric data is then subject to formatting and classifying by UPC designation (Step 1013). After formatting, the data is subject to an initial error detection and correction step (Step 1015). Once the econometric data has been corrected, the store information comprising part of the raw econometric data is used in defining a store data set hierarchy (Step 1017). This is followed by a second error detecting and correcting step (Step 1019). In some embodiments, this is followed by defining a group of products which will comprise a demand group (i.e., a group of highly substitutable products) and be used for generating attribute information (Step 1021). Based on the defined demand group, the attribute information is updated (Step 1023). The data is equivalized and the demand group is further classified in accordance with size parameters (Step 1025). The demand group information is subjected to a third error detection and correction step (Step 1027). The demand group information is then manipulated to facilitate decreased process time (Step 1029). The data is then subjected to a fourth error detection and correction step (Step 1031), which generates an initial cleansed dataset. Using this initial cleansed dataset, imputed econometric variables are generated (Step 1033). Optionally, these imputed econometric variables may be output to other systems for further processing and analysis (Step 1035).

While this exemplary process of generating an initial dataset with cleansing is provided with some degree of detail, it is understood that the process for predicting customer loss and customer retention strategy generation may be performed with a variety of optimization systems. This includes systems where, for example, demand groups are not generated, and where alternative methods of data set generation are employed.

The process begins by inputting raw econometric data (Step 1011). The raw econometric data is provided by a client. The raw econometric data includes a variety of product information, including, but not limited to, the store from which the data is collected, the time period over which the data is collected, a UPC (Universal Product Code) for the product, and provide a UPC description of the product. Also, the raw econometric data must include product cost (e.g., the wholesale cost to the store), number of units sold, and either unit revenue or unit price. Also, the general category of product or department identification is input. A category is defined as a set of substitutable or complementary products, for example, "Italian Foods". Such categorization can be proscribed by the client, or defined by generally accepted product categories. Additionally, such categorization can be accomplished using look-up tables or computer generated product categories.

Also, a more complete product descriptor is generated using the product information described above and, for example, a UPC description of the product and/or a product description found in some other look-up table (Step 1013).

The data is then subjected to a first error detection and correction process (Step 1015). Typically, this step includes the removal of all duplicate records and the removal of all records having no match in the client supplied data (typically scanner data).

Data subsets concerning store hierarchy is defined (Step 1017). This means stores are identified and categorized into various useful subsets. These subsets can be used to provide information concerning, among other things, regional or location specific economic effects.

The data is then subjected to a second error detection and correction process (Step 1019). This step cleans out certain obviously defective records. Examples include, but are not limited to, records displaying negative prices, negative sales volume, or negative cost. Records exhibiting unusual price information, determined through standard deviation or cross store comparisons, are also removed.

This is followed by defining groups of products and their attributes (Step 1021). In addition, updated demand group and attribute information can then be input as received (Step 1023).

The data is further processed by defining an "equivalizing factor" for the products of each demand group in accordance with size and UOM parameters (Step 1025). This equivalizing factor can be provided by the client or imputed. An equivalizing factor can be imputed by using, for example, the median size for each UOM. Alternatively, some commonly used arbitrary value can be assigned. Once this information is gathered, all product prices and volume can be "equivalized". Chiefly, the purpose of determining an equivalizing factor is to facilitate comparisons between different size products in a demand group.

The data is then subjected to a third error detection and correction process, which detects the effects of closed stores and certain other erroneous records (Step 1027). In accord with the principles of the invention, stores that demonstrate no product movement (product sales equal to zero) over a predetermined time period are treated as closed. Those stores and their records are dropped from the process. The third error detection and correction also includes analysis tools for detecting the presence of erroneous duplicate records. A further correction can be made for records having the same date and causal value but have differing prices or differing number of units sold.

After all the duplicate records are eliminated, the data is reconstructed. The data can be reviewed again to insure all duplicates are removed. Optionally, an output file including all discrepancies can be produced. In the event that it becomes necessary, this output file can be used as a follow-up record for consulting with the client to confirm the accuracy of the error detection and correction process.

Additionally, reduced processing times may be achieved by reformatting the data (Step 1029). For example, groups of related low sales volume products (frequently high priced items) can optionally be aggregated as a single product and processed together. Additionally, the data may be split into conveniently sized data subsets defined by a store or groups of stores which are then processed together to shorten the processing times.

Next, the process includes determining the nature of missing data records in a fourth error detection and correction step (Step 1031). The missing data records are analyzed again before finally outputting a cleansed initial dataset. For example, data collected over a modeled time interval is analyzed by introducing the data into a data grid divided into a set of time periods. For the time periods having no records, a determination must be made. Is the record missing because:

a. there were no sales that product during that week (time period);

b. the product was sold out and no stock was present in the store during that time period (this situation is also referred to herein as a "stock-out');

c. the absence of data is due to a processing error.

Figure 11:
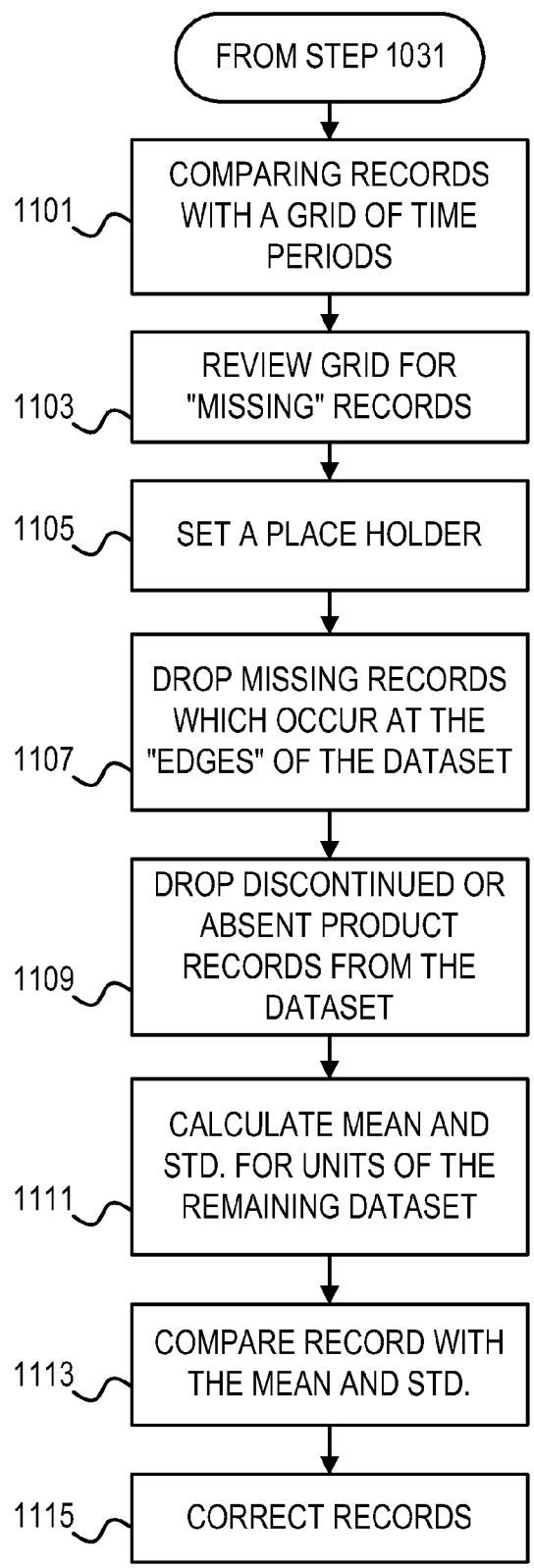
FIG. 11 is a flow chart depicting a process flow depicting a process by which partially cleansed econometric data is subject to further error detection and correction in accordance with some embodiment of the present invention.

FIG. 11 depicts an exemplary process flow embodiment for determining the nature of missing data records in a fourth error detection and correction step in accordance with the principles of the present invention. The records are compared to a grid of time periods (Step 1101). The grid is reviewed for missing records with respect to a particular store and product (Step 1103). These missing records are then marked with a placeholder (Step 1105). Missing records at the "edges" of the dataset do not significantly affect the dataset and are deleted (Step 1107). Records for discontinued products or products recently introduced are dropped for those time periods where the product was not carried in the Store (Step 1109). The remaining dataset is processed to determine an average value for units (sold) and a STD for units (Step 1111). Each missing record is compared to the average units (Step 1113) and based on this comparison, a correction can be made (Step 1115).

The net result of execution of the process Steps 1011-1031 disclosed hereinabove is the generation of a cleansed initial dataset which can be used for its own purpose or input into other econometric processes. One such process is the generation of imputed econometric variables.

Note that other methods for addressing missing records may be utilized, as is well known by those skilled in the art. For example, missing records may be simply dropped. Alternatively, such records may be incorporated with additional information such as extrapolated values from before and/or after the data point, median values or other replacement value.

2. Generation of Imputed Econometric Variables

The foregoing steps (1011-1031) concern cleansing the raw econometric data to create an error detected and error corrected ("cleansed") initial dataset. The cleansed initial dataset created in the foregoing steps can now be used to generate a variety of useful imputed econometric variables (Step 1033). These imputed econometric variables are useful in their own right and may also be output for use in further processing (Step 1035). One particularly useful application of the imputed econometric variables is that they can be input into an optimization engine which collects data input from a variety of sources and processes the data to provide very accurate economic modeling information.

A. Imputed Base Price

Figure 12:
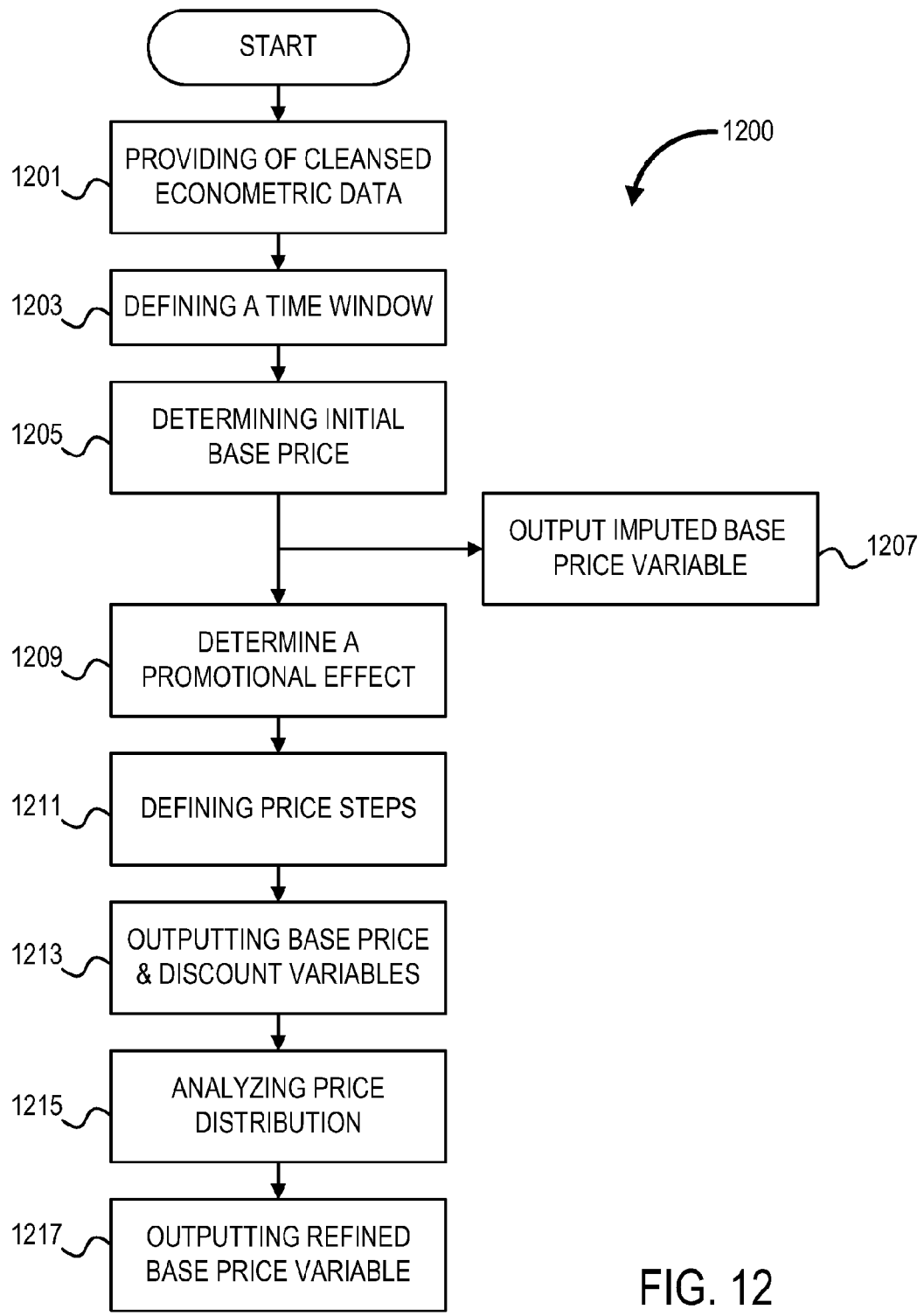
FIG. 12 is a flow chart depicting a process flow by which an imputed base price variable can be generated in accordance with one embodiment of the present invention.

One imputed econometric variable that can be determined using the initial dataset created in accordance with the forgoing, is an imputed base price variable (or base price). FIG. 12 is a flowchart 1200 outlining one embodiment for determining the imputed base price variable. The process begins by providing the process 1200 with a "cleansed" initial dataset (Step 1201), for example, the initial dataset created as described in Steps 1011-1031 of FIG. 10. The initial dataset is examined over a defined time window (Step 1203). Defining a time window (Step 1203) includes choosing an amount of time which frames a selected data point allowing one to look forward and backward in time from the selected data point which lies at the midpoint in the time window. This is done for each data point in the dataset, with the time window being defined for each selected data point. The time frame can be user selected or computer selected.

The initial base price values generated above (step 1205) provide satisfactory values for the imputed base price variable which may be output (Step 1207) and used for most purposes. However, optional Steps 1209-1217 describe an approach for generating a more refined imputed base price variable.

In generating a more refined imputed base price variable, the effect of promotional (or discount) pricing is addressed (Steps 1209-1217). This may be calculated by specifying a discount criteria (Step 1209); defining price steps (Step 1211); outputting an imputed base price variable and an imputed discount variable (Step 1213); analyzing the base price distribution (Step 1215); and outputting a refined base price variable (Step 1217).

Data records are evaluated over a series of time periods (e.g., weeks) and evaluated. The point is to identify price records which are discounted below a base price. By identifying these prices and not including them in a calculation of base price, the base price calculation will be more accurate. Therefore, a discount criterion is defined and input as a variable (Step 1209).

Further analysis is used to define base price "steps" (Step 1211). Base price data points are evaluated. Steps are roughly defined such that the base price data points lie within a small percent of distance from the step to which they are associated (e.g., 2%). This can be accomplished using, for example, a simple regression analysis such as is known to those having ordinary skill in the art. By defining the steps, the average value for base price over the step is determined. Also, price data points are averaged to determine the base price of step. Thus, the average of the base prices in a step is treated as the refined base price for that step.

Further refining includes an analysis of the first step. If the first step is short (along the time axis) and considerably lower than the next step, it is assumed that the first step is based on a discounted price point. As such, the value of the next step is treated as the base price for the time period of the first step.

At this point, absolute discount ($\Delta P$) and base price (BP) are used to calculate percent discount ($\Delta P/BP$) for each store product time period.

This base price is subjected to further analysis for accuracy using cross-store checking (Step 1215). This can be accomplished by analyzing the base price data for each product within a given store, and comparing with all other stores. Any outlier store's base price is adjusted for the analyzed product such that it lies closer to an average cross-store percentile for base price over all stores.

Thus, the forgoing process illustrates an embodiment for determining an imputed base price variable.

B. Imputed Relative Price Variable

Figure 13:
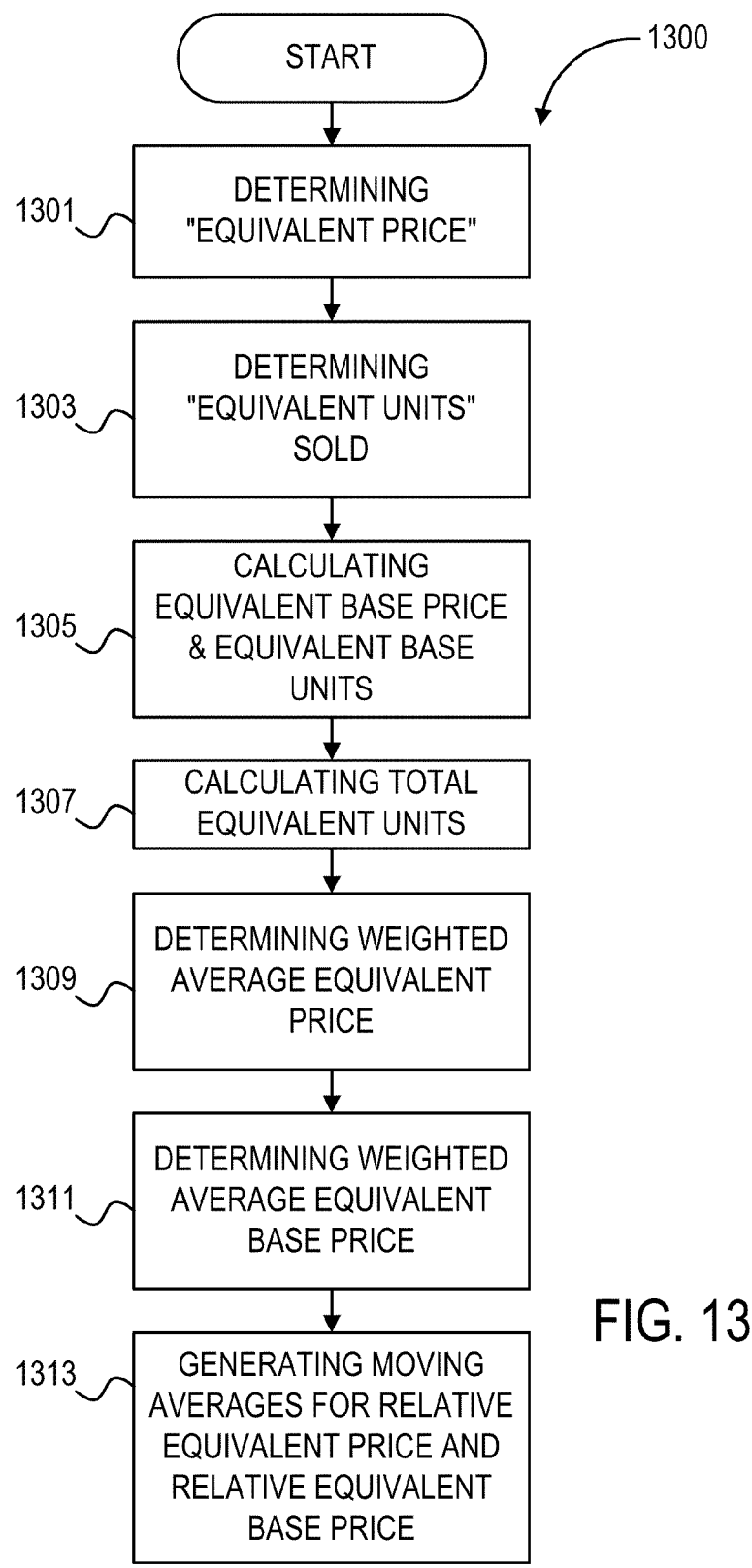
FIG. 13 is a flow chart depicting a process flow by which an imputed relative price variable can be generated in accordance with one embodiment of the present invention.

Reference is now made to the flowchart 1300 of FIG. 13 which illustrates an embodiment for generating relative price variables in accordance with the principles of the present invention. A relative price may be calculated. As disclosed earlier, an equivalizing factor is defined. Using the equivalizing factor, an equivalent price can be calculated (Step 1301). Next equivalent units sold ("units") can be calculated (Step 1303). In a similar vein, equivalent base price and equivalent base units are calculated (Step 1305) using the imputed values for base price (for example, as determined in Steps 1201-1207) and for base units (also referred to as base volume which is determined as disclosed below). For each Store, each demand group, and each date, the total equivalent units is determined (Step 1307). A weighted calculation of relative equivalent price is then made (Step 1309).

For example, such relative price value is determined as follows: equivalent price is divided by a weighted denominator, the weighted denominator is calculated by multiplying equivalent units for each product times the equivalent units sold. For each product, only the values of other products are used in the calculation. This means excluding the product being analyzed. For example, the relative price of A, given three exemplary products A, B and C, is determined as follows:

$$rel_A = \frac{equiv.priceofA}{\left[\begin{array}{c}(equiv.unitsofB)(Equiv.priceofB)+\\(equiv.unitsofC)(equiv.priceofC)\\\hline totalequivalentunits - equivalentunitsofA\end{array}\right]}$$

Also, a weighted average equivalent base price is calculated using the method disclosed hereinabove. The only difference being that instead of using the actual equivalent price, the calculated base price values per equivalent are used (Step 1311). Using the previously disclosed techniques, a moving average is generated for relative actual equivalent price and relative equivalent base price (Step 1313). Thus a variety of imputed relative price variables can be generated (e.g., relative equivalent price, relative equivalent base price, etc.).

C. Imputed Base Volume Variable

Figure 14A:
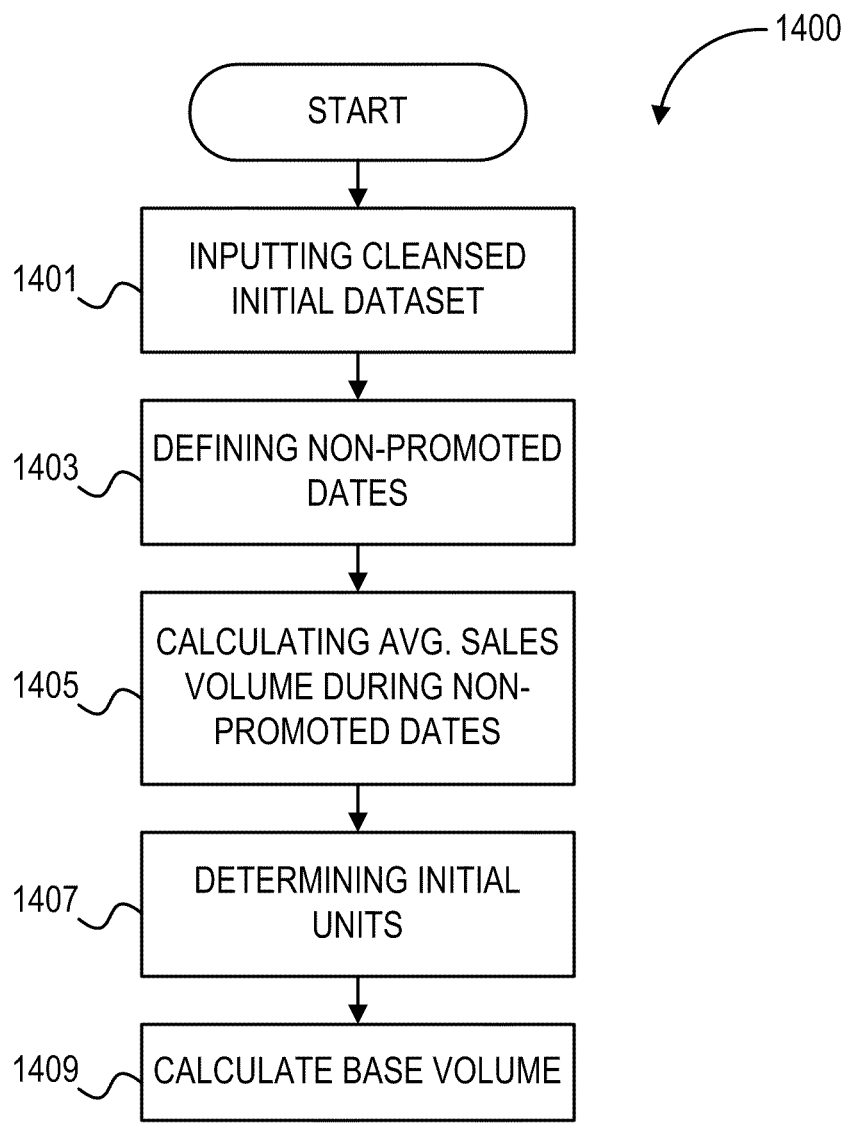
FIG. 14A is a flow chart depicting a process flow by which an imputed base unit sales volume variable can be generated in accordance with one embodiment of the present invention.

A flowchart 1400 shown in FIG. 14A illustrates one embodiment for generating an imputed base volume variable. Base volume refers to the volume of product units sold in the absence of discount pricing or other promotional effects. Base volume is also referred to herein as simply "base units". The determination of base volume begins by receiving the cleansed initial dataset information for each product and store (Step 1401). The initial dataset information is processed to determine "non-promoted dates" (Step 1403), i.e., dates where the products are not significantly price discounted. Using the non-promoted data subset, an average value for "units" and a STD is calculated (i.e., an average value for product unit sales volume for each product during the non-promoted dates is calculated) (Step 1405). This value shall be referred to as the "non-promoted average units". An initial value for base units ("initial base units") is now determined (Step 1407).

Figure 14B:
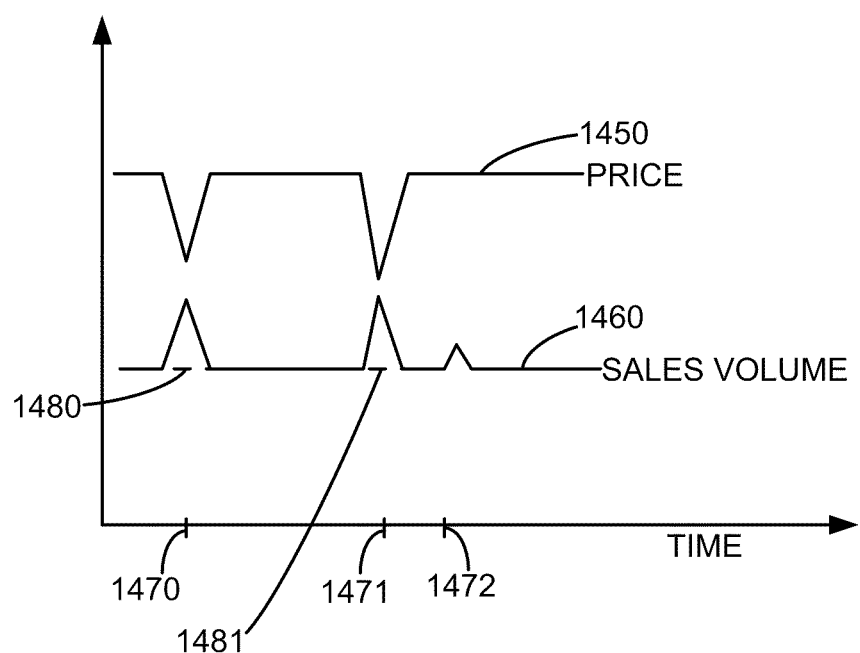
FIG. 14B is a diagram used to illustrate the comparative effects of sales volume increase and price discounts.

This principle can be more readily understood with reference to FIG. 14B. The price behavior 1450 can be compared with sales behavior 1460. Typically, when the price drops below a certain level, sales volume increases. This can be seen at time periods 1470, 1471. In such a case, the actual units sold (more than usual) are not included in a base volume determination. Rather, those records are replaced with the average volume value for the non-promoted dates (the non-promoted average unit value, shown with the dotted lines 1480, 1481). However, where a sales volume increases during a period of negligible discount (e.g., less than 2%), such as shown for time period 1472, the actual units sold (actual sales volume) are used in the calculation of base volume. However, if the records show a sales volume increase 1472 which is too large (e.g., greater than 1.5 standard deviations from the non-promoted average unit value), it is assumed that some other factor besides price is influencing unit volume and the actual unit value is not used for initial base units but is replaced by the non-promoted average unit value.

A calculated base volume value is now determined (Step 1409). This is accomplished by defining a time window. For each store and product, the average value of "initial base units" is calculated for each time window. This value is referred to as "average base units". This value is calculated for a series of time windows to generate a moving average of "average base units". This moving average of the average base units over the modeled time interval is defined as the "base volume variable".

D. Supplementary Error Detection and Correction

Figure 15A:
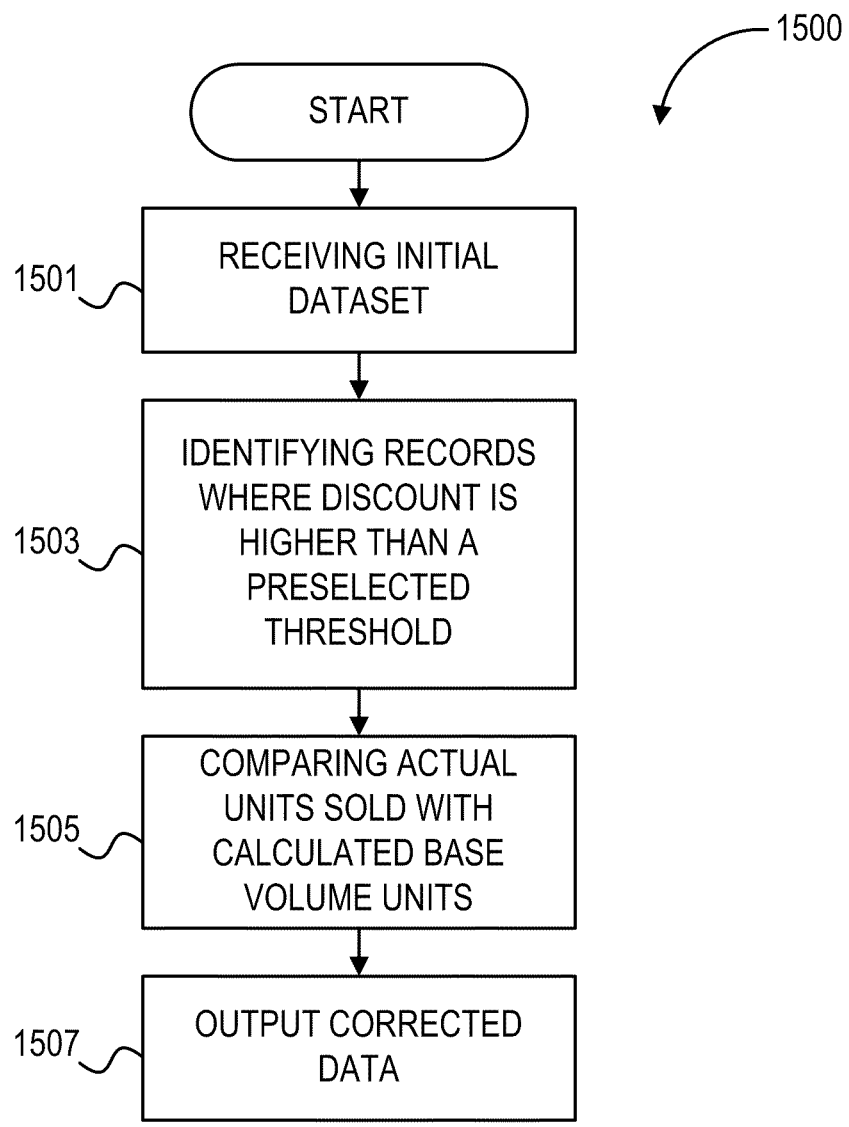
FIG. 15A is a flow chart depicting a process flow by which supplementary error detection and correction in accordance with an embodiment of the present invention.

Based on previously determined discount information, supplementary error detection and correction may be used to correct price outliers. A flowchart 1500 illustrated in FIG. 15A shows one embodiment for accomplishing such supplementary error detection and correction. Such correction begins by receiving the cleansed initial dataset information for each product and store (Step 1501). In addition, the previously calculated discount information is also input, or alternatively, the discount information (e.g., ΔP/BP) can be calculated as needed. The initial dataset and discount information is processed to identify discounts higher than a preselected threshold (e.g., 60% discount) (Step 1503). For those time periods (e.g., weeks) having price discounts higher than the preselected threshold (e.g., greater than 60%), a comparison of actual units sold to calculated base volume units (as calculated above) is made (Step 1505). Corrected data is output (step 1507).

Figure 15B:
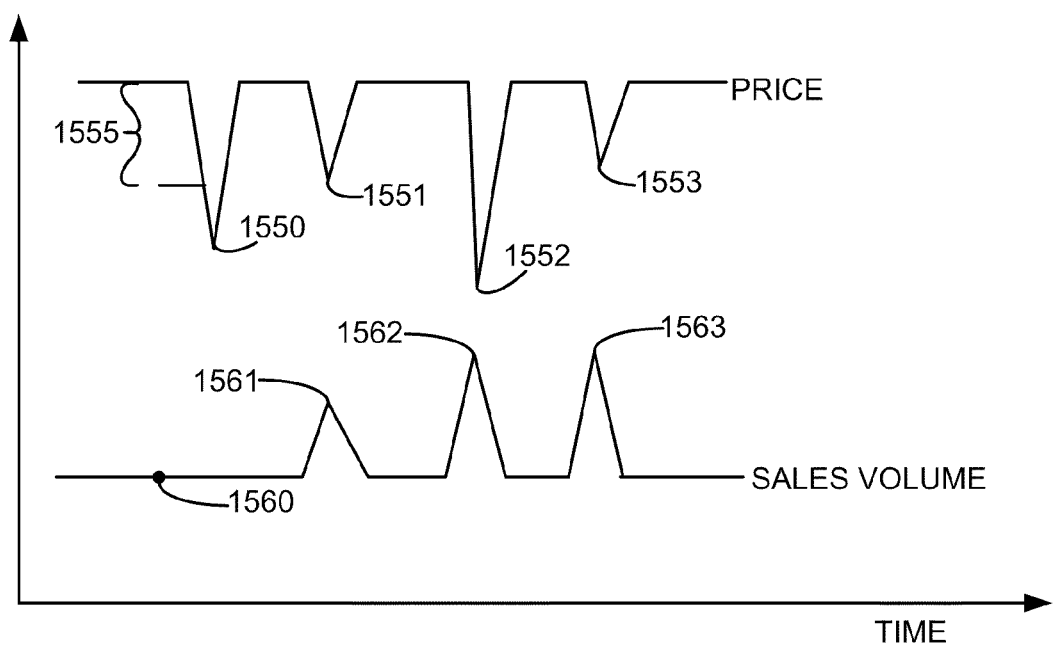
FIG. 15B is a diagram used to illustrate the comparative effects of sales volume increase and price discounts.
Figure 16:
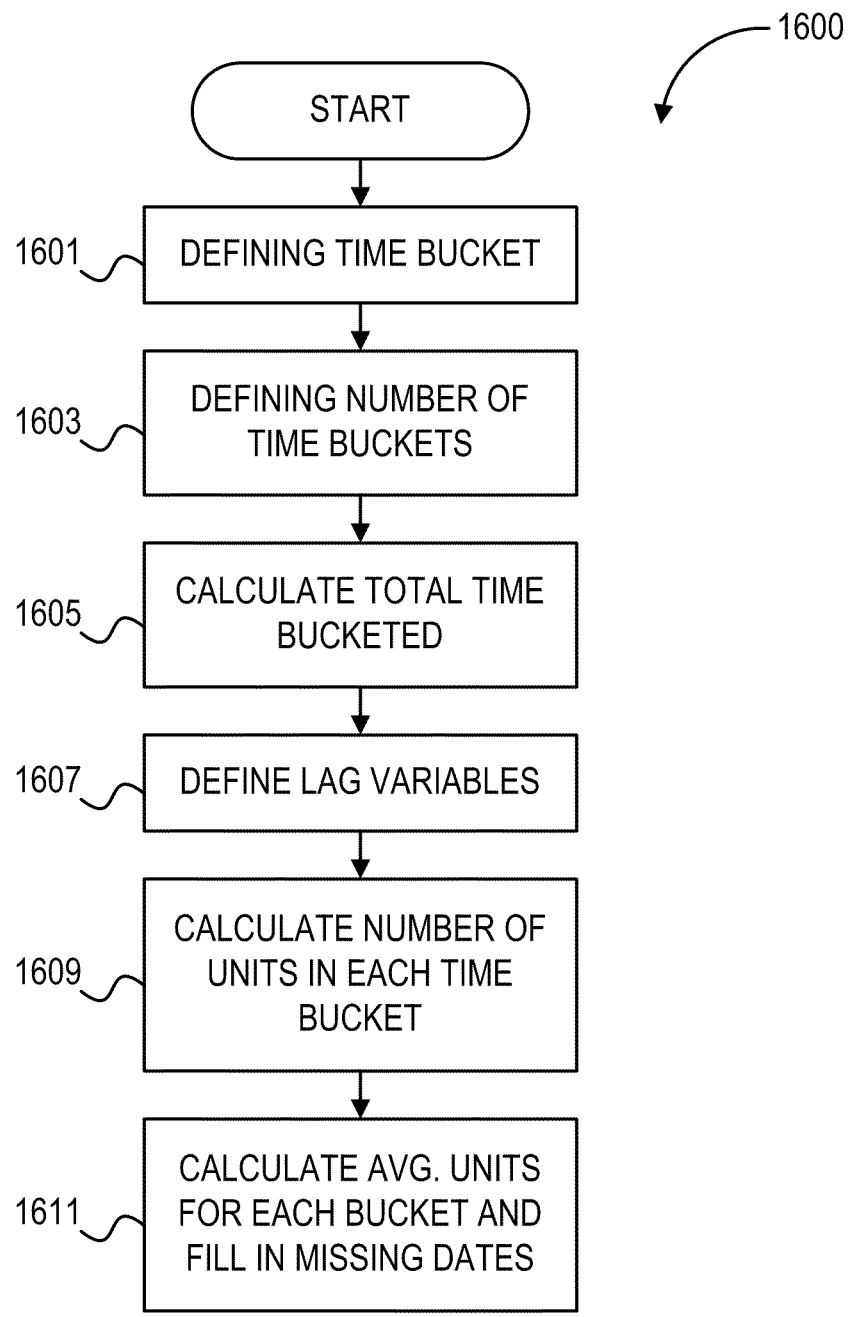
FIG. 16 is a flow chart depicting a process flow by which an imputed stockpiling variable can be generated in accordance with an embodiment of the present invention.

The concepts are similar to that illustrated in FIG. 14B and may be more easily illustrated with reference to FIG. 15B. The principles of this aspect of the present invention are directed toward finding unexplained price aberrations. For example, referring to FIG. 15B, price discounts are depicted at data points 1550, 1551, 1552, and 1553. Also, corresponding sales increases are depicted by sales volume 1560 at data points 1561, 1562, and 1563. The data point 1550 has a discount greater than the threshold 1555 (e.g., 60%). So an analysis is made of data point 1550.

E. Determining Imputed Variables which Correct for the Effect of Consumer Stockpiling With reference to FIG. 16, a flowchart 1600 illustrating a method embodiment for generating stockpiling variables is depicted. The pictured embodiment 1600 begins by defining the size of a "time bucket" (m), for example, the size (m) of the bucket can be measured in days (Step 1601). Additionally, the number (τ) of time buckets to be used is also defined (Step 1603). The total amount of time "bucketed" (m×τ) is calculated (Step 1605).

"Lag" variables which define the number of product units sold ("units") in the time leading up to the analyzed date are defined (Step 1607). Then the total number of product units sold is calculated for each defined time bucket (Step 1609). Correction can be made at the "front end" of the modeled time interval.

If working near the front end of a dataset, units from previous weeks cannot always be defined and in their place an averaged value for bucket sum can be used (Step 1611). The idea is to detect and integrate the effects of consumer stockpiling on into a predictive sales model.

F. Day of the Week Analysis

Figure 17:
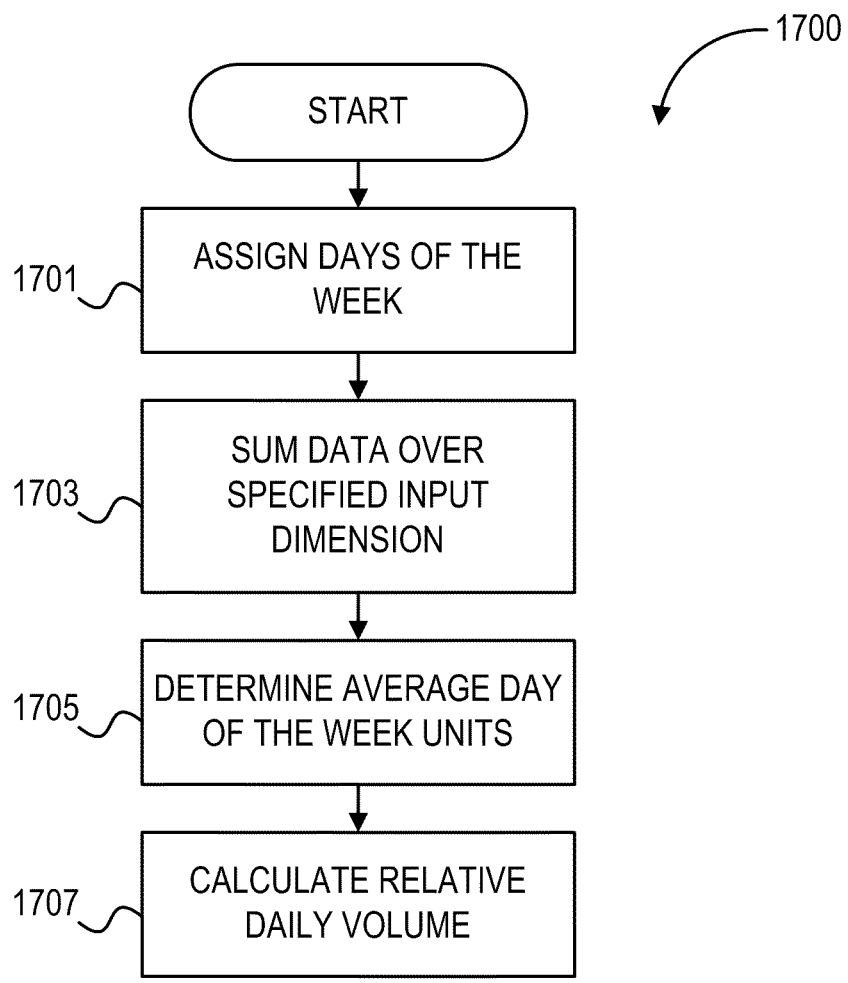
FIG. 17 is a flow chart depicting a process flow by which an imputed day-of-week variable can be generated in accordance with an embodiment of the present invention.

With reference to FIG. 17, a flowchart 1700 illustrating one embodiment for determining a Day of the Week variable is shown. It is necessary to have data on a daily basis for a determination of Day of the Week effects. In accordance with the principles of the present invention, the embodiment begins by assigning the days of the week numerical values (Step 1701). Once categorized by day of the week, the product units (sold) are summed for a specified dimension or set of dimensions. Dimension as used herein means a specified input variable including, but not limited to, Product, Brand, Demand Group, Store, Region, Store Format, and other input variable which may yield useful information (Step 1703). For each Day of Week and each dimension specified, the average units (sold) are determined (Step 1705). For each date, a "relative daily volume" variable is also determined (Step 1707). This information may prove valuable to a client merchant and can comprise an input variable for other econometric models.

G. Imputed Seasonality Variable Generation

Figure 18:
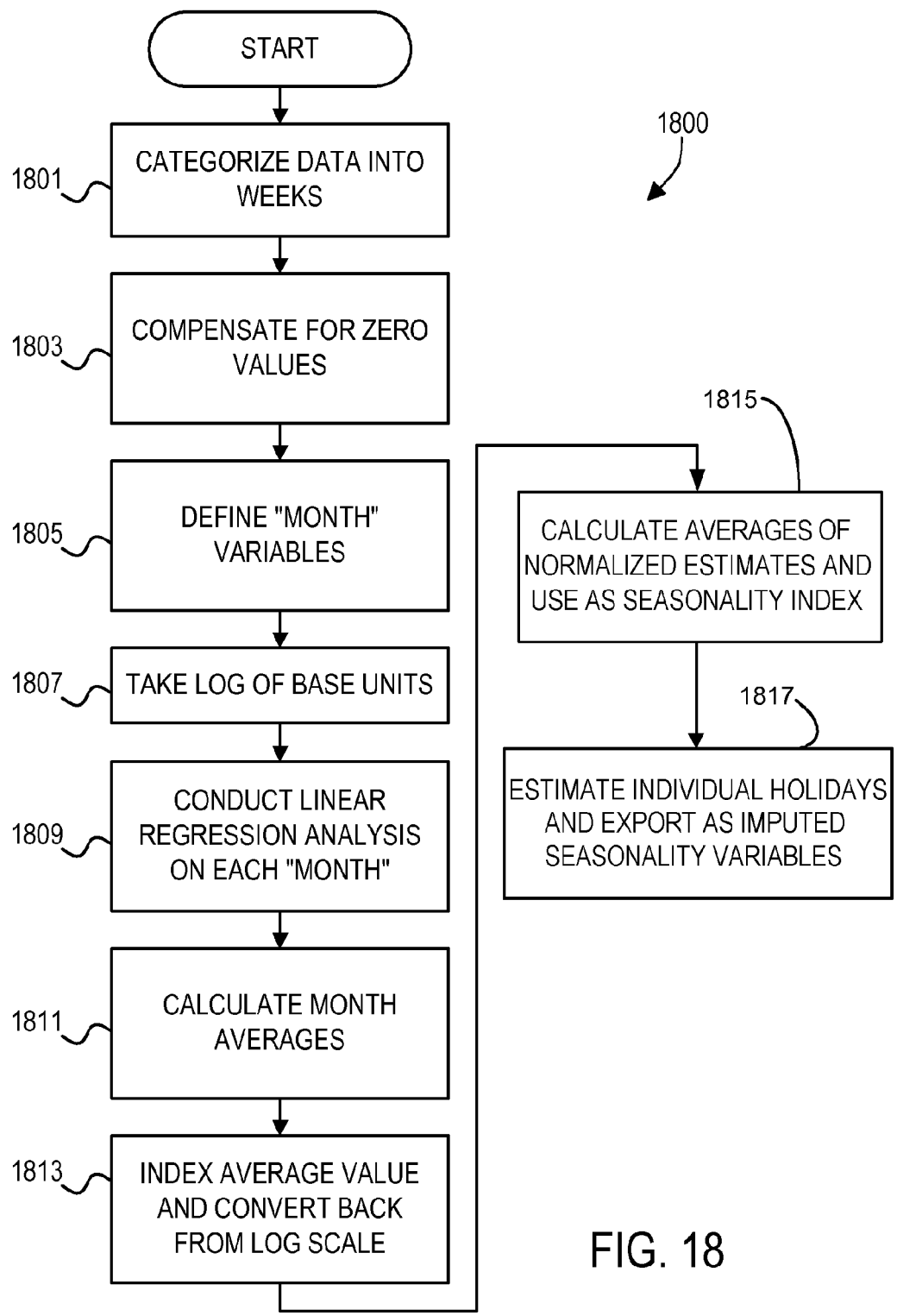
FIG. 18 is a flow chart depicting a process flow by which an imputed seasonality variable can be generated in accordance with an embodiment of the present invention.

Another useful imputed variable is an imputed seasonality variable for determining seasonal variations in sales volume. Referring to FIG. 18, a flowchart 1800 illustrating one embodiment in accordance with the present invention for determining an imputed seasonality variable is shown. The process begins with categorizing the data into weekly data records, if necessary (Step 1801). Zero values and missing records are then compensated for (Step 1803). "Month"

variables are then defined (Step 1805). A logarithm of base units is then taken (Step 1807). Linear regressions are performed on each "Month" (Step 1809). "Months" are averaged over a specified dimension (Step 1811). Indexes are averaged and converted back from log scale to original scale (Step 1813). The average of normalized estimates are calculated and used as Seasonality index (Step 1815). Individual holidays are estimated and exported as imputed seasonality variables (Step 1817).

H. Imputed Promotional Variable

Figure 19:
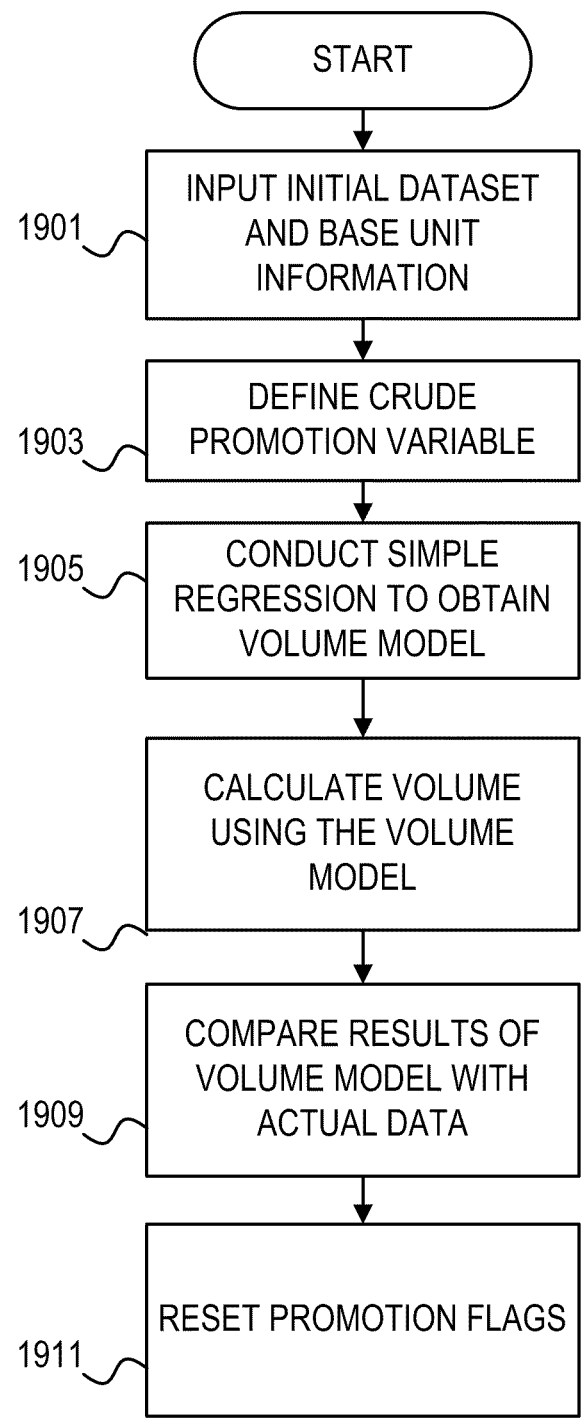
FIG. 19 is a flow chart depicting a process flow by which an imputed promotional effects variable can be generated in accordance with an embodiment of the present invention.

Another useful variable is a variable which can predict promotional effects. FIG. 19 provides a flowchart illustrating an embodiment enabling the generation of imputed promotional variables in accordance with the principles of the present invention. Such a variable can be imputed using actual pricing information, actual product unit sales data, and calculated value for average base units (as calculated above). This leads to a calculation of an imputed promotional variable which takes into consideration the entire range of promotional effects.

Referring back to FIG. 19, the process begins by inputting the cleansed initial dataset and the calculated average base units information (Step 1901). A crude promotional variable is then determined (Step 1903). Such a crude promotional variable can be defined using promotion flags. A simple regression analysis, as is known to those having ordinary skill in the art, (e.g., a mixed effects regression) is run on sales volume to obtain a model for predicting sales volume (Step 1905). Using the model, a sample calculation of sales volume is performed (Step 1907). The results of the model are compared with the actual sales data to further refine the promotion flags (Step 1909). If the sales volume is under predicted (by the model) by greater than some selected percentage (e.g., 30-50%), the promotion flag may be set to reflect the effects of a probable non-discount promotional effect. Since the remaining modeled results more closely approximate actual sales behavior, the promotion flags for those results are not reset (Step 1911). The newly defined promotion flags are incorporated into a new model for defining the imputed promotional variable.

I. Imputed Cross-Elasticity Variable

Figure 20:
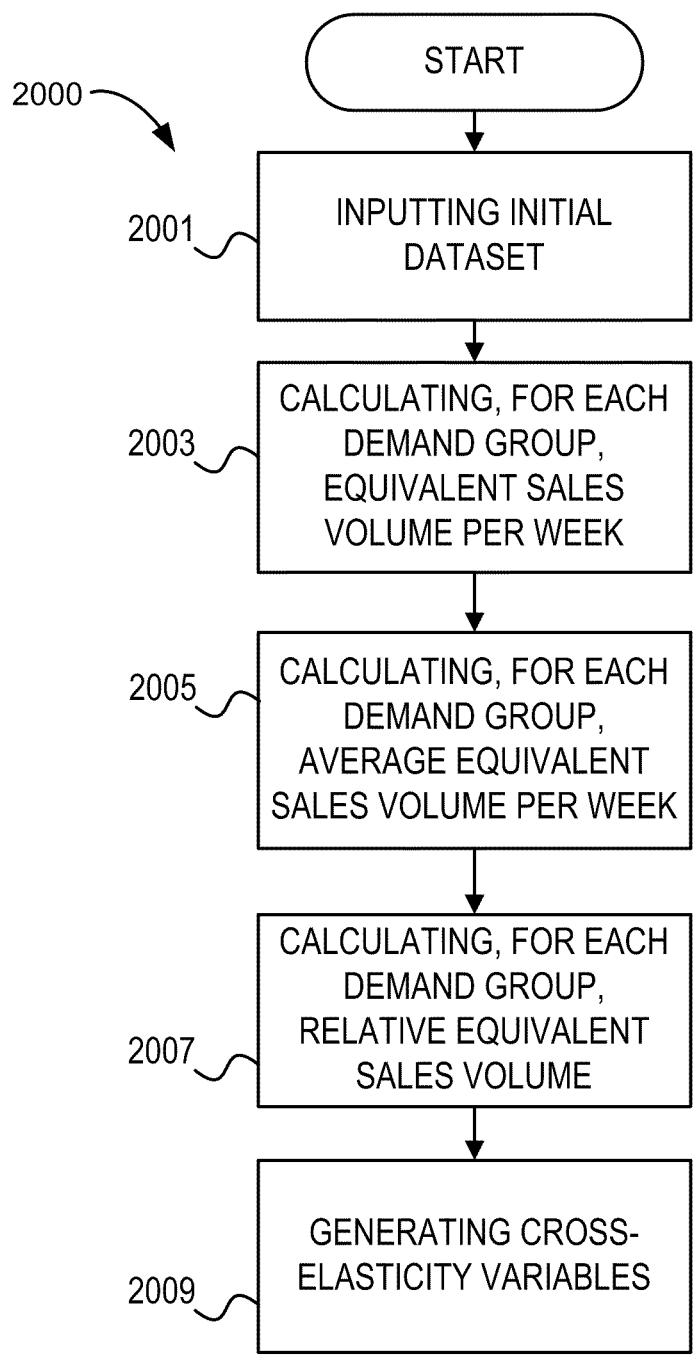
FIG. 20 is a flow chart depicting a process flow by which an imputed cross-elasticity variable can be generated in accordance with some embodiment of the present invention.

Another useful variable is a cross-elasticity variable. FIG. 20 depicts a flowchart 2000 which illustrates the generation of cross-elasticity variables in accordance with the principles of the present invention. The generation of an imputed cross-elasticity variable allows the analysis of the effects of a demand group on other demand groups within the same category. Here, a category describes a group of related demand groups which encompass highly substitutable products and complementary products. Typical examples of categories at a grocery retailer are, among many others, Italian foods, breakfast foods, or soft drinks.

The initial dataset information is input into the system (Step 2001). For each demand group the total equivalent sales volume for each store is calculated for each time period (for purposes of this illustration the time period is a week) during the modeled time interval (Step 2003). For each week and each demand group, the average total equivalent sales volume for each store is calculated for each week over the modeled time interval (Step 2005). For each demand group the relative equivalent sales volume for each store is calculated for each week (Step 2007). The relative demand group equivalent sales volume for the other demand groups is quantified and treated as a variable in the calculation of sales volume of the first demand group, thereby generating cross-elasticity variables (Step 2009).

The calculated imputed variables and data are outputted from the Imputed Variable Generator 304 to the Coefficient Estimator 308. Some of the imputed variables may also be provided to the Financial Model Engine 108.

B. Coefficient Estimator

The Coefficient Estimator 308 uses the imputed variables and data to estimate coefficients, which may be used in an equation to predict demand. In a preferred embodiment of the invention, sales for a demand group (S) is calculated and a market share (F) for a particular product is calculated, so that demand (D) for a particular product is estimated by $D=S \cdot F$. A demand group is defined as a collection of highly substitutable products. In the preferred embodiments, the imputed variables and equations for sales (S) of a demand group and market share (F) are as follows:

1. Modeling Framework

The econometric modeling engine uses one or more of statistical techniques, including, but not limited to, linear and non-linear regressions, hierarchical regressions, mixed-effect models, Bayesian techniques incorporating priors, and machine learning techniques. Mixed-effect models are more robust with regards to missing or insufficient data. Further, mixed-effect models allows for a framework of sharing information across various subjects in the model, enabling better estimates. Bayesian techniques with prior information can incorporate all the features of the mixed effect models and, in addition, also enable for guiding the allowable values of the coefficients based upon existing information.

IV. Financial Model Engine

The Financial Model Engine 108 receives data from the Stores 124 and may receive imputed variables (such as baseline sales and baseline prices) and data from the Econometric Engine 104 to calculate fixed and variable costs for the sale of each item.

Figure 5:
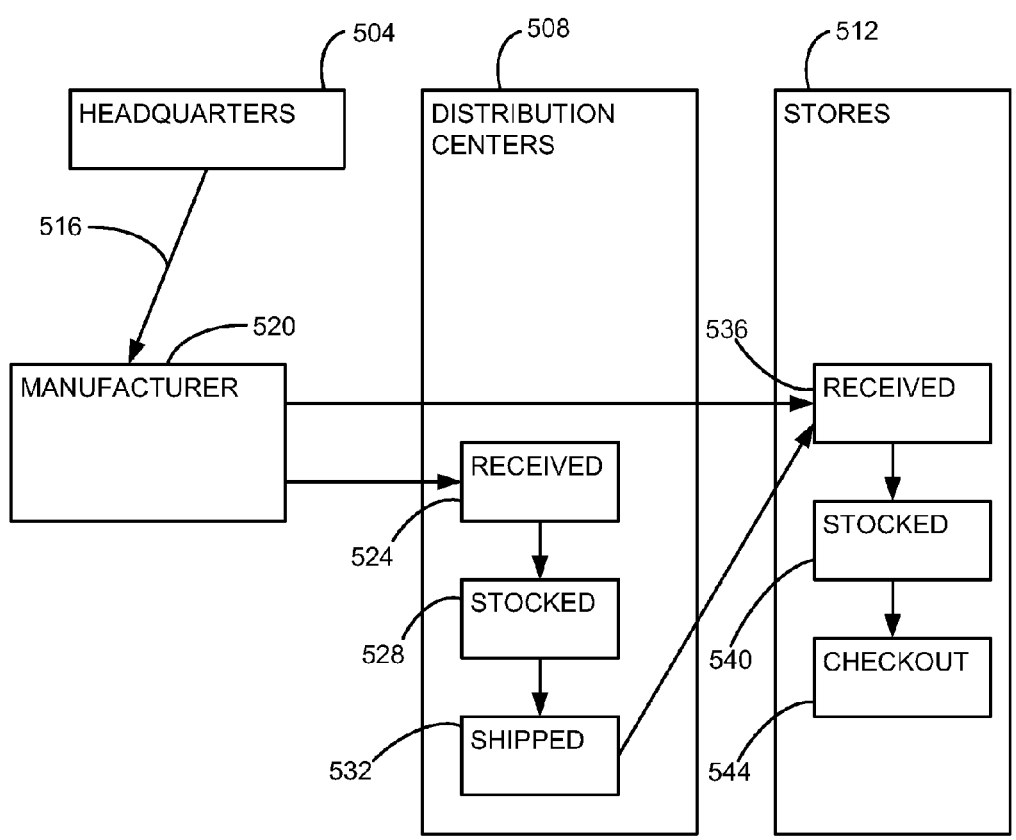
FIG. 5 is a block diagram to illustrate some of the transaction costs that occur in retail businesses of a chain of stores.

To facilitate understanding, FIG. 5 is an exemplary block diagram to illustrate some of the transaction costs that occur in retail businesses of a chain of stores. The chain of stores may have a headquarters 504, distribution centers 508, and stores 512. The headquarters 504 may place an order 516 to a manufacturer 520 for goods supplied by the manufacturer 520, which generates an order placement cost. The manufacturer 520 may ship the goods to one of the distribution centers 508. The receiving of the goods by the distribution center 508 generates a receiving cost 524, a cost for stocking the goods 528, and a cost for shipping the goods 532 to one of the stores 512. The store 512 receives the goods from one of the distribution centers 508 or from the manufacturer 520, which generates a receiving cost 536 and a cost for stocking the goods 540. When a customer purchases the item, the stores 512 incur a check-out cost 544.

The Financial Model Engine 108 should be flexible enough to provide a cost model for these different procedures. These different costs may have variable cost components where the cost of an item is a function of the amount of sales of the item and fixed cost components where the cost of an item is not a function of the amount of sales of the item. Financial Model Engine 108, thus, may generate a model that accounts for procurement costs in addition to the various costs associated with conducting business.

V. Optimization Engine and Support Tool

Figure 4:
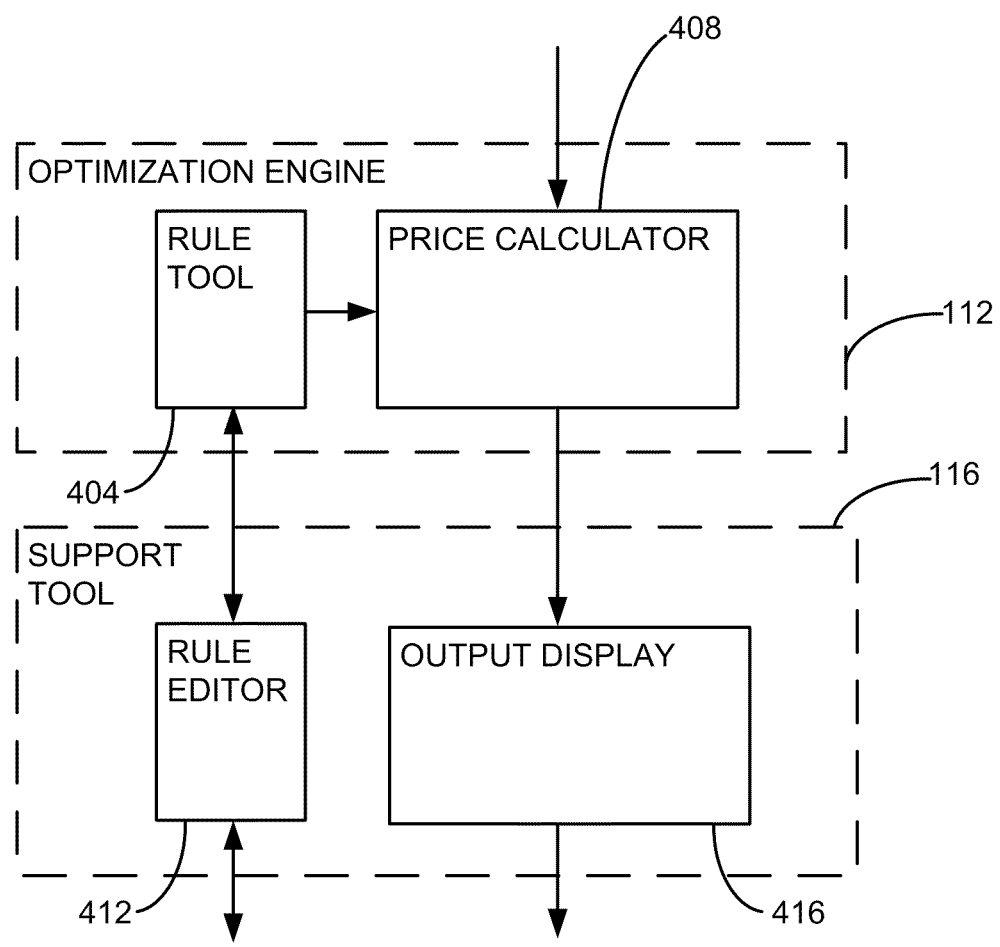
FIG. 4 is a more detailed schematic view of the optimization engine and support tool.

FIG. 4 is a more detailed schematic view of the Optimization Engine 112 and the Support Tool 116. The Optimization Engine 112 comprises a rule tool 404 and a price calculator 408. The Support Tool 116 comprises a rule editor 412 and an output display 416.

In operation, the client (stores 124) may access the rule editor 412 of the Support Tool 116 and provides client defined rule parameters. If a client does not set a parameter for a particular rule, a default value is used. Some of the rule parameters set by the client may be constraints to the overall weighted price advance or decline, branding price rules, size pricing rules, unit pricing rules, line pricing rules, and cluster pricing rules. The client defined parameters for these rules are provided to the rule tool 404 of the Optimization Engine 112 from the rule editor 412 of the Support Tool 116. Within the rule tool 404, there may be other rules, which are not client defined, such as a group sales equation rule. The rule parameters are outputted from the rule tool 404 to the price calculator 408. The demand coefficients 128 and cost data 136 are also inputted into the price calculator 408. The client may also provide to the price calculator 408 through the Support Tool 116 a desired optimization scenario rules. Some examples of scenarios may be to optimize prices to provide the optimum profit, set one promotional price and the optimization of all remaining prices to optimize profit, or optimized prices to provide a specified volume of sales for a designated product and to optimize price. The price calculator 408 then calculates optimized prices. The price calculator 408 outputs the optimized prices to the output display 416 of the Support Tool 116, which allows the Stores 124 to receive the optimized pricing.

VI. Markdown Plan Tuner

Figure 21:
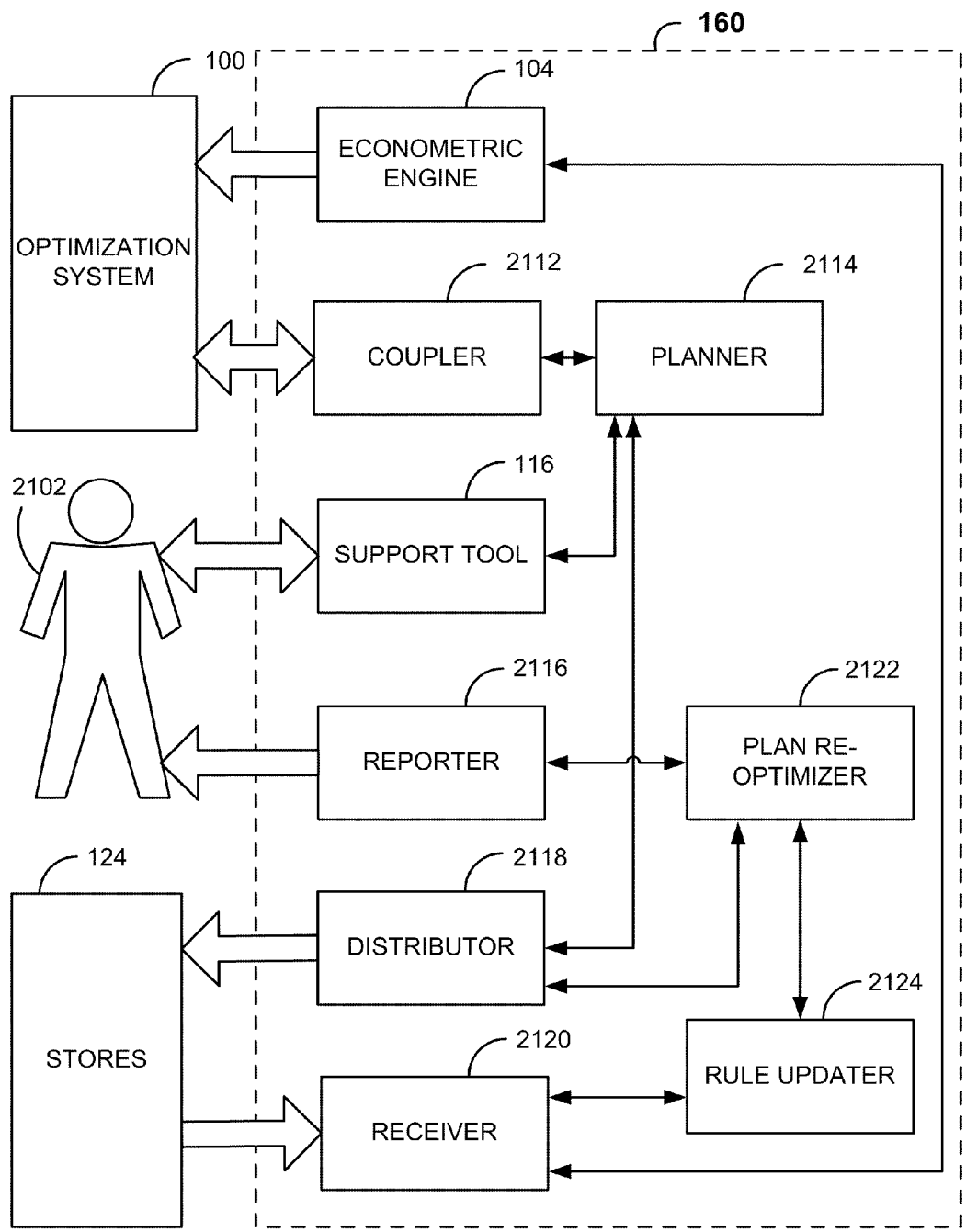
FIG. 21 shows an exemplary block diagram for the markdown plan tuner in accordance with some embodiment of the present invention.

FIG. 21 shows an exemplary block diagram for the Markdown Plan Tuner 160. Here the Markdown Plan Tuner 160 couples to the Optimization System 100, a User 2102 and the Stores 124. Markdown Plan Tuner 160 may, in some embodiments, include the Econometric Engine 104, the Support Tool 116, a Coupler 2112, a Planner 2114, a Reporter 2116, a Distributor 2118, a Receiver 2120, a Plan Re-optimizer 2122 and a Rule Updater 2124.

The Econometric Engine 104 may generate demand coefficients for the products using past sales data, or estimates generated from industry standards. These demand coefficients may be provided to the Optimization System 100 for generation of optimizations for the products pricing. The Optimization System 100 may then supply the pricing optimizations to the Planner 2114 via the Coupler 2112.

The User 2102 may provide rule configurations and business goals to the Support Tool 116. The rules may then be provided to the Planner 2114. The Planner 2114 may utilize the configured rules and pricing optimizations to generate a pricing plan for the products of the Stores 124. Plans may include pricing schedules, promotion schedules and discount schedules. The plan generated by the Planner 2114 may then be provided to the Distributor 2118 for dissemination and implementation by the Stores 124.

The Stores 124 may provide feedback POS data to a Receiver 2120. This data may be used to determine relative success of the markdown plan. The Receiver 2120 may provide this data to the Econometric Engine 104 and the Rule Updater 2124. The Econometric Engine 104 may provide new demand coefficients, where necessary. These demand coefficients may be used to provide a new set of price optimizations. The Rule Updater 2124 may update the configured rules. The rule updates along with the new price optimizations may then be provided to the Plan Re-optimizer 2122 where the plan is re-optimized. The re-optimized plan may be provided to the Stores 124 via the Distributor 2118. Also, the Reporter 2116 may provide a reoptimization report to the User 2102.

Figure 22:
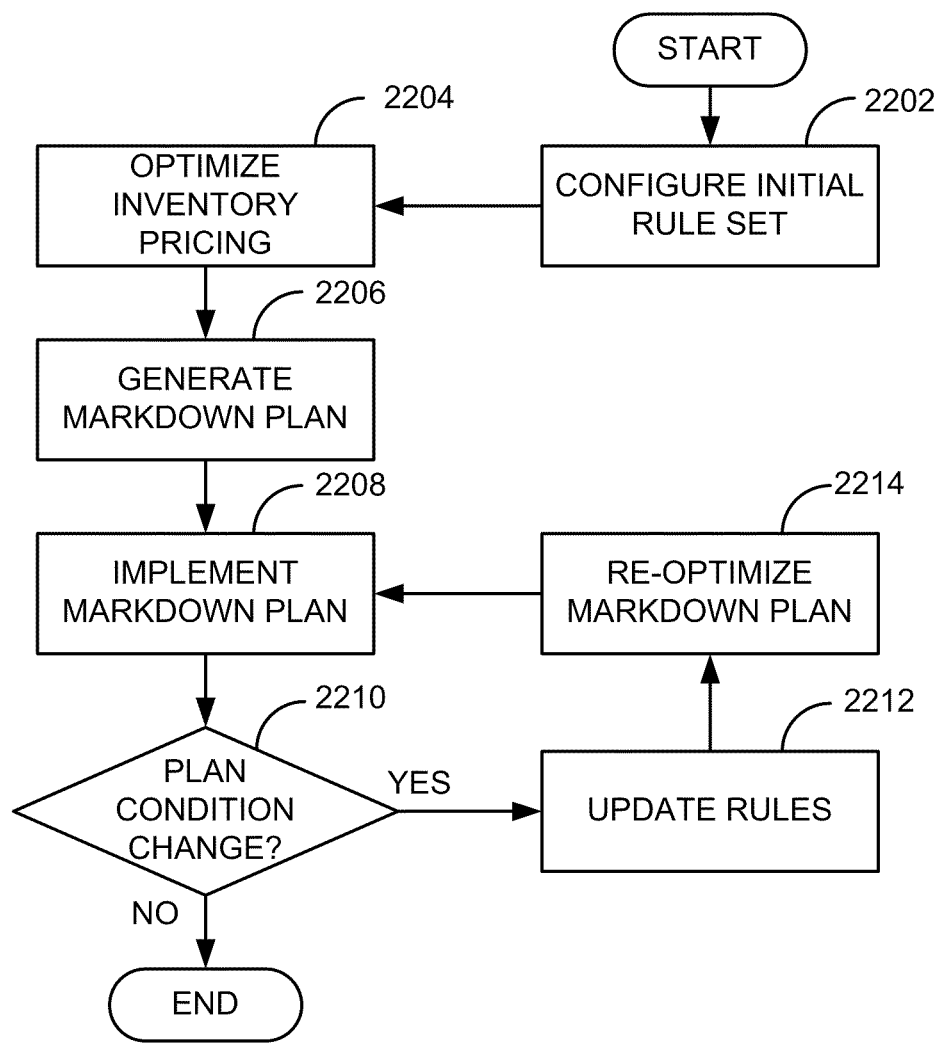
FIG. 22 shows a flow chart illustrating high level process for the generating and re-optimizing markdown plans in accordance with an embodiment of the present invention.

The embodiment illustrated at FIG. 22 includes reoptimization due to triggering events and includes markdown plan tuning. Here, the process begins and then progresses to step 2202 where initial rule sets are configured. Configuration of the initial rules may be preconfigured according to default standards.

Additionally, in some embodiments, the user may be able to select at least one plan "disposition", wherein each disposition includes a set of preconfigured defaults which enable the particular goals of the disposition. For example, an 'aggressive' disposition may have a default configuration which includes high thresholds, large markdown allowances and an emphasis in expansion of market share as a primary goal over profitability. Conversely, a 'conservative' disposition may be available. Such a configuration preset may include limited markdown allowances, and an emphasis on profitability.

Lastly, in some embodiments, the user may be able to manually configure the initial rules. In such embodiments, the user may configure each initial rule category individually. Alternatively, the user may select only particular rules in which to configure. In these situations, the rules not configured by the user may utilize the default preconfigured settings as explained above. In this way, the user may generate a personalized configuration scheme. In some embodiments, the user may be able to save this configured rule scheme for use on later planning sessions.

The process then proceeds to step 2204 where inventory pricing is optimized. Plan optimization may occur at the Optimization System 100 in the manner detailed in above. Optimization may be restrained by the initial rules that were configured at step 2202.

In some embodiments, the Optimization Engine 112 may be configured to generate Demand Coefficients 128 for each item in the store separately. Moreover, the Optimization Engine 112 may be configured to generate Demand Coefficients 128 for select subsets of products. Such subsets may include items that are to be discontinued, products in high demand, products with subpar performance, products with cost changes, or any other desired criteria.

Moreover, Demand Coefficients 128 may be generated for each product separately, or may generate more accurate Demand Coefficients 128 that take into account cross elasticity between products. While optimizing including cross elasticity effects may be more accurate, the processing requirements are greatly increased for such calculations. In some embodiments, the user may select whether to account for such cross elasticity effects. In some alternate embodiments, the Optimization System 100 may provide the user suggestions as to whether to account for such cross elasticity effects, or may even automatically determine whether to account for such cross elasticity effects.

In order to facilitate such a system of automated modeling equation decisions, every product may include an aggregate cross elasticity indicator. Said indicator may rapidly provide information as to the relative degree of cross elasticity any particular product is engaged in. For example, a product such as hamburger buns may include a high cross elasticity indicator, since sales of hamburger buns may exert a large degree of elasticity upon a number of other products such as charcoal, hamburger meat, ketchup and other condiments. Alternatively, apples may have a low relative cross elasticity indicator. The Optimization System 100 may aggregate the cross elasticity indicators of the products to be optimized. A threshold may be configured, and if the aggregate indicators are above the threshold then the set of products that are being optimized for may be assumed to have a relatively strong degree of cross elasticity effects. In such a situation, the Optimization System 100 may then opt to utilize models which include cross elasticity. Alternatively, the Optimization System 100 may simply utilize cross elasticity models when the optimization includes under a particular product number. This ensures that a large optimization is not helplessly mired in massive calculations.

After optimization, the process then proceeds to step 2206 where the initial plan is generated. The plan typically includes the optimization from step 2204 as restrained by the rule set from step 2202. The initial markdown plan may include a set of prices, promotions and markdown schedules for the products.

At step 2208 the markdown plan generated at step 2206 is implemented. Plan implementation may include dissemination of pricing to individual stores for posting to consumers. This may be done by having the planner send the plan to the stores 124 so that the stores carry out the plan. In one embodiment, the support tool provides a graphic user interface that provides a button that allows the planner to implement the plan. The support tool would also have software to signal to the stores to implement the plan. In another embodiment, software on a computer used by the planner would integrate the user interface of the support tool with software that allows the implementation of the plan displayed by the support tool by signaling to the stores to implement the plan. In some alternate embodiments, the pricing of the products may be automatically implemented, as is more typical for bulk and limited order sales, and in virtual, catalog or web-based store settings.

The process then proceeds to step 2210 where an inquiry is made as to whether there is a plan condition change that may warrant a markdown plan re-optimization. Such condition changes may include cost changes, divergence of actual sales from forecasts, business rule change, world event changes, product changes, or other condition changes. If there is a condition change the process then proceeds to step 2212 where the rules are updated. Rule updates may include reconfiguration of any of the rules that were set at step 2202. After rule update, the process proceeds to 2214 where the markdown plan is re-optimized. Re-optimization may include application of the updated rules to preexisting demand forecasts, or may include new forecast generation. Additionally, if all the rules cannot be satisfied, the system may be configured to selectively relax the lowest priority rules in order to satisfy the higher priority rules. Thus, the system also allows for the user to specify the relative hierarchy or importance of the rules. Selection on whether to regenerate product demand models for forecasts may depend heavily upon what kind of condition change warranted the re-optimization. For example, if the condition change includes a market-wide event, such as a hurricane, demand models may become invalid and new modeling and forecasts may be necessary. However, if the condition change is a cost change, or change of business policy, old forecasts may be still relevant and usable. After re-optimization of the markdown plan, this markdown plan may be implemented at step 2208, in the manner discussed above.

Markdown plan reoptimization allows for a long term markdown plan to be corrected over the short term. This enables corrections if the long term plan has an error, which in the short term may be less significant, but over the long term may be more significant.

As noted, current events may change the accuracy of a long term model. Such current events may be a change in the economy or a natural disaster. Such events may make a six-month markdown plan using data from the previous year less accurate. The ability to re-optimize the markdown plan on at least a weekly basis with data from the previous week makes the plan more responsive to current events.

Tuning and re-optimization of the markdown plan may, additionally, identify poor-performing promotions. The use of constant updates helps to recognize if such a plan creates business problems and also allows a short term tuning to avoid further damage. For example, a promotion plan may predict that a discount coupon for a particular product for a particular week will increase sales of the product by 50%. A weekly update will within a week determine the accuracy of the prediction and will allow a tuning of the plan if the prediction is significantly off.

The system may provide that if a long term markdown plan is accurate within a certain percentage, the long term markdown plan is not changed. In such embodiments, the system may allow an automatic reoptimization when a long term plan is not accurate within a certain percentage. In another embodiment, the planner may be allowed to decide whether the long term markdown plan is in enough agreement with the updated data so that the long term markdown plan is kept without re-optimization.

Else, if at step 2210 re-optimization of the markdown plan is not desired, the process then ends.

Figure 23:
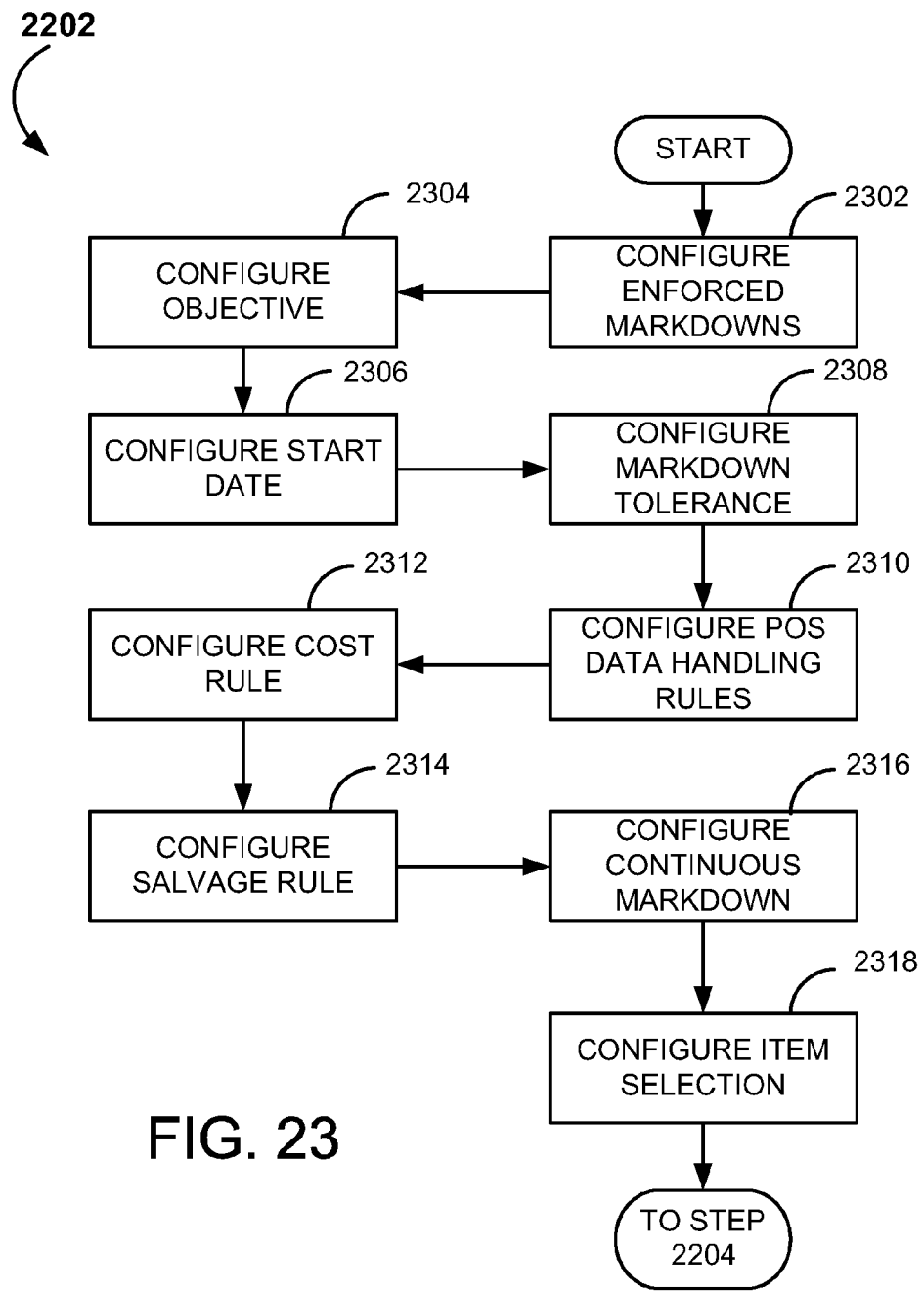
FIG. 23 shows a flow chart illustrating configuring the rules for markdown plan development in accordance with an embodiment of the present invention.

FIG. 23 shows a flow chart illustrating configuring the rules for markdown plan development, shown generally at 2202. The process begins from step 2302 where enforced markdowns are configured. Enforced markdowns include setting a markdown for a product during a particular time period. Markdown enforcements may be provided in terms of dollar amounts, or percentages.

The process then proceeds to step 2304 where the objective is configured. Objective may include the maximization of profits, or maximization of volume. When profit is maximized, it may be maximized for a sum of all measured products. Such a maximization may not maximize profit for each individual product, but may instead have an ultimate objective of maximizing total profit. Optionally, the user may select any subset from the universe of the products to measure profit maximization.

The process then proceeds to step 2306 where the start date is configured. Start date may include a price execution date, as well as markdown start dates. In some embodiments, users may want to be able to specify different markdown start dates for each store-group or product group. This means that in the same scenario, different store-SKUs may have to start their markdowns on different dates. This is slightly different from the price execution date. The price execution denotes the date by which they can get their prices into the store. A markdown prior to price execution is not relevant or practical since the retailers do not have time to take action on it.

Prior to the markdown start date, the system may use previously recommended prices. In some embodiments, previously recommended prices may simply be the initial prices; thus price may stay constant at the initial prices and there will be no markdowns. However, in re-optimization, the situation may arise where the previously recommended prices might contain a markdown. If the markdown start date has not changed between the first optimization and the re-optimization, previously recommended prices may stay constant. Else, if the markdown start-date is changed, a new optimization may be run, as opposed to a re-optimization.

The process then proceeds to step 2308 where the markdown tolerance may be configured. Markdown tolerance may be provided to the optimizer for generation of solution. In some embodiments, the optimizer may include a 3$^{rd}$ party solver, such as General Algebraic Modeling System (GAMS). A narrower tolerance may provide a more accurate optimization; however, the modeling may take longer and consume greater processing resources. On the other hand, a wider tolerance may provide a faster, rougher optimization. In some embodiments, a default tolerance may be provided, such as 95%.

The process then proceeds to step 2310 where the handling of Point-of-Sale (POS) data is configured. POS handling rules may come into play when there is missing, or otherwise deficient, POS data. In some embodiments, POS handling may be configured to utilize forecasts for the missing or deficient data. In some alternate embodiments, zero or place-marker values may be provided for these missing data points. POS data deficiencies may be the result of communication errors, or data transmission latency.

The process then proceeds to step 2312 where cost rule may be configured. Likewise, at step 2314, salvage rules may be configured. In many cases users want to be able to manage leftover inventory while getting rid of the excess inventory as profitably as possible. For example, during the holiday season the shelf space for baking goods (sugar, baking mixes, butter etc.) is expanded. After the holidays this space is reduced to everyday levels and there is a need to reduce the baking goods inventory to a lower everyday level. In some embodiments, users have the ability to specify what leftover inventory they should have at the stores to eliminate this holiday overstock.

Cost rules may limit markdown to the cost, or some percentage of the cost, of the product. This rule may become effective when a given product goes into closeout mode. Likewise, the salvage rule may provide the absolute minimum allowable price for markdown. This is the "last ditch" effort to recoup at least some portion of the cost when liquidating a product. The importance of a salvage rule includes that the retailer may have a better margin (or revenue) by selling the product at a salvage value than by marking it below the salvage value on the store shelves. Again, salvage rules may be dependent upon cost data, or some percentage thereof.

Alternatively, in some embodiments, a maximum lifetime markdown rule is also configured (not shown). The maximum lifetime markdown may be dependent upon some percentage of the initial price value. This value may represent the maximum discount level a particular manufacturer or retailer desires to have for a product. For some products considered "high end" it may be important that the purchasing public perceive the item as exclusive. Part of this image may include limits on discounts from the full price. In such instances, maximum lifetime markdowns may be of particular use.

Moreover, cost rules, salvage rules and maximum lifetime markdowns may be combined. In such instances the lower bound for the price may then be set to the mean of these rules, the median of the rules, or the highest or lowest threshold of these rules. The default may set the lower bound of the price to the highest of the cost salvage and maximum lifetime markdown rules, however, this rule combination may be configurable.

The process then proceeds to step 2316 where continuous markdown may be configured. Continuous markdown may include a markdown limit which may be configured. The optimizer may then set the markdown to any amount within the markdown limit, as is desired to fulfill a particular goal. Configuring the markdown limits may include setting limits as to the allowed degree of a markdown. These limits may include an upper as well as lower limit. Markdown limits may be provided in terms of dollar amounts, percentages, or may be tied to external data such as cost data and competitor pricing.

In some embodiments, a steepest markdown may be configured (not shown). Steepest markdown may limit the rate of markdown for a particular product. For example, the steepest markdown may be configured to be a maximum of a 5% drop over any week period. Thus, in this example, even if a 10% markdown is optimal, the first week may be a 5% markdown and then at the second week the markdown may be increased to 10%.

Likewise, in some embodiments, markdown timing may be configured (not shown). Configuring markdown timing may restrict the number of times markdowns may occur in a given time period. This may prevent markdowns from occurring too close together.

The process then proceeds to step 2318 where item selection is configured. Item selection may include user choice of products for optimization and/or re-optimization. Item selection may be user configured for each individual product, by grouping of related products, or by store levels. In some embodiments, item selection may be automated, such that items are selected by certain trigger events. Such events may include cost changes in the product, seasonality effects, competitor action, or any additional criteria.

In some embodiments, sell-through may additionally be configured (not shown). Configuring sell-through may include setting a percentage of starting inventory that is required to be sold by a certain date. For example, the user may configure a particular product to sell at least 80% of the starting inventory within a two week period. Such a rule may apply pressures to the volume maximization functions within the optimizer. Sell-through may be configured as a percentage of the original inventory, or as a number of products (i.e., sell 50,000 widgets in the first quarter).

The process then concludes by progressing to step 2204 of FIG. 22.

Figure 24:
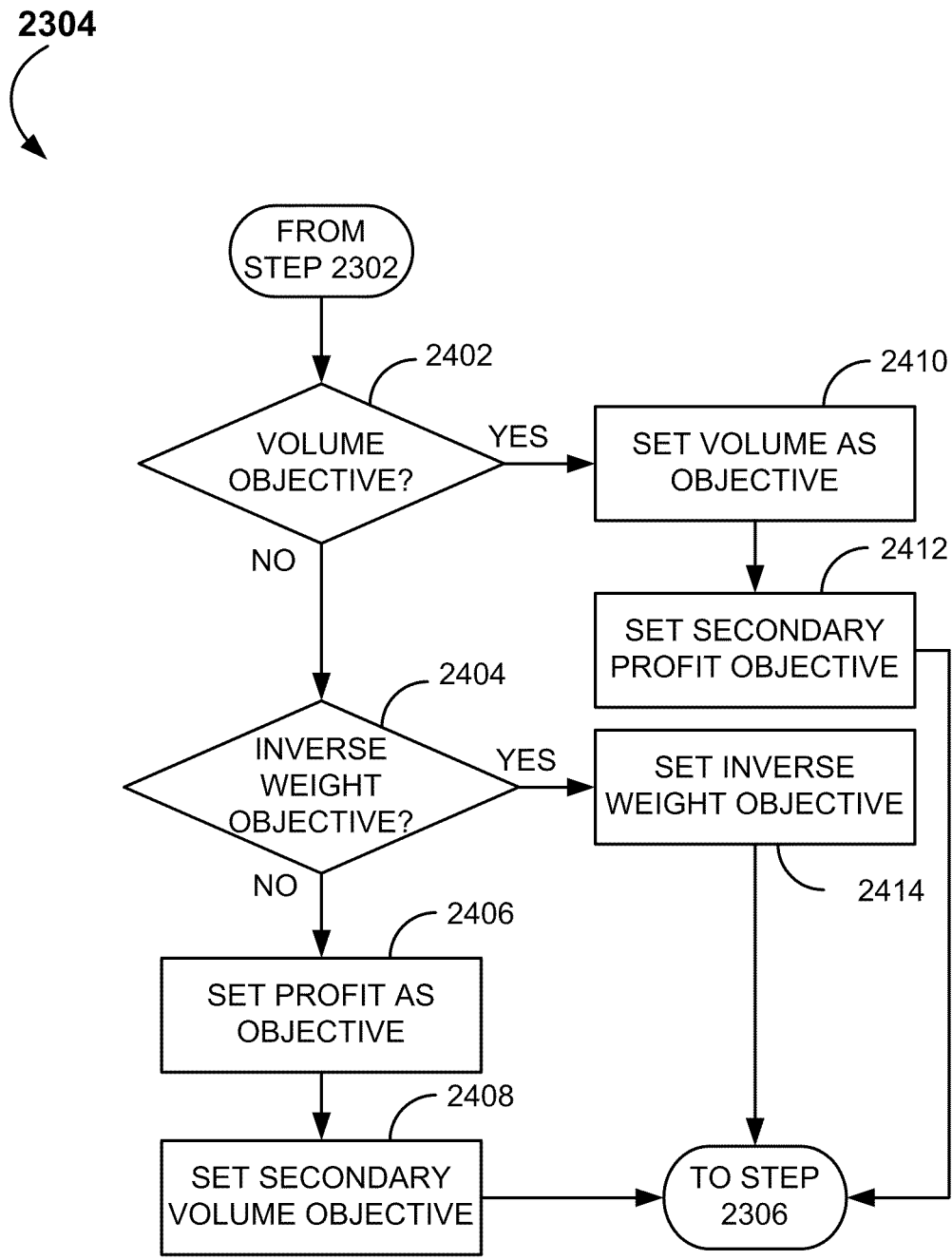
FIG. 24 shows a flow chart illustrating markdown objective configuration in accordance with an embodiment of the present invention.

FIG. 24 shows a flow chart illustrating objective configuration, shown generally at 2304. The process begins from step 2302 of FIG. 23. The process then proceeds to step 2402 where an inquiry is made as to whether a volume objective is desired. A volume objective will set sales volume as the primary objective, at step 2410. Profit will then be set as a secondary objective at step 2412. The process then concludes by progressing to step 2306 of FIG. 23. Volume as the primary objective may be desired when a company is aggressively attempting to dominate a market, or otherwise increase market share. This tactic may be of particular use when introducing a new product line. A volume objective may rely heavily upon minimal markdown limits, as configured in FIG. 23.

Else, if at step 2402 volume is not the desired primary objective, the process then proceeds to step 2404 where an inquiry is made as to whether an inverse weight objective is desired. Inverse weighting provides a primary profit maximization goal; however, as time progresses the secondary objective, maximizing volume, may be given increasing weight. This enables greater sell through over time. Inverse weighting will be discussed below in more detail at FIG. 25.

If inverse weight objective is desired, the process then proceeds to step 2414 where the inverse weighting objective is applied. The process then concludes by progressing to step 2306 of FIG. 23.

Otherwise, if at 2404 an inverse weighting function is not desired, the process then proceeds to step 2406 where profit is set as the primary objective. Volume is set as the secondary objective at step 2408. The process then concludes by progressing to step 2306 of FIG. 23.

Figure 25:
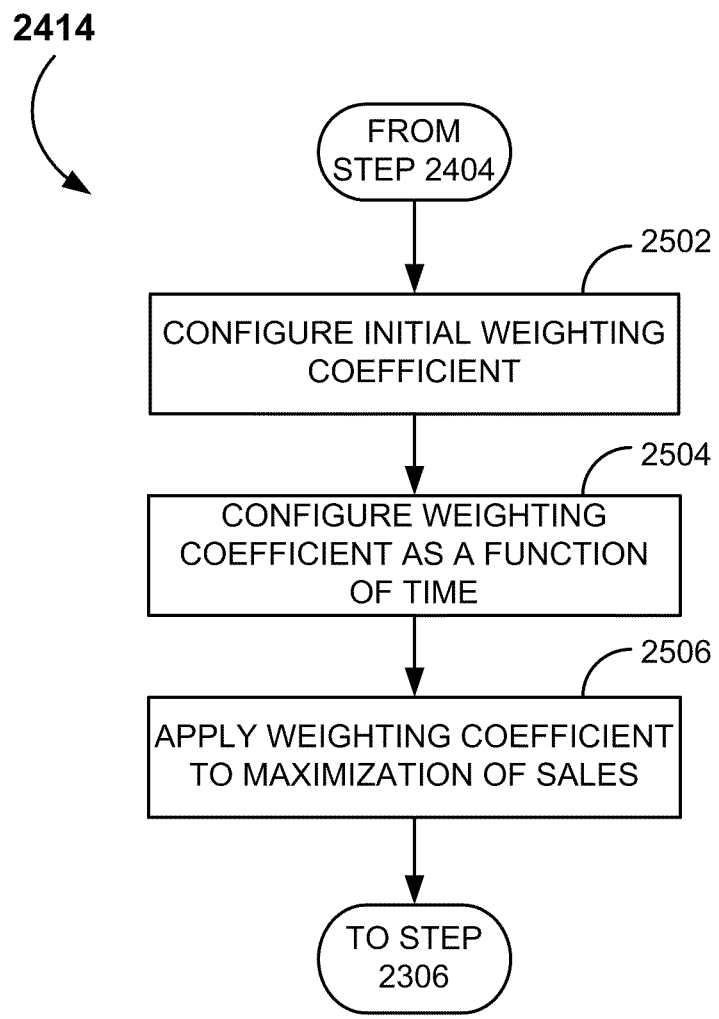
FIG. 25 shows a flow chart illustrating setting inverse weighting objectives for the markdown plan in accordance with an embodiment of the present invention.

FIG. 25 shows a flow chart illustrating setting inverse weighting objectives, shown generally at 2414. As noted above, inverse weighting provides a primary profit maximization goal; however, as time progresses the secondary objective, maximizing volume, may be given increasing weight. This enables greater sell through over time. An example of an inverse weighting function may be seen below:

$$VOLthenPFT = \max \sum_t W(t) * SalesVol(t)$$

In this example, VolthenPFT is the inverse weighting function. The SalesVol (or SalesVol(t)) term refers to the sales objective. The added argument t indicates the allowance for simple of complicated dependence on time dimension. Note that implicitly the summation would typically cover other dimensions such as over the product-set, store-set etc. This sales objective is multiplied by the weighting coefficient, W (or W(t) The argument t denotes dependence on time). This weighting coefficient, W(t), may be a linear function dependent upon time. In some embodiments, weighting coefficient, W, may be a more complicated weighting function that incorporates time, sell-through rates, events, POS data adhesion to forecasts, or any other desired factor. In some embodiments, the weighting coefficient may be based upon image values for the products, or may be based upon role category the product belongs to. The generation of image values and role analysis will be described in more detail below in relation to the Role Analyzer 150. The sales objective multiplied by the weighting coefficient may then be summed, and the maximum may be taken to give the inverse weighting function.

For FIG. 25 the generation of a basic time-dependent weighting coefficient, W, is provided. The process begins from step 2404 of FIG. 24. The process then proceeds to step 2502 where the initial weighing coefficient is configured. This initial weighing coefficient provides the strength of the volume maximizing objective at the outset of the application of the inverse weighting objective. For example, an initial weighing coefficient of zero would make the objective purely profit maximizing at the outset. Conversely, a large initial weighing coefficient would make the objective more strongly volume maximizing at the outset. As noted, in some embodiments the weighting coefficient may be based upon image values for the products, or may be based upon role category the product belongs to.

The process then proceeds to step 2504 where the weighting coefficient, W, is configured as a function of time. As previously mentioned, weighting coefficient, W, may additionally be configured to incorporate sell-through rates, events, POS data adhesion to forecasts, or any other desired factor. Thus, the weighting coefficient, W, may be a function comprised of the initial weighing coefficient plus any time, or other factor, dependencies.

The process then proceeds to step 2506 where the weighting coefficient, W, is applied to maximization of sales. That is, to multiply the weighting coefficient, W, by the sales volume and take the maximum of the resulting sum.

The process then concludes by progressing to step 2306 of FIG. 23.

Figure 26:
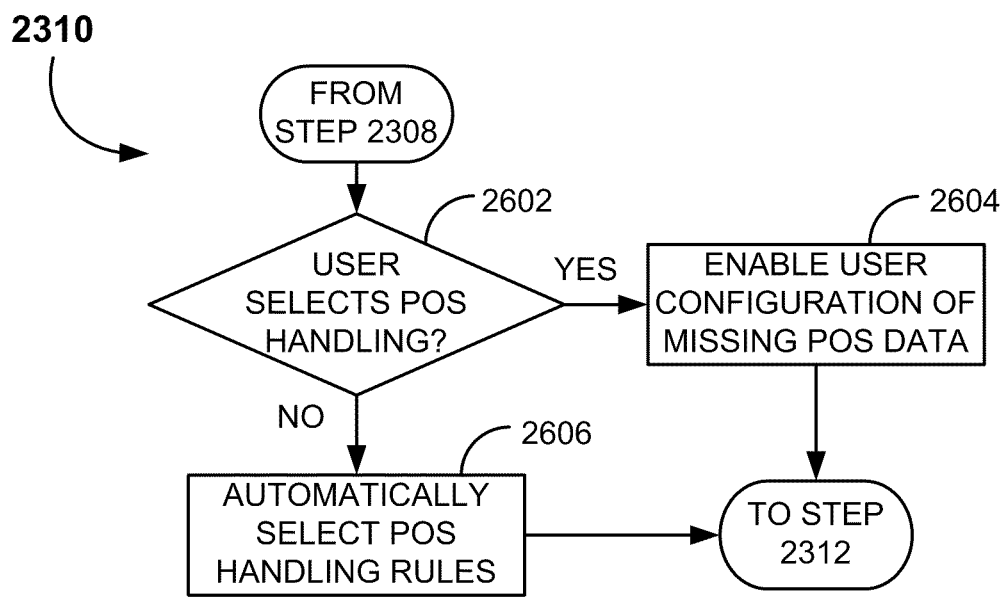
FIG. 26 shows a flow chart illustrating configuring rules for handling point of sales data for the markdown plan model refresh in accordance with an embodiment of the present invention.

FIG. 26 shows a flow chart illustrating configuring rules for handling point of sales data, shown generally at 2310. The process begins from step 2308 of FIG. 23. The process then proceeds to step 2602 where an inquiry is made as to whether the user selects POS handling rules. If the user selects POS handling rules the process then proceeds to step 2604 where the user is enabled to configure any POS data. In some embodiments, the user may be able to manually enter missing POS data, or may select from forecast data, zero, or a place-marker. The process then concludes by progressing to step 2312 of FIG. 23.

Else, if at step 2602 the user does not desire to select POS handling, then the process proceeds to step 2606 where POS handling rules are automatically selected. The process then concludes by progressing to step 2312 of FIG. 23. For automatic POS handling selection, a default may be utilized, such as to always utilize forecast data. In some embodiments, however, it may be desirable to have a system which sometimes utilizes forecasts, and at other times replaces missing data with a zero value. For example, if data is provided from a retailer for the majority of products, yet data regarding other products is missing, it may be desirable to enter zero values for those products. This may be desirable since this gap in seemingly complete data may, in fact, reflect a lack of sales for the product during the reporting duration.

Figure 27:
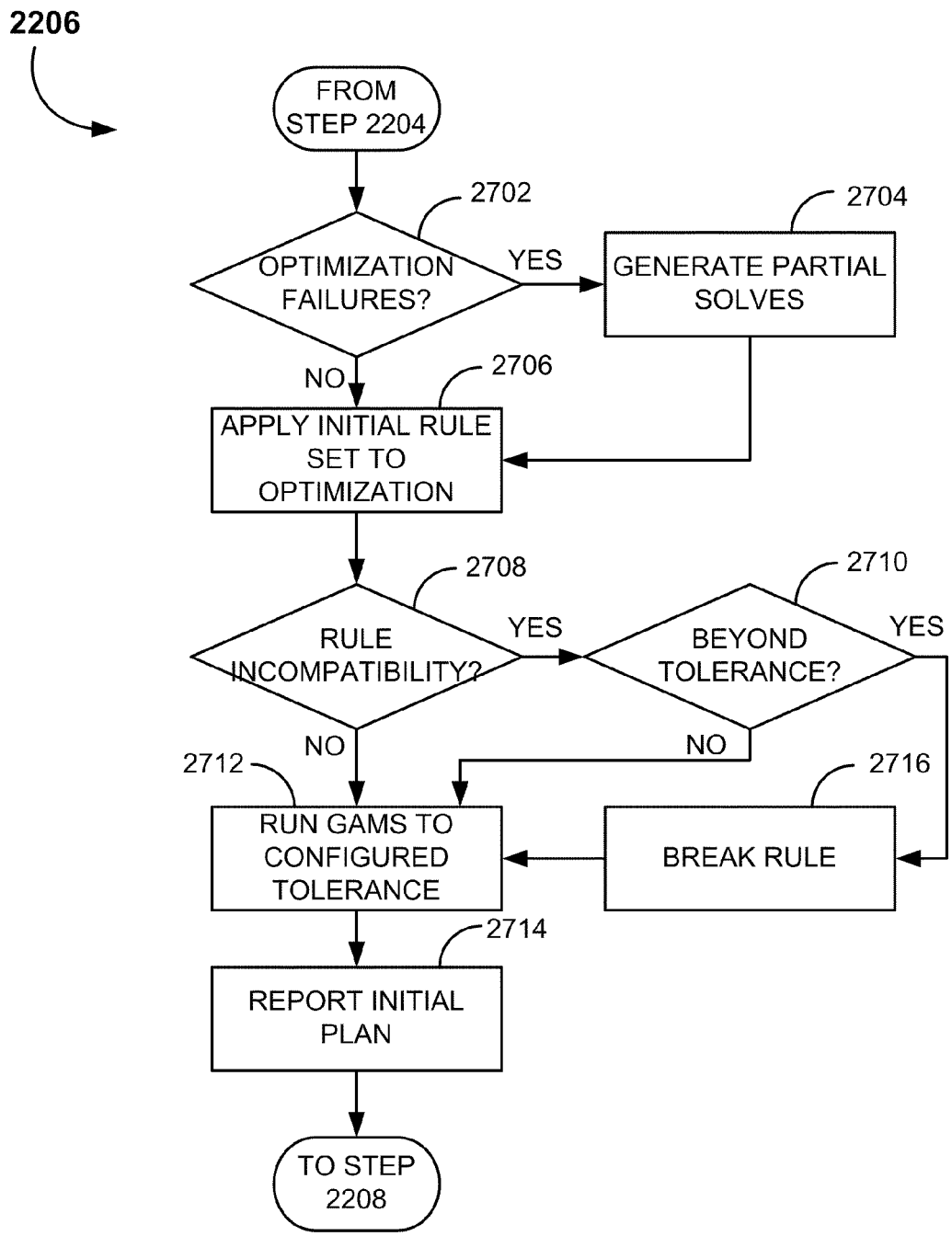
FIG. 27 shows a flow chart illustrating markdown plan generation in accordance with an embodiment of the present invention.

FIG. 27 shows a flow chart illustrating markdown plan generation, shown generally at 2206. The process begins from step 2204 of FIG. 22. The process then proceeds to step 2702 where an inquiry is made as to whether there is an optimization failure. If there is an optimization failure, a partial solve may be implemented at step 2704. Partial solves are made possible by segmenting product calculations. The process then proceeds to step 2706 where initial rule set, as configured at FIG. 20, is applied to the optimization.

Else, if at step 2702 there is no optimization failure, the initial rule set, as configured at FIG. 23, may be applied to the complete optimization, at step 2706. Then, at step 2708, an inquiry is made as to whether there is a rule incompatibility. If there are no incompatibilities, a GAMS run may be performed to the configured tolerance at step 2712.

Else, if a rule incompatibility exists the process then proceeds to step 2710 where an inquiry is made as to whether the rule incompatibility is beyond a tolerance level. If the incompatibility is below the tolerance, then GAMS may be run on the configured tolerance, at step 2712. This enables minor rule incompatibilities to be overlooked.

Otherwise, if at step 2710 the incompatibility is beyond tolerance then the process then proceeds to step 2716 where the rule is broken. In some embodiments, this may occur through rule relaxation, wherein rules are prioritized and the least priority rule which resolves the conflict is incrementally relaxed. The process then proceeds to step 2712 where a GAMS run may be performed to the configured tolerance. The GAMS run may result in a markdown plan which may be reported at step 2714. The process then concludes by progressing to step 2208 of FIG. 22.

Figure 28:
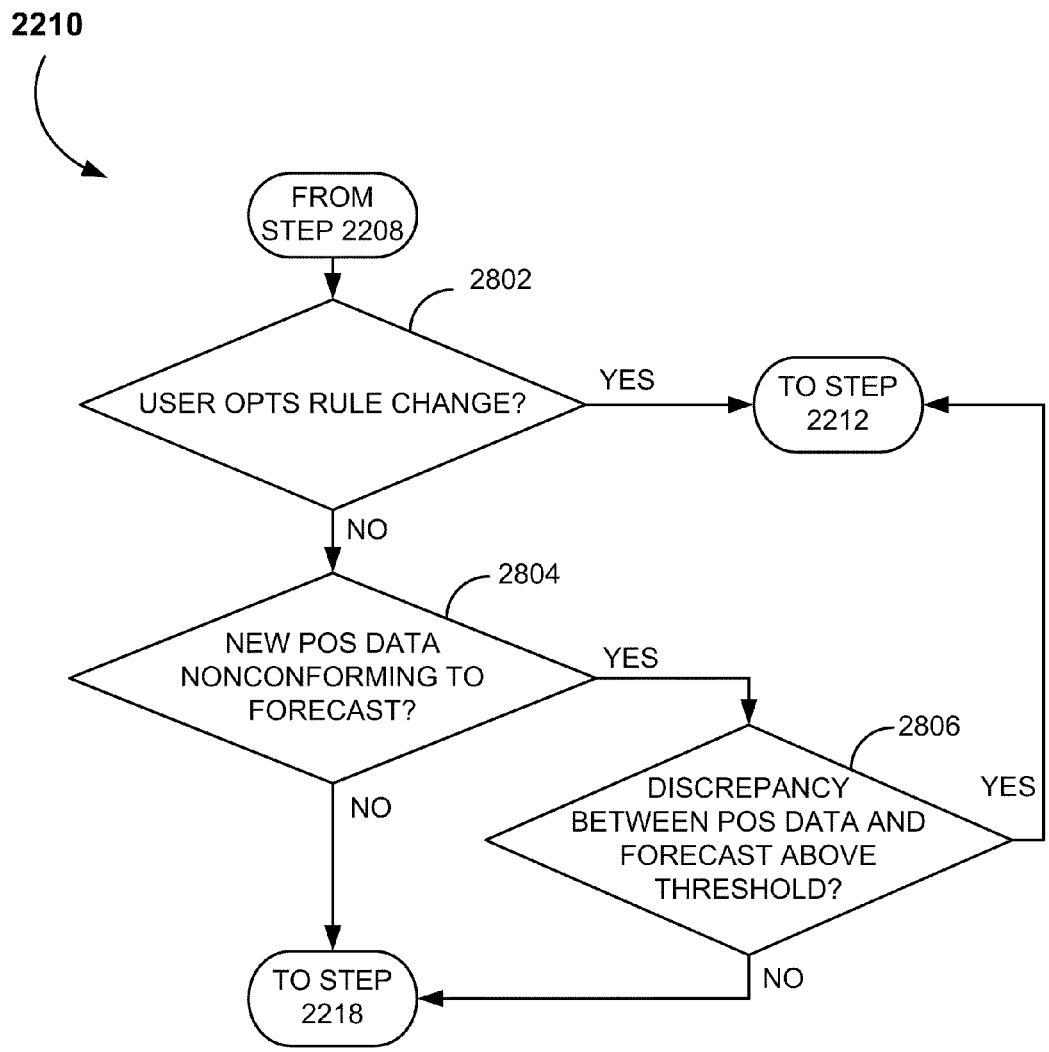
FIG. 28 shows a flow chart illustrating determination of markdown plan change in accordance with an embodiment of the present invention.

FIG. 28 shows a flow chart illustrating determination of plan change, shown generally at 2210. The process begins from step 2208 of FIG. 22. The process then proceeds to step 2802 where an inquiry is made as to whether the user opts to change rule configurations. If the user changes the rule configurations, the process concludes by progressing to step 2212 of FIG. 22.

Else, if the user is not choosing to change rule configuration, the process then proceeds to step 2804 where an inquiry is made as to whether new POS data is provided which is does not conform to the forecast. This may occur when there is an unexpected event, or when the demand models used to develop the forecasts are deficient. If the new POS data conforms to forecast data, the process then concludes by progressing to step 2218 of FIG. 22.

Otherwise, if the new POS data is nonconforming to forecasts, then the process proceeds to step 2806 where an inquiry is made as to whether the discrepancy between POS data and forecasts are above a threshold. By checking against a threshold, minor deviations between POS data and forecasts may be ignored. However, discrepancies deemed significant may prompt a model refresh and a pricing markdown plan re-optimization. Thus, if the discrepancy is below the threshold, the process may conclude by progressing to step 2218 of FIG. 22. Else, if the discrepancy between POS data and forecasts is above the threshold, the process may conclude by progressing to step 2212 of FIG. 22.

Figure 29:
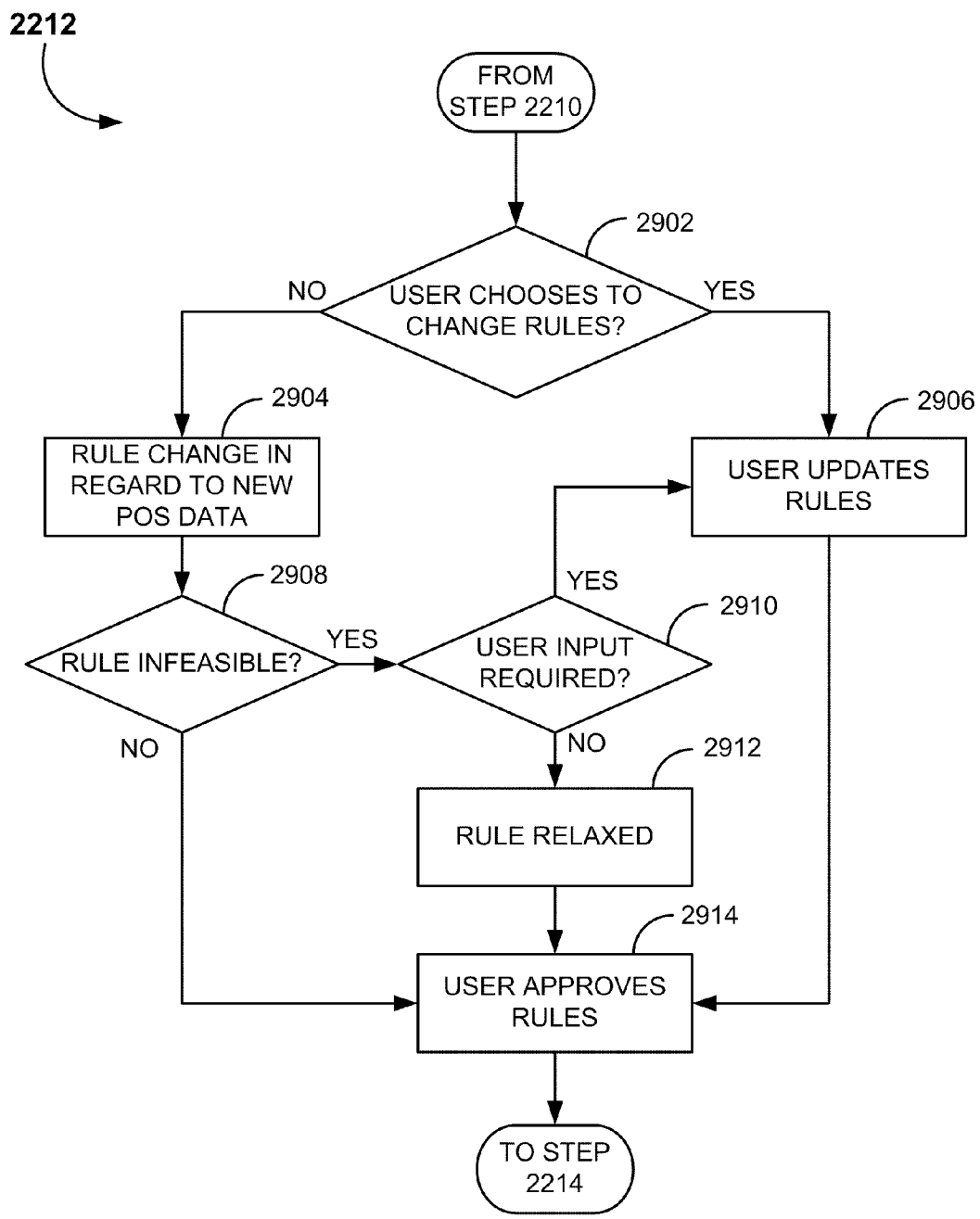
FIG. 29 shows a flow chart illustrating markdown plan rule updating in accordance with an embodiment of the present invention.

FIG. 29 shows a flow chart illustrating rule updating, shown generally at 2212. The process begins from step 2210 of FIG. 22. The process then proceeds to step 2902 where an inquiry is made as to whether the user chooses to change rules. If the user chooses to change the rules, then the process proceeds to step 2906 where the user updates the rules. The process then proceeds to step 2914 where final rule set is approved by the user. The process then concludes by progressing to step 2214 of FIG. 22.

Else, if at step 2902 the user did not choose to reconfigure the rules, the process then proceeds to step 2904 where any rules that require changes due to new POS data is reconfigured. The process then proceeds to step 2908 where an inquiry is made as to whether the rule change is infeasible. If the new rule set is feasible, the process then proceeds to step 2914 where final rule set is approved by the user. The process then concludes by progressing to step 2214 of FIG. 22.

Otherwise, if the new rule set is found infeasible at step 2908, the process then proceeds to step 2910 where an inquiry is made as to whether user input is required. If user input is required, the process then proceeds to step 2906, where the user updates the rules. The process then proceeds to step 2914 where final rule set is approved by the user. The process then concludes by progressing to step 2214 of FIG. 22.

Else, if user input is not required, the process then proceeds to step 2912, where rules are relaxed. The process then proceeds to step 2914 where final rule set is approved by the user. The process then concludes by progressing to step 2214 of FIG. 22.

Figure 30:
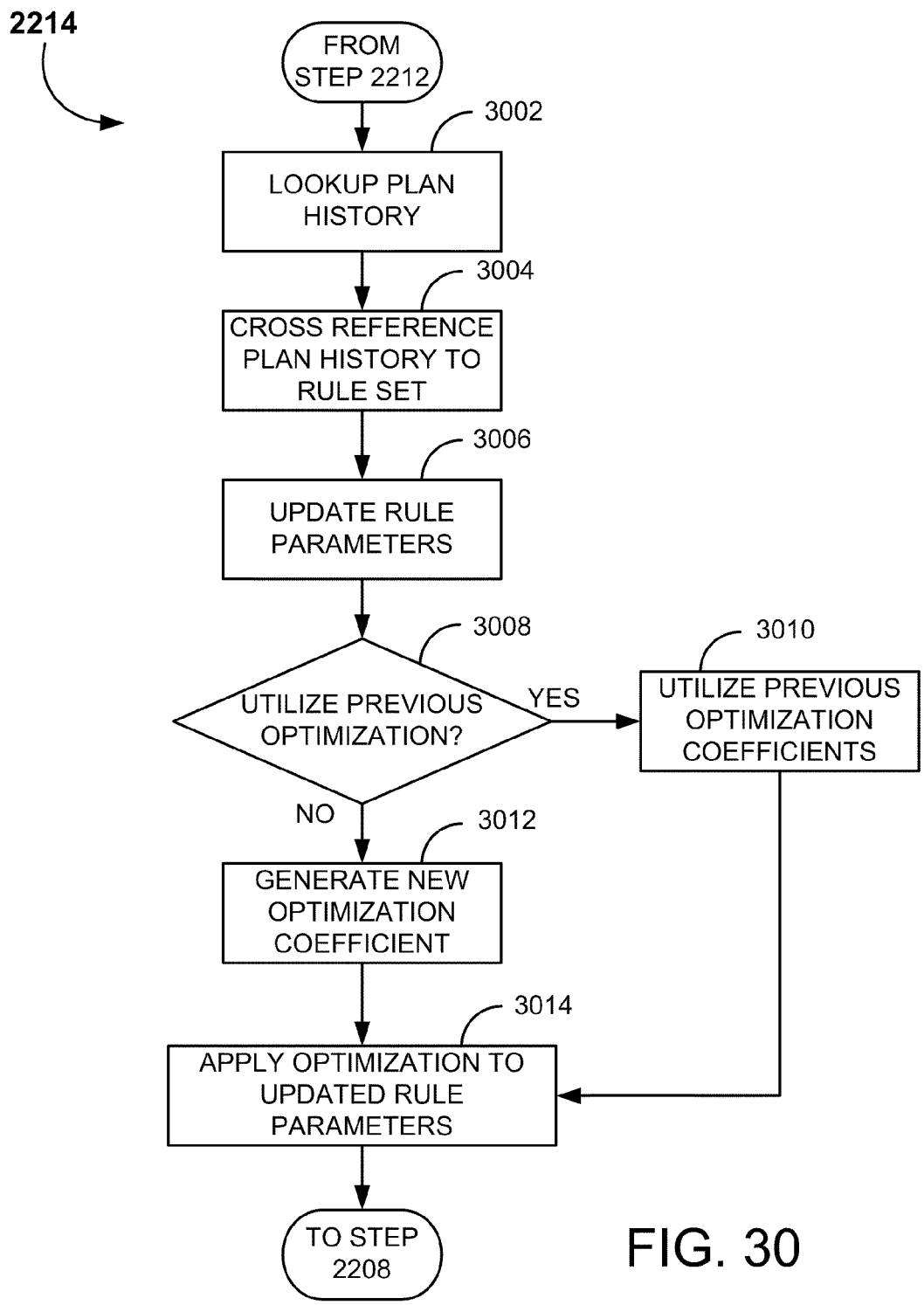
FIG. 30 shows a flow chart illustrating markdown plan re-optimization in accordance with an embodiment of the present invention.

FIG. 30 shows a flow chart illustrating markdown plan re-optimization, shown generally at 2214. The process begins from step 2212 of FIG. 22. The process then proceeds to step 3002 where the markdown plan history is looked up. Then, at step 3004, the markdown plan history is cross referenced to the rule set. The process then proceeds to step 3006 where the rule parameters are updated. The system may be configured to distinguish between a starting price point, and the initial price. For an optimization, initial price (initPrice) may be defined as the price before any markdowns. Because of the introduction of re-optimization, it is necessary to include another concept, a starting price point, or the price at the Price Execution Date (pePrice). The pePrice may be a marked down price; or it can be the initPrice. Additionally, pePrice might also be an infeasible price.

With re-optimization, the user is free to edit most of the rules involved. This may lead to infeasibilities in the previously recommended prices. For anything prior to the price execution date, the system may be configured to ignore that the user did not adhere to the rules, as rules are meant to be forward looking. However, some of these infeasibilities will affect the prices going forward.

For example, in general, infeasibilities can be divided into the following: 1) where the previously recorded price in the week before price execution is in itself an infeasible price. This can be because the allowable percent offs have changed, or because the price points have changed, or the maximum lifetime markdown % has changed. Overridden prices might also have been infeasible; 2) where the previously recommended prices prior to the price execution date do not adhere to the rules in the new optimization. This is of little concern, as optimization is forward looking; and 3) where the previously recommended prices prior to the price execution date, in addition to the new rules, make optimization after the price execution date infeasible. This can happen if more markdowns where taken in the past than the new total allows. This may also occur if the user changed the maximum lifetime markdown to something that is lower than a markdown taken in the past.

In some embodiments, such infeasibilities may be resolved, respectively, in the following ways: 1) the optimization may be changed to allow for infeasible pePrices. However, the system may be configured to move everything to a set of prices that are on the same schedule and on the same markdown level as soon as the lead time is passed; 2) the system may ignore non-adherence of previously recommended prices prior to the price execution date; and 3) the system may be configured to check to see if a product exceeded the maximum lifetime markdown allowed or has taken more than the total number of markdowns. If either of these conditions is true, then the system may be configured to not optimize for the entire schedule.

Additionally, implemented markdowns could very well be different across the schedule. Thus the system may be configured to allow for infeasible pePrices, and markdown them down to the same schedule as soon as possible.

Also, if the user has changed the maximum number of markdowns, it is possible to have surpassed this number of allowed markdowns. If a product has been marked down more than the maximum number allowed, the system may stop marking down the entire schedule.

Moreover, if the user changes the allowable percent off, it is possible that the previously recommended price is no longer feasible. Since prices can only go down, there might not be a feasible price point to go down to. In such a situation, the system may remove all products from the optimization that do not have a feasible price point to go down to. All the other products may still be optimized. This check may be done together with the maximum lifetime markdown check. Alternatively, the system may be configured to not allow users to edit the percent offs field.

The process then proceeds to step 3008 where an inquiry is made as to whether utilize the previous optimization. When re-optimization is prompted by user rule changes, the previous optimization may be an acceptable demand model. Thus, by using the previous optimization time, and computational resources, may be conserved.

If the previous optimization may be utilized, the process then proceeds to step 3010 where the previous optimization coefficients are utilized. The optimization may then be applied to the updated rule parameters at step 3014. The process then concludes by progressing to step 2208 of FIG. 22.

Else, if at step 3008 the previous optimization is not to be utilized, such as in the situation where there are event changes that make the previous demand models inaccurate, then the process then proceeds to step 3012 where new optimization coefficients are generated. The optimization may then be applied to the updated rule parameters at step 3014. The process then concludes by progressing to step 2208 of FIG. 22.

VII. Category Role Analysis

A. System

Figure 31:
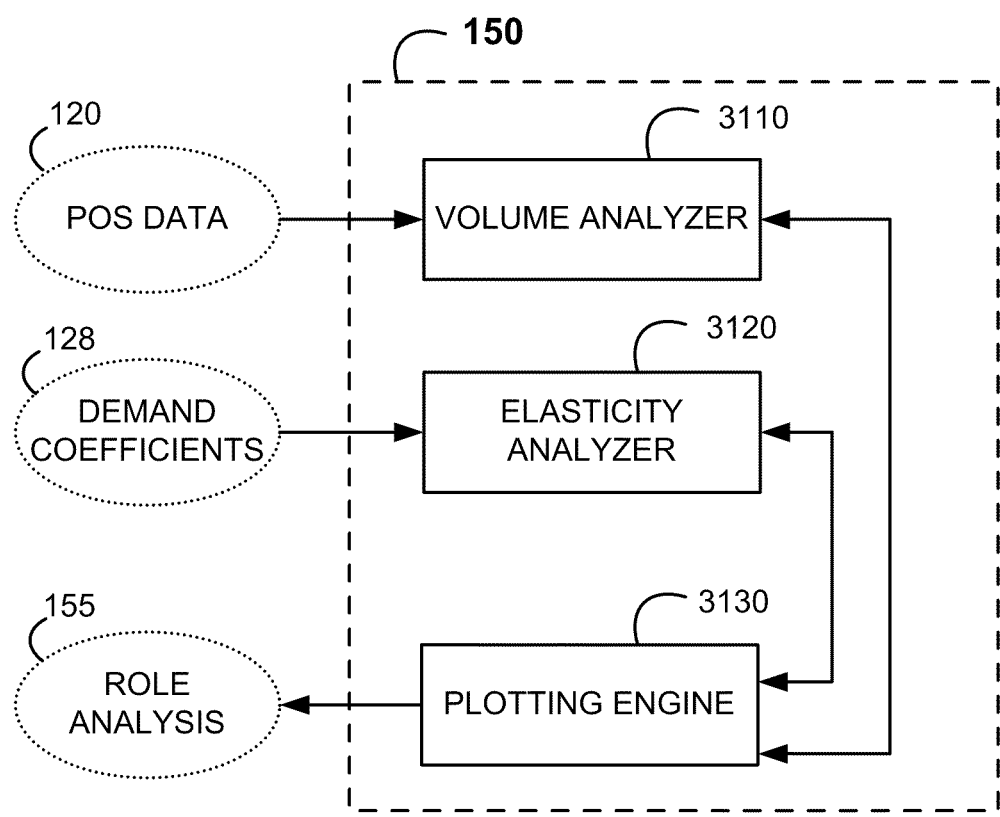
FIG. 31 shows an exemplary block diagram for the category role analyzer in accordance with some embodiment of the present invention.

FIG. 31 provides a more detailed example of the Role Analyzer 150. Again, the Role Analyzer 150 may be seen receiving Point of Sale Data 120 and Demand Coefficients 128. The Point of Sale Data 120 may be analyzed by a Volume Analyzer 3110 in order to extract volume information. The volume information may include total volume for a product, total volume for all products in a category, average volume over a set time period for a product (or a category of products), and/or relative volumes of product sales.

The Demand Coefficients 128 may also be analyzed by an Elasticity Analyzer 3120 in order to identify the elasticity values for each product or category of products. Often the Demand Coefficients 128 includes elasticity values; however, in some embodiments the demand coefficients may require additional processing to generate the elasticity values for the products/categories. Each of the Volume Analyzer 3110 and Elasticity Analyzer 3120 are coupled to a Plotting Engine 3130, which may plot elasticity versus volume. Likewise, the Plotting Engine 3130 may generate image values for products and/or product categories. In some embodiments, the Plotting Engine 3130 may further facilitate pricing comparisons between competitors for high image value items/product categories. The results of the Plotting Engine 3130 activity may be output as Role Analysis 155.

The Role Analysis 155 may be consumed by business managers in determining pricing, assortment, layout, and promotional decisions. Likewise, the Role Analysis 155 may be utilized by the Optimization System 100 to further refine pricing optimizations. Lastly, the image values calculated by the Role Analyzer 150 may be utilized by the Markdown Plan Tuner 160 to determine weighting factors, as was discussed previously.

Figure 32:
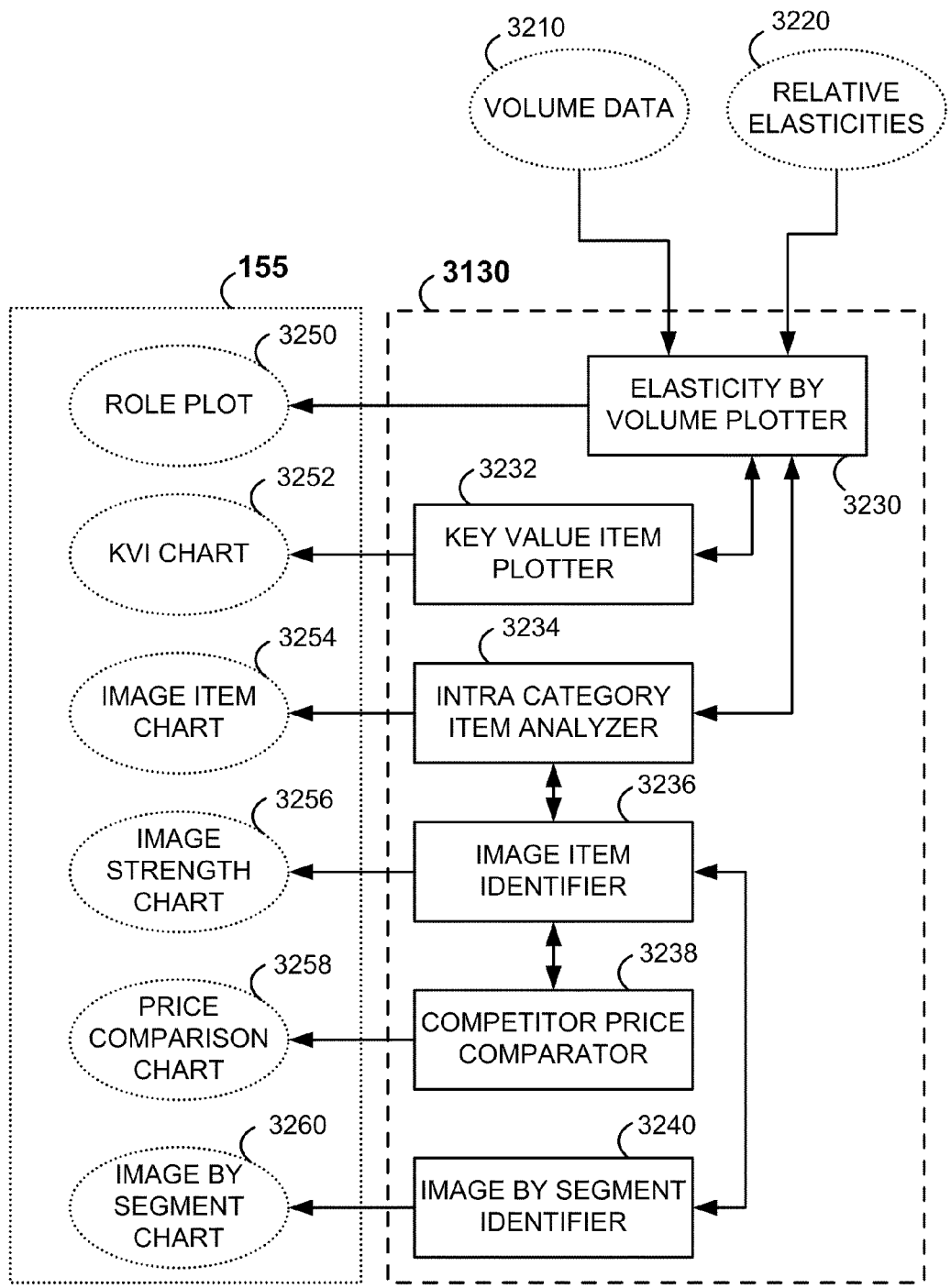
FIG. 32 shows an exemplary block diagram for the plotting engine of the markdown plan tuner in accordance with some embodiment of the present invention.

FIG. 32 is an expansion of the logical block diagram for one embodiment of the Plotting Engine 3130. As noted earlier, the Plotting Engine 3130 may utilize Volume Data 3210 and Relative Elasticities 3220 generated by the Volume Analyzer 3110 and Elasticity Analyzer 3120, respectively. The Plotting Engine 3130 may include an Elasticity by Volume Plotter 3230 which may plot the products' (or product categories') relative elasticity versus relative volume. This results in a Role Plot 3250. Examples of the outputs of these activities will be discussed in further detail below in reference to the example screenshots.

The Elasticity by Volume Plotter 3230, or other processing module, may also determine image values for the items and/or product categories. Image values are the degree of which consumers are perceptive to the item's price. Thus, image items (i.e., products with a high image value) may have a direct impact on a consumer's decision on where to go shopping. Typically, image items are high volume products which exhibit a high degree of demand elasticity. This is not always the case, since for some retailers, image items may be low volume but high visibility items. For example, Best Buy may sell a relatively low volume of HD TVs compared to music and video sales; however, due to the high visibility of these items, these may be considered 'image items' for this retailer.

Calculating an image value or the item may be performed in any manner which takes into account product volume and/or elasticity; however, it is typically the case that a multiplication and/or addition function is utilized. For example, below are provided example equations of how an image value may be calculated:

$$imagevalue = \frac{\frac{E_n}{Ave(E_n)} + \frac{V_n}{Ave(V_n)}}{C_1}$$

$$imagevalue = a_1 \times \frac{E_n}{Ave(E_n)} + a_2 \times \frac{V_n}{Ave(V_n)}$$

$$imagevalue = C_2 \times \frac{E_n}{Ave(E_n)} \times \frac{V_n}{Ave(V_n)}$$

$$imagevalue = \frac{V_n(E_n + C_3) + E_n(V_n + C_4)}{Ave(E_n) \times Ave(V_n)}$$

where:
$E_n$=the elasticity for product n;
$V_n$=the volume of product n;
$Ave(E_n)$=the average elasticity of all products within the category of product n;
$Ave(V_n)$=the average volume of all products within the category of product n;
$C_1$, $C_2$, $C_3$, and $C_4$,=one or more constant modifiers greater than zero; and
$a_1$ and $a_2$=constants greater than zero.

Note that the above example equations are possible alternate methods of generating an image value for the product. Further, for each equation there are possible default values for the constants that may be further modified or configured by the user. For example, the default value of $C_1$ may be 2. The default values for $a_1$ and $a_2$ may be that set such that their sum is equal to 1. Thus, the constants may have a default value of 0.5 each. The default value of $C_3$, on the other hand, may be equal to $E_n$; and likewise, the default value of $C_4$ may be $V_n$.

Thus, it is evident that there is a number of methods for determining the image values for each given product (or product category). Note that the above equations could easily be modified by using normalized values of the constituents. Normalization could be achieved by dividing the value by the average value (or the maximum value) for the subject or across all the products within the category, or a group of products that are being analyzed.

The Elasticity by Volume Plotter 3230 may couple to a Key Value Item Plotter 3232, in some embodiments. The Key Value Item Plotter 3232 may receive Key Value Item (KVI) listings from the business. These are items the business has already deemed as being highly visible to consumers. These key value items are then compared to the items previously calculated as high image value items (image items) on the role plot generated by the Elasticity by Volume Plotter 3230. The KVI Comparison Chart 3252 may color code all products which are image items as well as listed key value items. Likewise, items not considered key value items, as well as non image items may be identified by a second color. Further, products that are determined to be image items but are not listed as key value items may be colored as a third color. Lastly, products listed in as a key value item but not having a high image value may be coded a fourth color. These last two groups, where the key value item list and the products with a high image value are not in agreement, are particularly useful. These groups enable the business manager to reassess which items are considered "important" to customer perception.

An Intra Category Item Analyzer 3234 may also couple to the Elasticity by Volume Plotter 3230. The Intra Category Item Analyzer 3234 may plot products within a single category on an elasticity-by-volume chart. This enables analysis of what role particular products within a product category are servicing. The resulting Image Item Chart 3254 provides useful feedback into which items within a category may be more aggressively priced and yet maintain a positive consumer pricing perception.

An Image Item Identifier 3236 may couple to the Intra Category Item Analyzer 3234. The may chart the given image items (i.e., products with high image values) across different business zones, as an Image Strength Chart 3256. Zones may include geographic zones, demographic zones, store types, etc. In order to chart image values by zones, the POS data needs to be sufficiently granular to indicate sales and volume data for the particular zones.

The Image Strength Chart 3256 may provide insight on to how a particular product is seen across zones, thereby providing more flexibility to the business to tailor pricing and promotions to different store types, geographic locals, etc. For example, in a suburb zone, snack foods and fruit juice may be considered image items, whereas in a downtown urban location lunch items and readymade foods may instead be image items.

A Competitor Price Comparator 3238 may be coupled to the Image Item Identifier 3236 in this embodiment. The Competitor Price Comparator 3238 may enable selection of high image value items for pricing comparison against other competitor businesses. This provides insight, as a Price Comparison Chart 3258, into how typical consumers view the pricing of the business in comparison to local competitors.

Likewise, in some embodiments, an Image by Segment Identifier 3240 may couple to the Image Item Identifier 3236. The Image by Segment Identifier 3240 is similar to the Image Item Identifier 3236, except the resulting Image by Segment Chart 3260 is provided as an image chart across consumer segments. Again, this enables insights into what particular consumers perceive when viewing pricing. On top of shaping existing business decisions, this data may be very beneficial when expanding into a new location as the demographics of the location are often known. Thus, the new stores may base pricing decisions upon the desired target customer segment.

B. Method

FIGS. 33A to 33D explore one embodiment of the process for category and product role analysis. At FIG. 33A, the process starts by receiving the Point of Sales (POS) data from the one or more stores, at step 3310. POS data typically includes sale price, volume, and date of sale, at a minimum. Additionally, POS data may include loyalty card data, membership data, method of payment, groupings of sales by transaction, and any other pertinent data. Loyalty card data, or other identification data, may be of particular interest when analyzing product roles across customer segments, because the identification data enables the system to accurately place the transaction as belonging to a particular customer segment. However, even if no identification data is known, the system may be enabled, in some embodiments, to categorize the transaction based upon statistical fit of the transaction item spread versus prototypical shopping cart contents for each customer segment.

In addition to POS data, demand coefficients may likewise be received at step 3320. Demand coefficients have been discussed in great detail above. In most situations the demand coefficients include elasticity values for each product. In some cases, however, it may be necessary to generate the relative elasticities of the products (step 3330).

In addition, the sales volumes are extracted from the POS data at step 3340. The volume may include total volume over a set time, average volume over a period, or a random sampling of sales over a given time. The sales volumes may likewise be converted into relative volume levels for purposes of analysis.

The volumes may be compared against the elasticity of the products and/or categories at step 3350. This comparison results in the generation of role analysis, at step 3360. The role analysis may aid in generating business decisions and aid in price management. The method of role analysis will be further discussed in relation to the figures below.

Figure 33A:
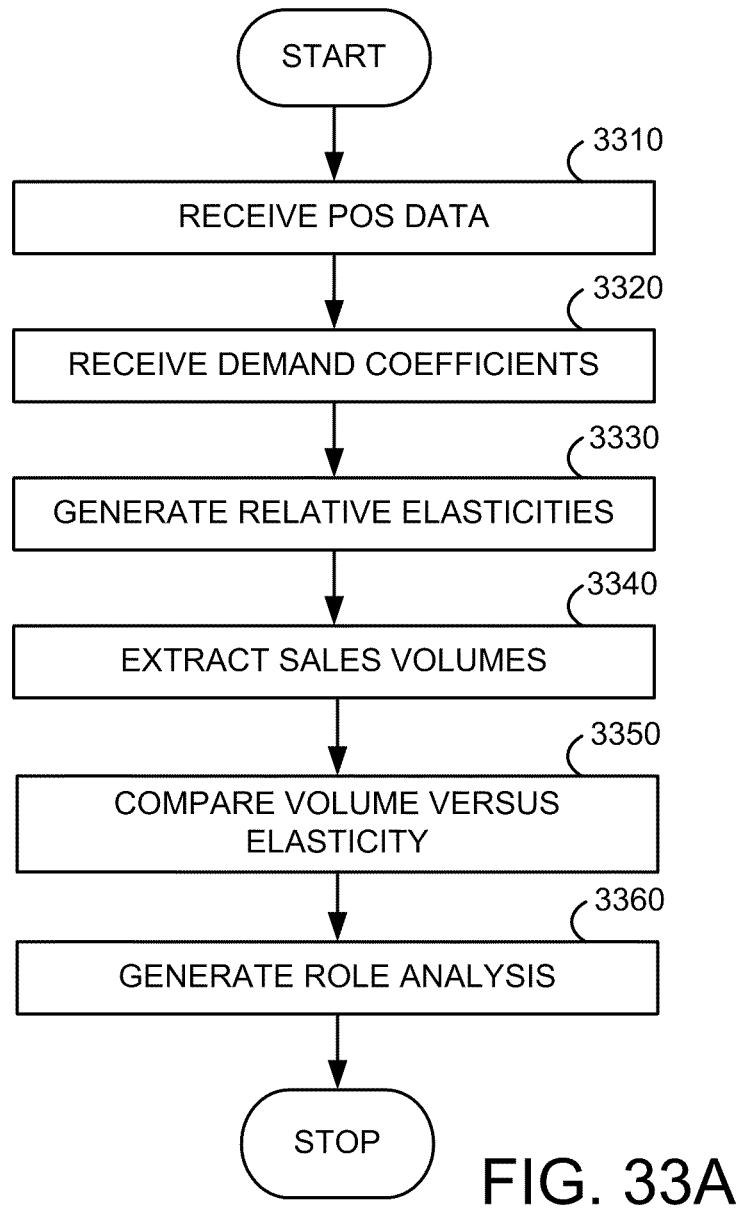
FIGS. 33A-33E show a flow chart illustrating the category role analysis in accordance with some embodiment of the present invention.
Figure 33B:
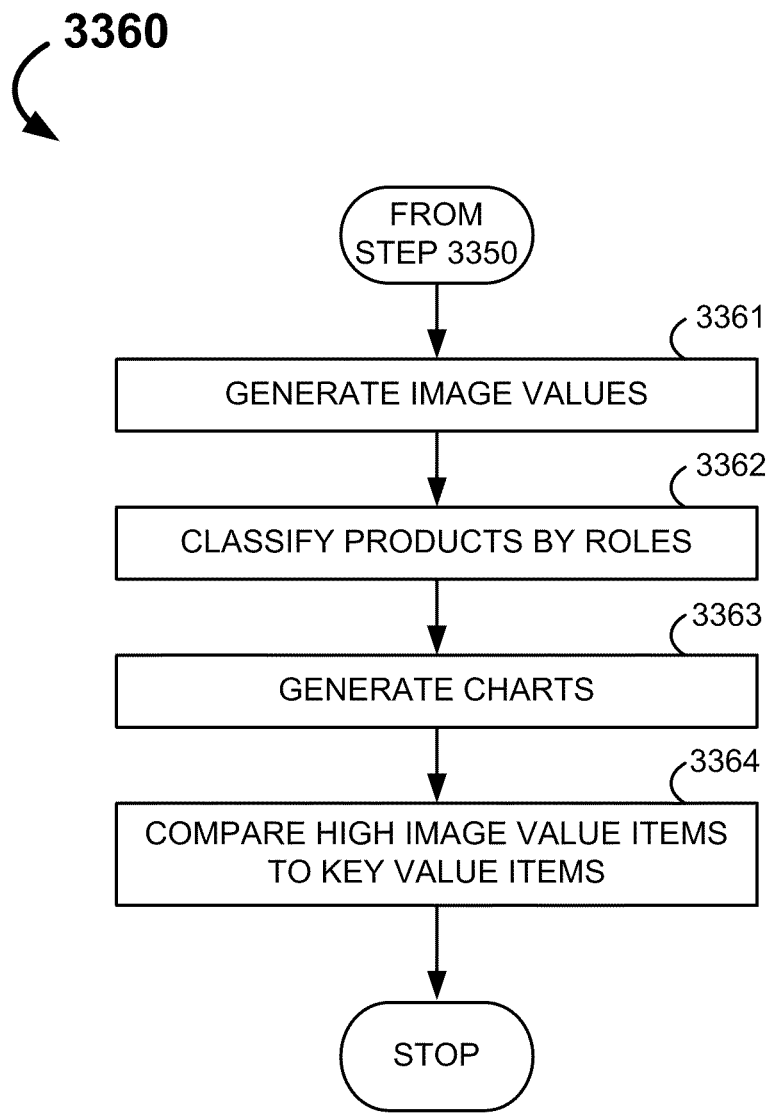

At FIG. 33B the step of role analysis is expanded as a process, shown at 3360. This process begins from step 3350 of FIG. 33A. The process includes the generation of image values, at step 3361. Image values for each product may be determined via a function of volume and elasticity, as detailed above. In addition to calculating image values for each product, the system may likewise classify products into roles, at step 3362.

Figure 33C:
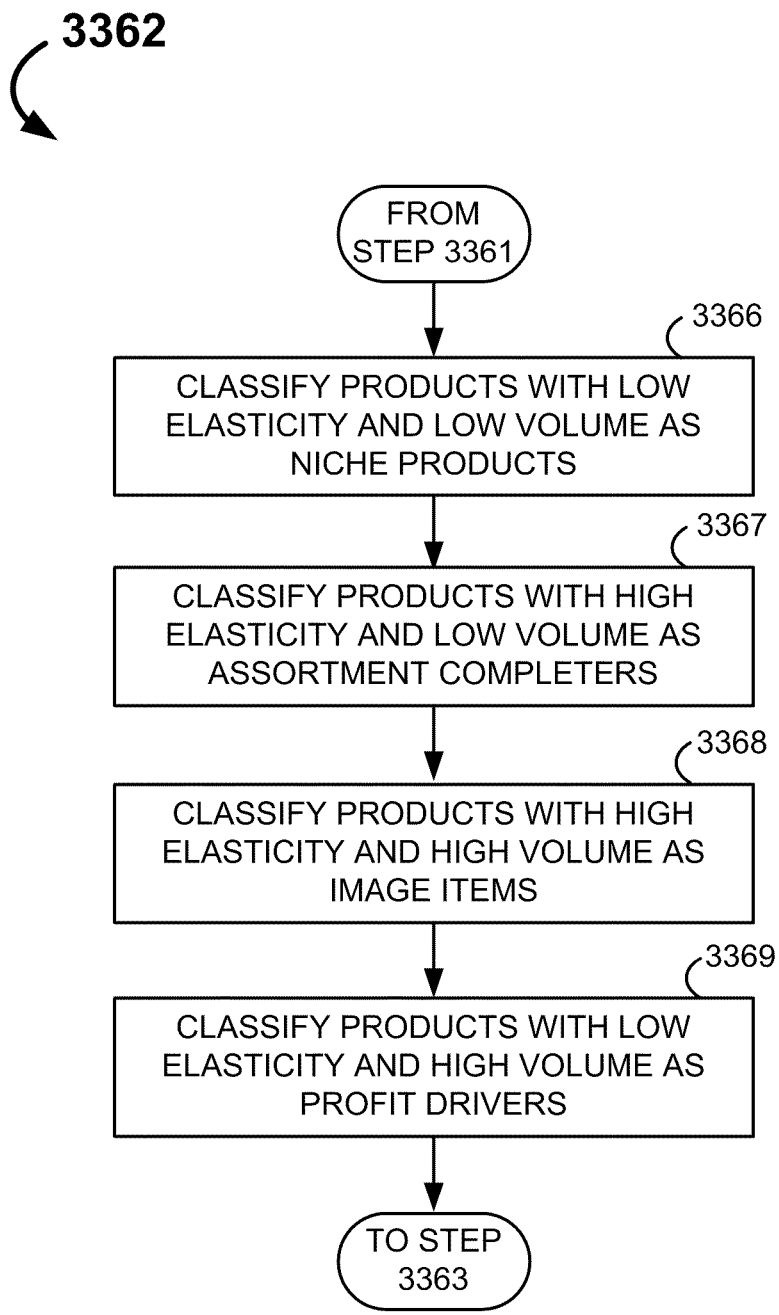
Figure 33D:
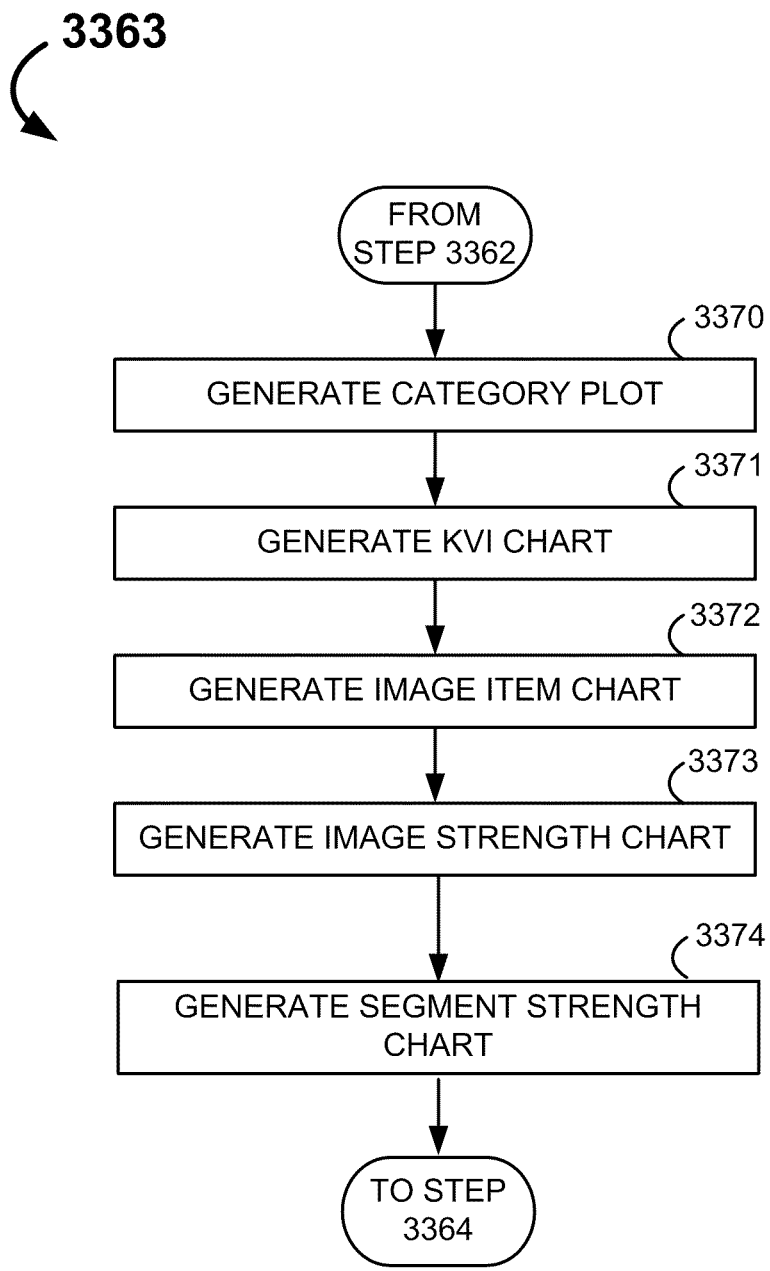
Figure 33E:
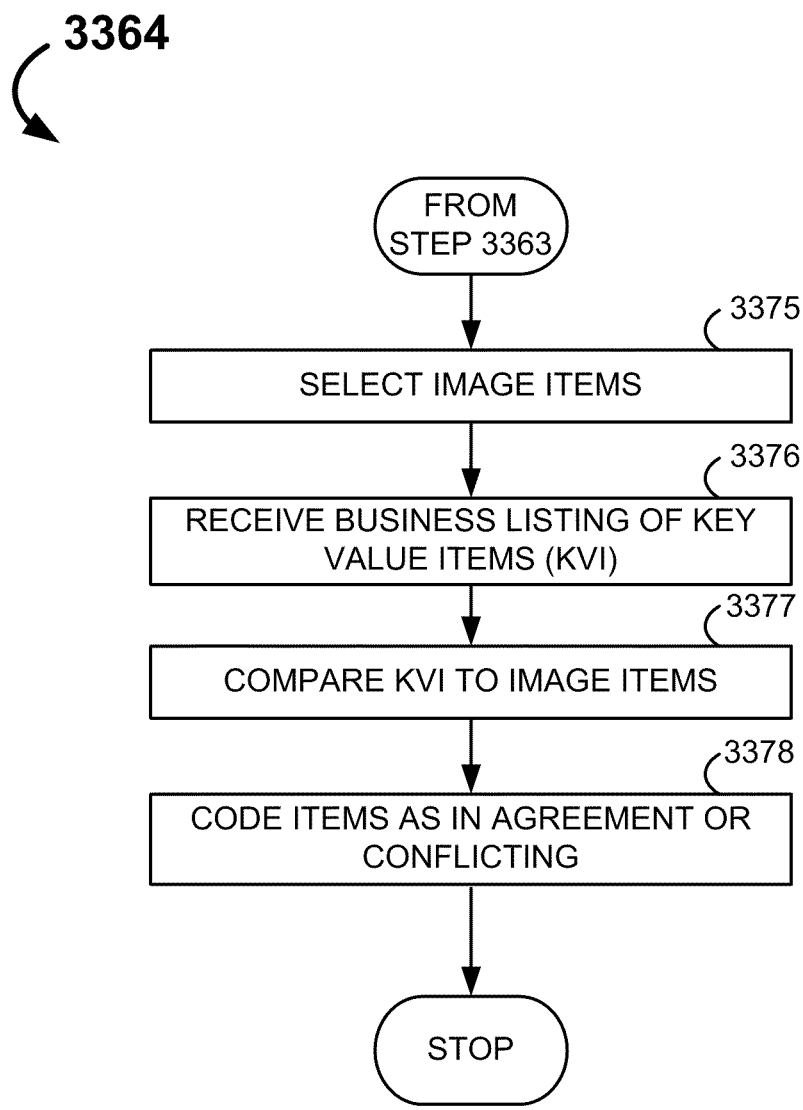

Turn briefly to FIG. 33C which describes one embodiment for the classification of products into roles, as shown at 3362. This process begins from step 3361 of FIG. 33B. This process classifies products with low elasticity and low volume as niche products (at step 3366); products with high elasticity and low volume as assortment completers (at step 3367); products with high elasticity and high volume as image items (at step 3368); and products with low elasticity and high volume as profit drivers (at step 3369).

These determinations may be performed by plotting products on a volume versus elasticity graph and sectioning off areas of the graph (e.g., quadrants) as including a particular role of product. Alternatively, equations may be utilized, similar to determining image values in order to determine which role classification any particular product belongs to.

In some embodiments, the system may rely upon threshold values for elasticity and volume in determining roles. These thresholds may be default values or may be readily customized. Thresholds may include absolute values or percentiles. Thus, for example, profit drivers are defined as having low elasticity and high volume. Thus, a default threshold may be that "low elasticity" is below the $20^{th}$ percentile of all elasticity values. Likewise, the "high volume" default threshold may be, for example, the top $10^{th}$ percentile of unit sales, above $X in sales, or above some preset number of unit sales (i.e., 1 million units sold per quarter). Again, all thresholds may be readily customized for a given retailer to better reflect business goals, global economic considerations, or the like.

Thresholds may be defined for the 'low' and 'high' volume and elasticity values for all roles. Alternatively, the definition of low or high volume or elasticity may have differing thresholds dependent on role being analyzed. For example, niche products are defined as low elasticity and low volume. Assortment completers are defined as high elasticity and low volume products. Both niche products and assortment completers include "low" volume; however the system may be readily configured such that these "low" volume thresholds differ from one another. For example, niche product's "low volume" may be defined as below 100,000 units of the product sold per quarter; whereas assortment completers' "low volume" may be defined as selling in the bottom 15$^{th}$ percentile by total revenue dollars. Again, default values may be present for each threshold for each role. These defaults may then be overridden by the particular retailer to better reflect the business.

Elasticity and volume, when used for determining roles, may include raw elasticity and volume values, or may utilize maximum monthly values, average values, or normalized values. Normalization may include dividing the elasticity and/or volume values by a category average for example.

After classification of products is completed, the process returns to step 3363 of FIG. 33B, where the charts are generated. Some embodiment of this process is provided in greater detail at FIG. 33D. Here a category plot is generated (step 3370), a KVI chart is generated (step 3371); an image item chart is generated (step 3372); an image strength chart is generated (step 3373); and a segment strength chart is generated (step 3374). Examples of these chart types, and the insight each offers will be described in more detail in the example section of this document.

After the generation of the charts, the process returns to step 3364 of FIG. 33B, where the products with high image values are compared to Key Value Items (KVI) received from the business. An example of this comparison is detailed in the flowchart of FIG. 33E. For the comparison image items that were calculated are selected, at step 3375. The listing of key value items may be received from the business at step 3376. The product listings are then compared to identify agreements and dissimilarities, at step 3377. This comparison may include the generation of a color coded chart indicating agreements and dissimilarities between the KVI and the generated image items, at step 3378. After this comparison the process ends.

Figure 34:
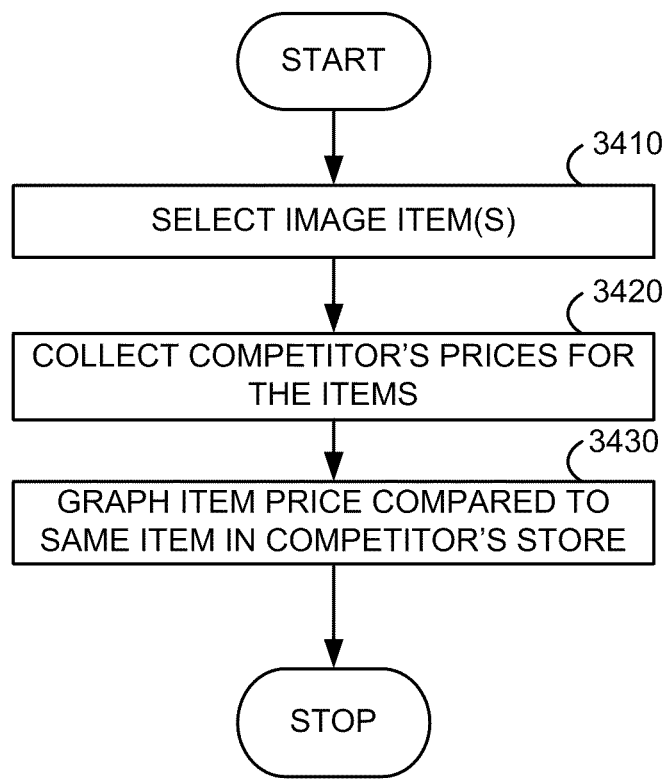
FIG. 34 shows a flow chart illustrating comparison of image items against competitors pricing in accordance with some embodiment of the present invention.

FIG. 34 provides a separate example process for the comparison of image item's (or image categories) against the same products (or categories) in competitors' stores. This process begins by selecting the image items to be compared, at step 3410. The prices for these products in competitor's stores are then collected, at step 3420. The items price is graphed as compared to the pricing at the competitor's stores, at step 3430. The process then ends. This comparison may be made on a number of levels of granularity, including a single product level, category level and intermediate levels.

C. Examples

FIGS. 35 to 41 provide example screenshots for the output of the Role Analyzer 150, in accordance with some embodiments of the invention. Note that these example screenshots are intended to be exemplary in nature, and are not intended to limit the scope of the present invention.

Figure 35:
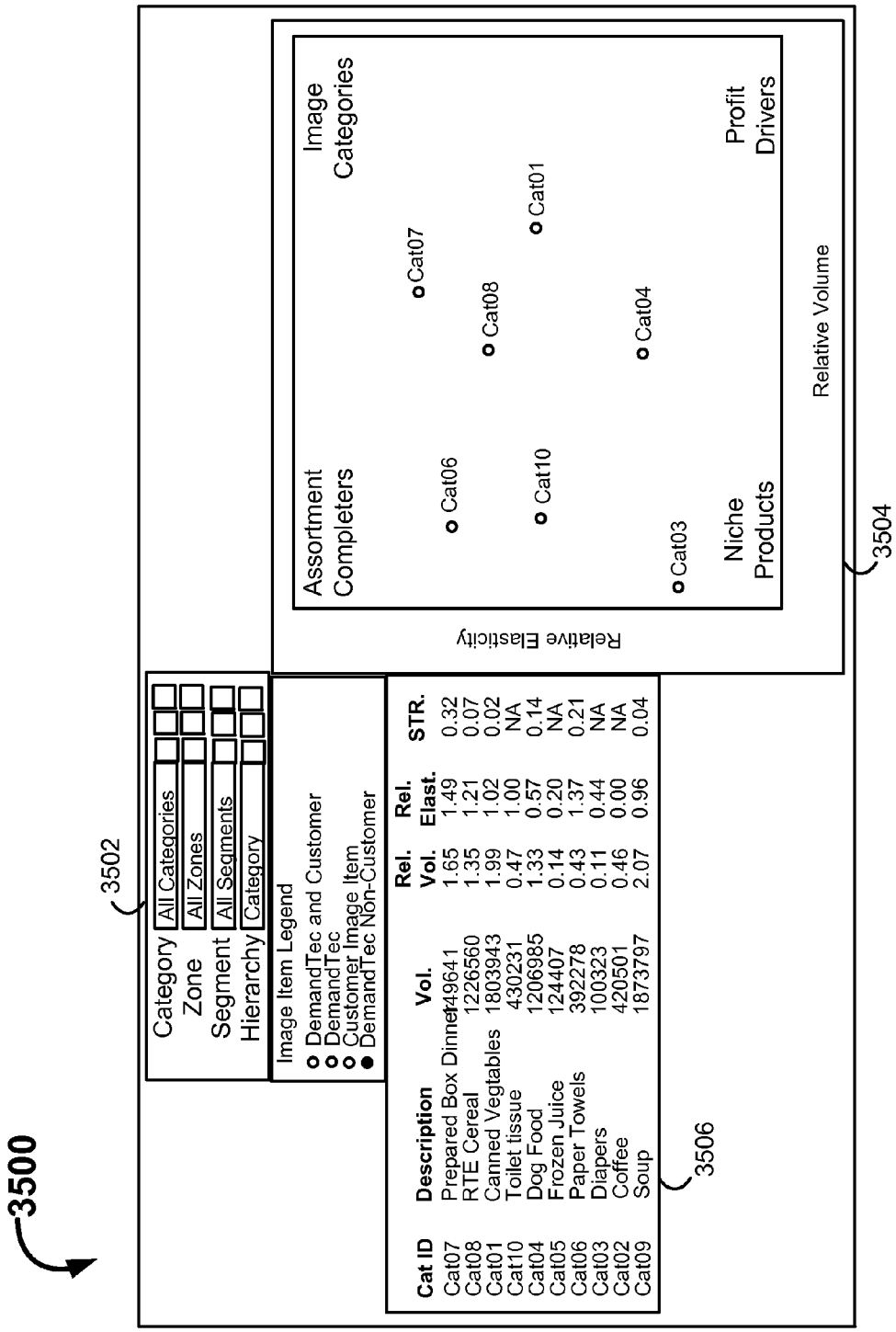
FIG. 35 shows an example screenshot of a category plot in accordance with some embodiment of the present invention.

FIG. 35 shows an example screenshot of a category plot, shown generally at 3500. The exact product categories to be displayed in this example screenshot may be selected in a Data Set Menu 3502. The Data Set Menu 3502 may include a series of pull down menus, in some embodiments. These menus may indicate categories to be displayed, by zone, segment and at which hierarchy level. In this particular example, the hierarchy menu is set to category, thus only categories are displayed on the plot, in this example. Additionally, lower levels of product hierarchy may likewise be displayed, including demand groups and product level.

The resulting data points to be plotted are then illustrated in window 3506. This display includes the ID, a description of the data point, volume of the data point (here category), elasticity, relative volume of the data point, relative elasticity of the data point, image strength and quadrant the data point is located in.

The plot is displayed at 3504. Relative volume is labeled on the X-axis, and relative elasticity is labeled on the Y-axis. The four role categories are labeled: image categories, profit drivers, niche products and assortment completers. Likewise, the plot is split into four quadrants. Products in a particular quadrant are assigned to the category role labeled in the quadrant. Thus, for example, Category 7 (prepared box dinners) is a clear image category. Likewise, Category 4 (dog food) is a profit driver.

Figure 36:
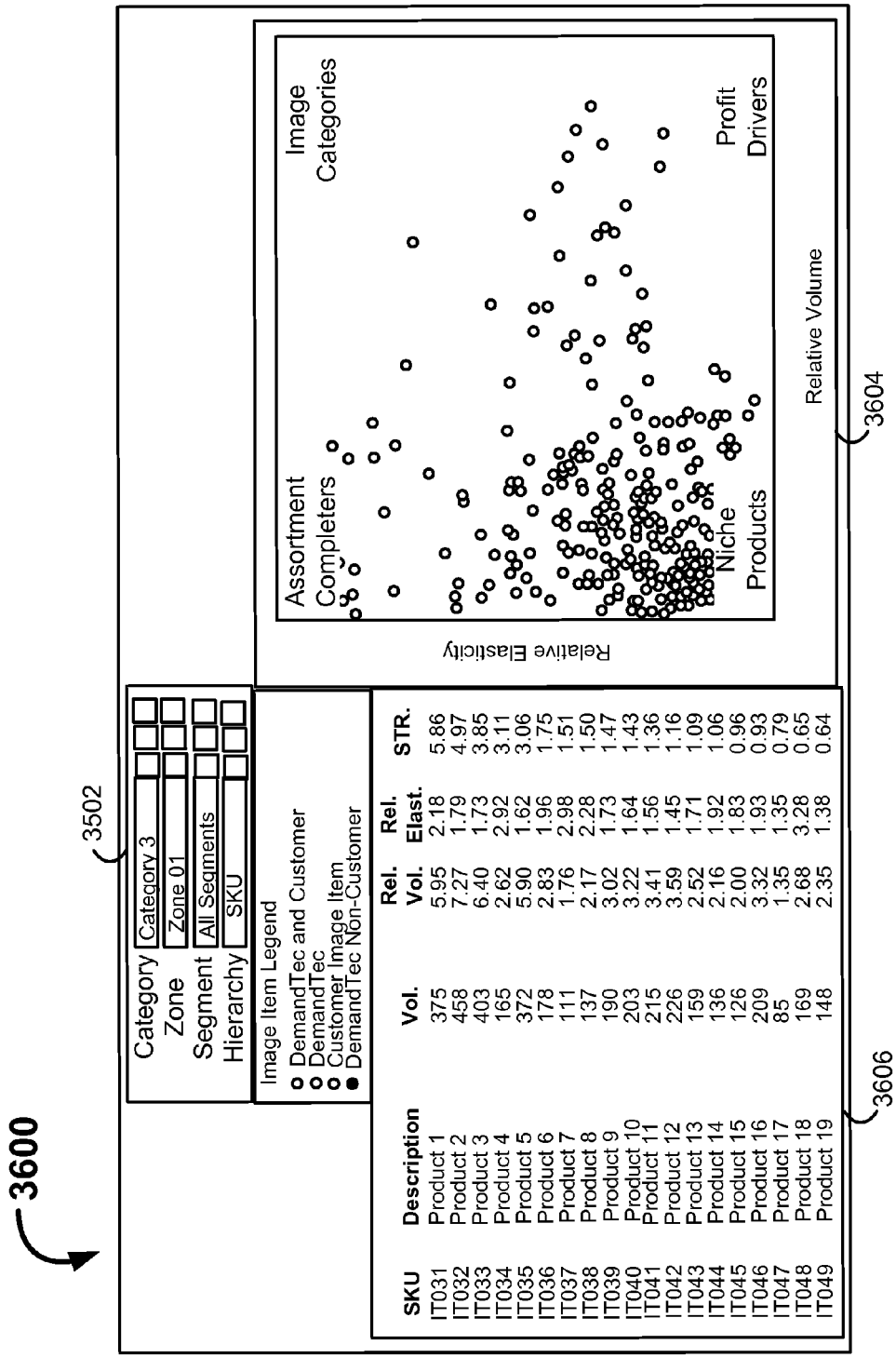
FIG. 36 shows an example screenshot of a comparison plot in accordance with some embodiment of the present invention.

FIG. 36 shows an example screenshot 3600 of a comparison plot 3604 for a single category. Thus, the single category is selected in the Data Set Menu 3502. Thus, in window 3606 all the individual items are listed, along with volume of the item, elasticity, relative volume of the item, relative elasticity of the item, image strength and quadrant the item is located in.

What is distinctive about the comparison plot is that the key value items received from the business are compared against the scatter plot. The item plot points are then color coded to represent items in agreement (i.e., KVI which are also image items, as well as non-KVI and non-image items) and those in disagreement (i.e., KVI not considered image items and image items not considered KVIs). Thus, for all KVIs and image items to be in agreement, all key value items would be present in the upper left quadrant of the plot, and all items in this quadrant would be a KVI.

As addressed previously, most retailer businesses define the key value items by volume and intuition. The present system enables true image items to be differentiated from potential profit drivers. Thus, the margin from these identified profit drivers may be reused, in some embodiments, to support highly competitive prices on the image items.

Further, while this comparison of KVI and image items is shown being performed on a business wide scale, it is also possible for the system to perform this comparison across different zones and customer segments. Thus, business decisions may be tailored on a more granular level.

The comparison of known key value items to image items may be helpful for the business to validate the KVI list currently in circulation. It may also be utilized to identify items not previously known to be a key value item, but which function as one. Likewise, potentially detrimental key value items, which should not be included in this category, may be identified for verification.

Figure 37:
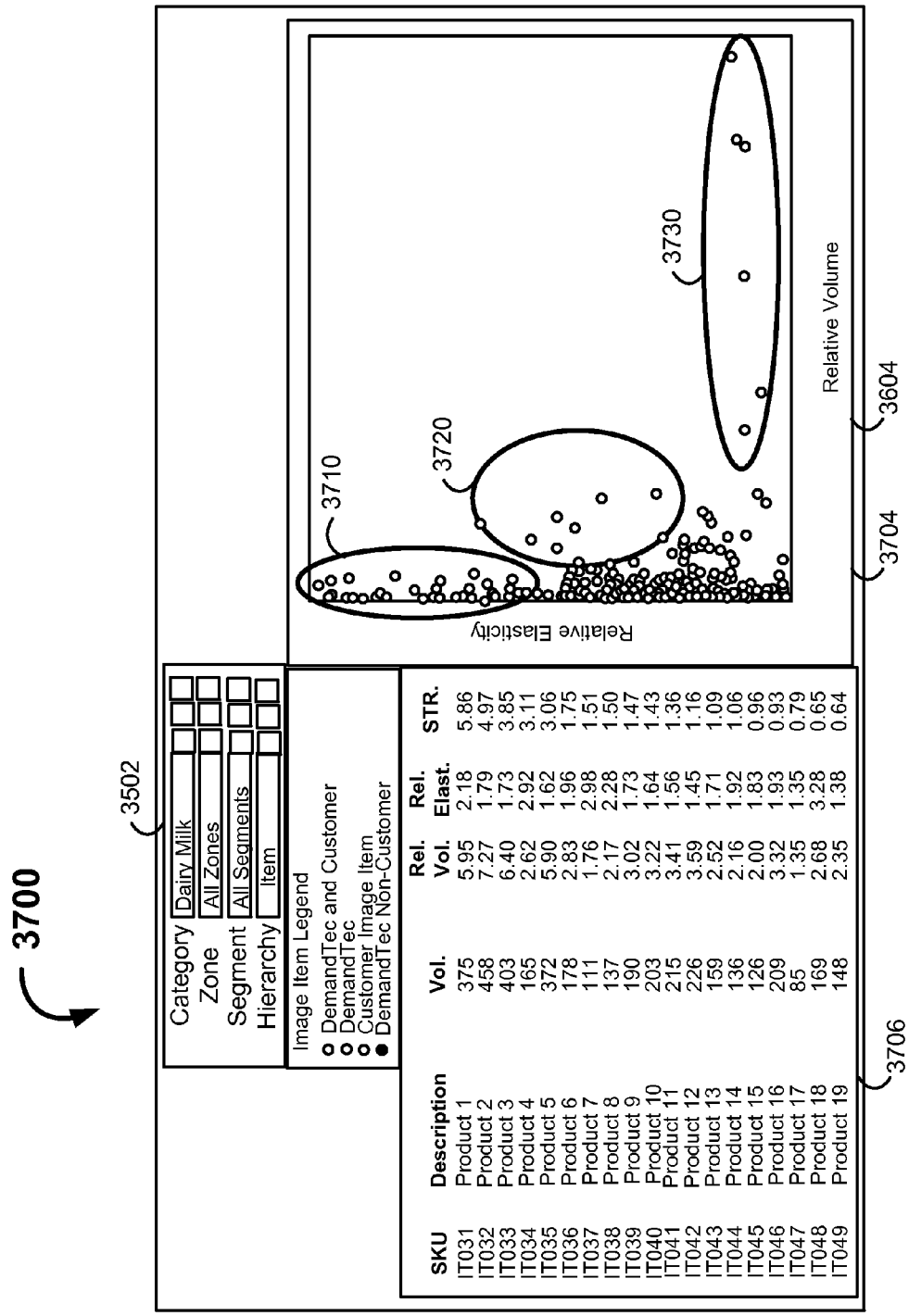
FIG. 37 shows an example screenshot of a plot of products within a category in accordance with some embodiment of the present invention.

FIG. 37 shows another example screenshot of a plot of products, shown generally at 3700. In this example, the category "dairy milk" is selected at the Data Set Menu 3502. Thus, the items in this category, and their associated data, are displayed at window 3706. Looking at the plot 3704, it is noted that there is an interesting distribution of items. Most items are low volume, with relatively few image items or profit drivers.

When compared to item descriptions, patterns regarding the plot become clearer. In this example, the assortment completers included in ring 3710 are all specialty and organic dairy products. The image items in ring 3720 re all branded milk products, such as Nesquik®. Lastly, the few profit drivers, in ring 3730, are identified as store brand items. Thus, this example provides insight into the very different roles that branded, private label and specialty milk products play within the milk category.

FIG. 38 shows an example screenshot of an image strength chart at 3800. Image charts are important for the displaying of the actual image values for the products within the category across various zones and/or customer segments.

Here the category to be viewed is selected at the field 3802. The image identification and descriptions are provided at the table 3806. Lastly, at table 3804 the image strength for each product is illustrated, both through color coordination, but also through the display of the numerical image value. This image strength is also displayed across the different zones, in this example screenshot.

An important insight gained from this image strength chart is that, even though all products listed are considered "image items", they are not necessarily image items across all zones (or customer segment). The image strength may vary according to zone, and a prudent pricing strategy would to be an increase of the products price in regions/zones of lower image strength.

Figure 39:
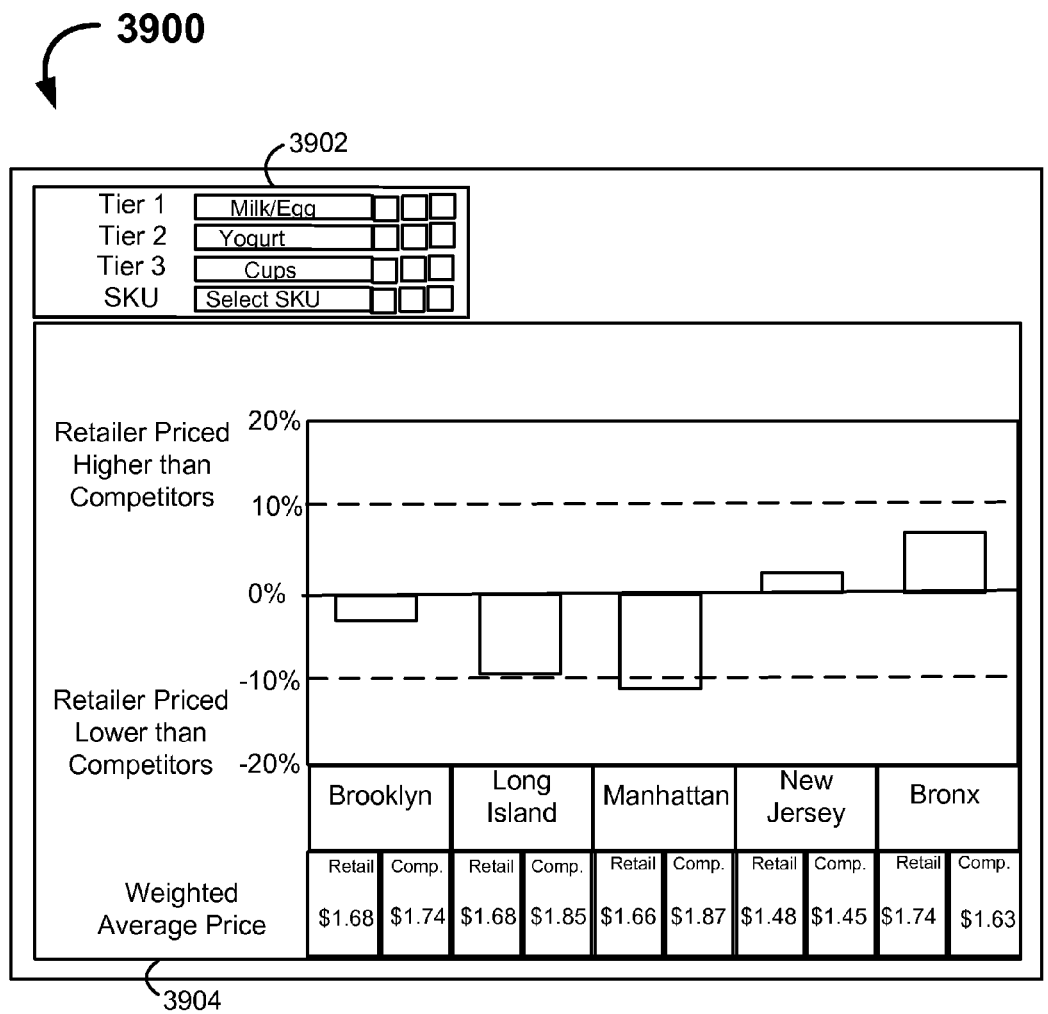
FIG. 39 shows an example screenshot of a competitor pricing comparison chart in accordance with some embodiment of the present invention.

FIG. 39 shows an example screenshot of a competitor pricing comparison chart at 3900. Here the product set may be selected at pull down menus 3902. Thus, broad product sets may be compared (i.e., category level or subcategory), as might be individual products or sets of products. In this example, yogurt cups are being compared against the competitor's pricing on these products.

Product selection is performed for high image value items, as there are the products which drive consumers to a particular retailer versus another. In the instant example, the graph 3904 being produced is a comparison by zone (region). The zones are listed (here Brooklyn, Long Island, Manhattan, New Jersey and Westchester). The number of products in the product set is listed for each zone, as well as a weighted average price. The percentage it is above or below the businesses pricing on this group of products is then presented.

Figure 40:
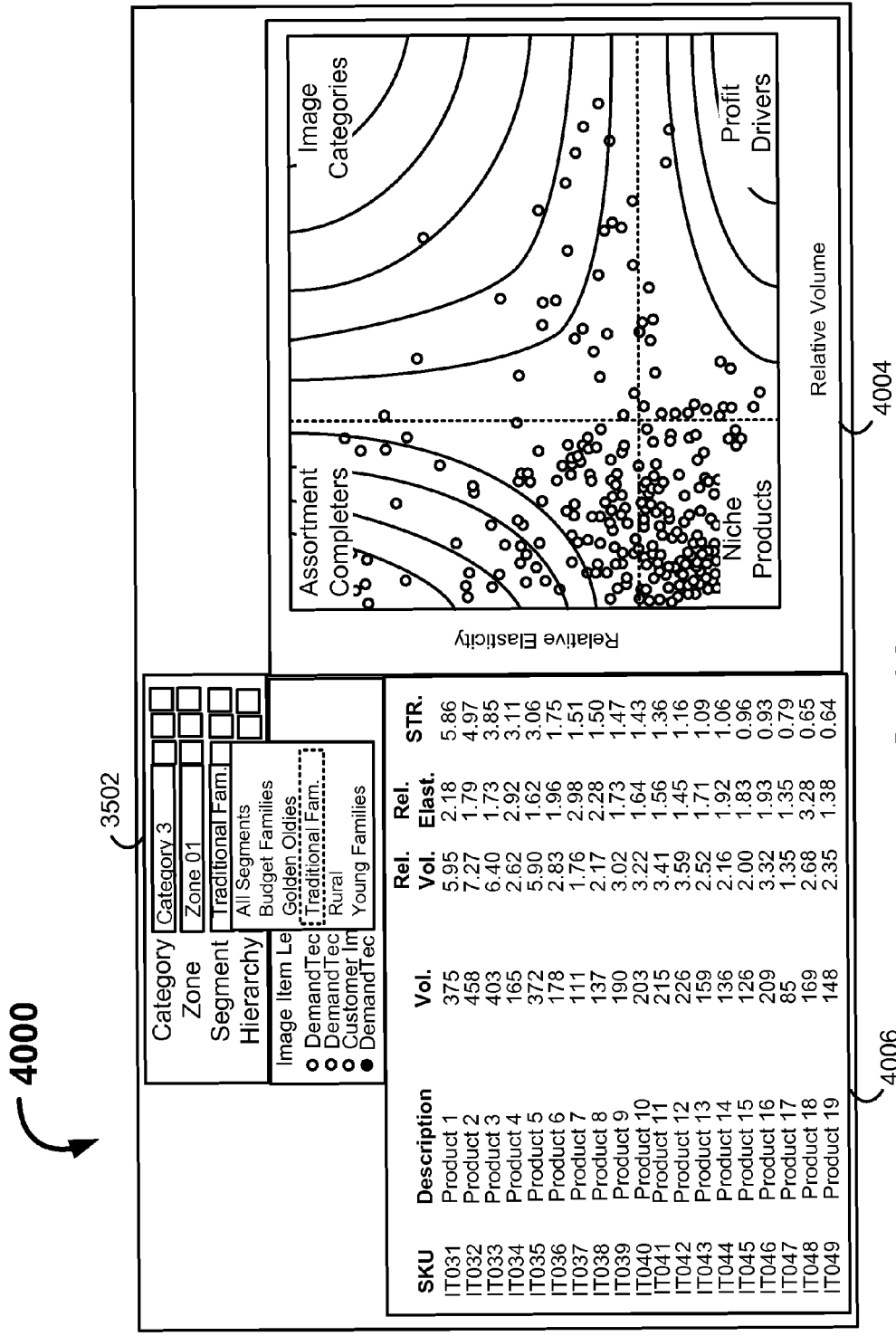
FIG. 40 shows an example screenshot of a category plot across zones and segments in accordance with some embodiment of the present invention.

In a similar thread, FIG. 40 shows an example screenshot of a category plot across zones and segments at 4000. These selections of customer segment and/or zones may be performed at the Data Set Menu 3502. The resulting items with description, volume and elasticity values are presented in window 4006 as before. Again the plot 4004 is then generated, including quadrants. In this example plot, contours related to the strength of the role are provided. In this example, the contours may be generated utilizing inverse variation functions, but other functions may be readily utilized as is desired.

The role strength contours may enable retailer businesses to more scientifically identify top image items and top profit drivers in order to more readily support their more core competitive strategies, as well as increasing overall profits.

Lastly, FIG. 41 shows an example screenshot of an image strength chart across segments at 4100. Here the category, zone and hierarchy may be set at the pull down menus 4102. As with the zone image strength chart of FIG. 38, this example chart lists products with descriptions at table 4106. The image strengths are then listed as the numeric image values, as well as through color coding, across customer segments at table 4104.

As previously noted, customer segments are generated through statistical analysis of shopping behaviors, including frequency and item spread in a given shopping trip. Identity data, such as loyalty card data, membership card data, or payment identification provides a mechanism of following the purchasing behavior of a household over repeated transactions.

Examples of customer segments include budget families, foodies, affluent retirees (golden oldies), peak income years (typically professional singles and couples), frugal, traditional families, young families and young singles, to name a few.

What should be noted is that in this example graph some items are image items across most segments. For example, private label raisin bran and Kellogg's Frosted Mini Wheat's®. Alternatively, some items are extremely segment specific. For example, Kellogg's Fruit Loops® are strong image items for young singles and young families, but are not image items at all for affluent retirees, in this example.

This segment dependent image item chart may be particularly helpful when selecting items valued by key customer segments for competitive shops, product assortment and promotions.

VIII. System Platform

Figure 9A:
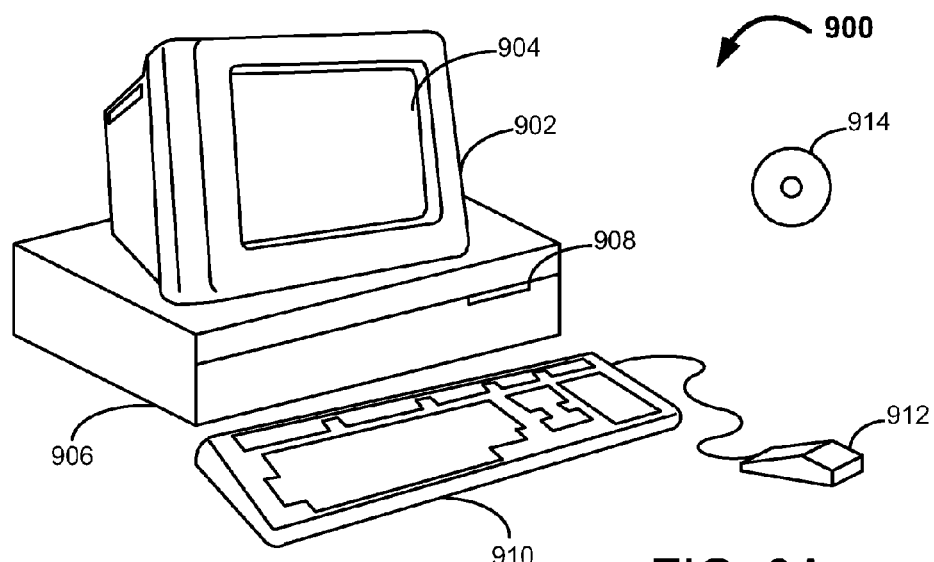
FIGS. 9A and 9B illustrate a computer system, which forms part of a network and is suitable for implementing embodiments of the present invention.
Figure 9B:
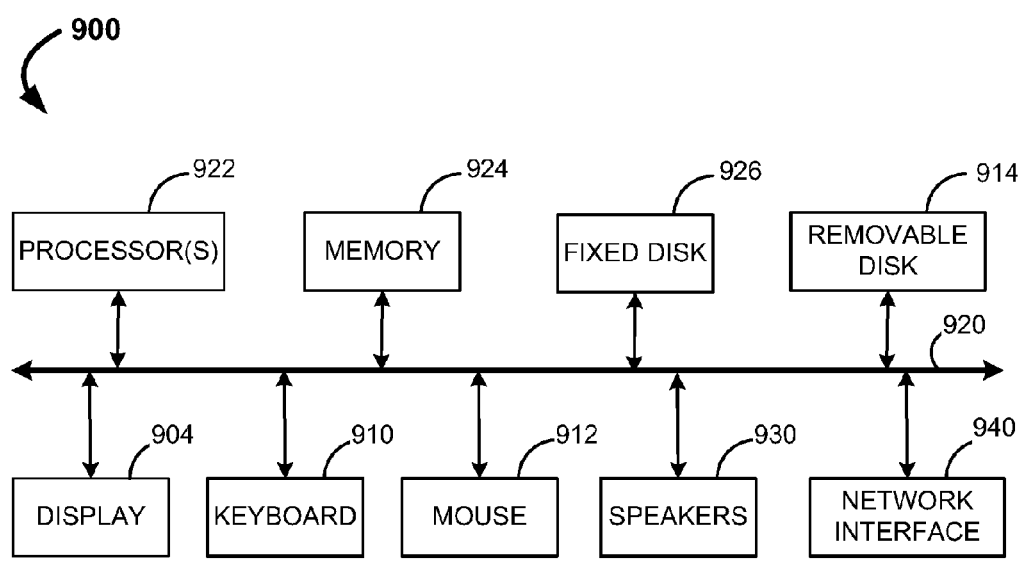

FIGS. 9A and 9B illustrate a computer system 900, which forms part of the network 800 and is suitable for implementing embodiments of the present invention. FIG. 9A shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 9B is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU, and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Figure 8:
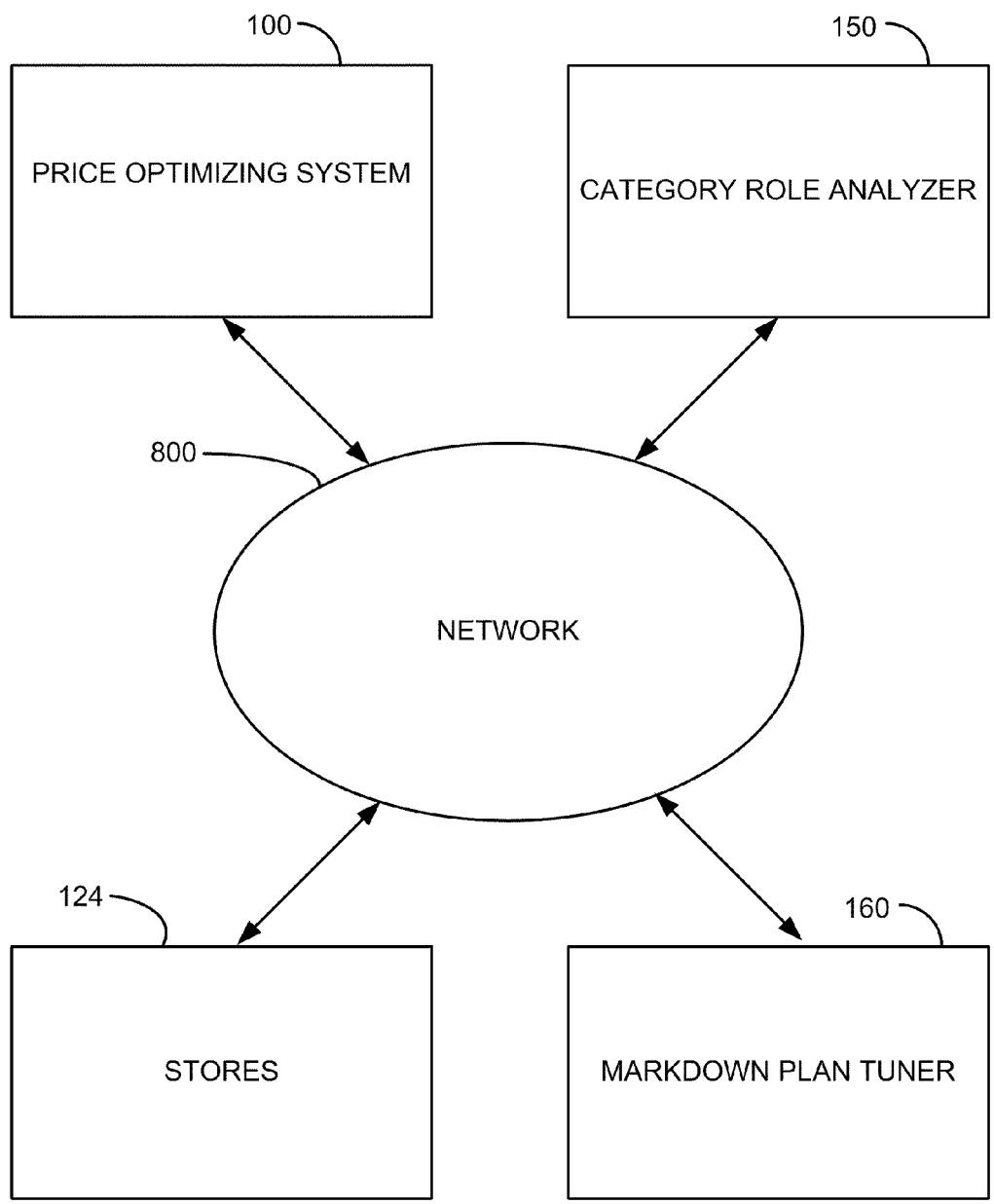
FIG. 8 is a schematic illustration of an embodiment of the invention that functions over a network.

FIG. 8 is a schematic illustration of an embodiment of the invention that functions over a computer network 800. The network 800 may be a local area network (LAN) or a wide area network (WAN). An example of a LAN is a private network used by a mid-sized company with a building complex. Publicly accessible WANs include the Internet, cellular telephone network, satellite systems and plain-old-telephone systems (POTS). Examples of private WANs include those used by multi-national corporations for their internal information system needs. The network 800 may also be a combination of private and/or public LANs and/or WANs. In such an embodiment the Price Optimizing System for Business Planning 100 is connected to the network 800. The Stores 124 are also connected to the network 800. The Stores 124 are able to bi-directionally communicate with the Price Optimizing System for Business Planning 100 over the network 800. Additionally, in embodiments where the Role Analyzer 150 and Markdown Plan Tuner 160 are not integrated within the pricing optimization system, the Stores 124 are likewise able to bi-directionally communicate with either of the Role Analyzer 150 and/or Markdown Plan Tuner 160 over the network 800.

Additionally, in some embodiments, the system may be hosted on a web platform. A browser or similar web component may be used to access the Likelihood of loss engine. By utilizing internet based services, retailers may be able to access the system from any location.

In the specification, examples of product are not intended to limit products covered by the claims. Products may for example include food, hardware, software, real estate, financial devices, intellectual property, raw material, and services. The products may be sold wholesale or retail, in a brick and mortar store or over the internet, or through other sales methods.

In sum, the present invention provides a system and methods for analyzing the roles of product categories. The advantages of such a system include the ability to generate accurate classifications for products, develop image values for products, and facilitate comparisons of high image product's pricing with competitors in an efficient and effective manner.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for analyzing product roles, useful in conjunction with a pricing optimization system, the method comprising:
   receiving volume data for a plurality of products, wherein the volume data is sales volume for each product of the plurality of products over a given timeframe, and further wherein each product of the plurality of products is assigned to one of a plurality of product categories;
   receiving elasticity values for the plurality of products;
   comparing the elasticity value and the volume data for each product;
   generating a role analysis, by a processor, for each product of the plurality of products utilizing the comparison of the elasticity value and the volume data, wherein the generating a role analysis includes calculating an image value for each product by applying at least one constant value to a combination of the elasticity value for said product divided by an average elasticity value for the product category corresponding to said product, and the volume of the product divided by an average volume for the product category corresponding to said product, and identifying at least one key value item of the plurality of products based upon the image value; and
   generating, by a processor, a markdown plan including a set of prices, promotions and schedules based on the image values and demand coefficients, wherein generating the markdown plan includes:
      monitoring processing of the processor generating the markdown plan to detect increased processing requirements; and
      controlling processing time of the processor generating the markdown plan in response to detection of increased processing requirements by selectively adjusting performance of operations to produce the demand coefficients with a lesser degree of accuracy based on a quantity of products being processed to reduce the processing requirements, wherein the increased processing requirements generate the demand coefficients with more accuracy than the reduced processing requirements.

2. The method as recited in claim 1, further comprising:
   determining category sales volume for each of the plurality of product categories;
   determining category elasticity for each of the plurality of product categories;
   comparing category sales volume and category elasticity for each of the plurality of product categories; and
   generating a category role analysis for each of the plurality of product categories utilizing the comparison of the category elasticity and the category sales volume.

3. The method as recited in claim 1, wherein the sales volume is at least one of an average sales volume, a normalized volume, and a max volume modifier for each product of the plurality of products over a given timeframe.

4. The method as recited in claim 1, further comprising:
generating a relative elasticity for each product using the received elasticity values; and
generating a relative volume for each product using the sales volume.

5. The method as recited in claim 4, wherein the role analysis for each product includes classifying each product into one of a product role, and wherein the product roles include assortment completers, niche products, image items and profit drivers.

6. The method as recited in claim 5, wherein the assortment completer role is populated with products which have high relative elasticity and low relative volume, and wherein the niche product role is populated with products which have low relative elasticity and low relative volume, and wherein the image item role is populated with products which have high relative elasticity and high relative volume, and wherein the profit driver role is populated with products which have low relative elasticity and high relative volume.

7. The method as recited in claim 4, wherein the generating the role analysis for each product includes plotting the plurality of products on a graph of relative elasticity along one axis and relative volume on another axis.

8. The method as recited in claim 4, wherein the image value is generated by combining at least one of relative elasticity, normalized elasticity, maximum elasticity and average elasticity with at least one of relative volume, normalized volume, maximum volume and average volume.

9. The method as recited in claim 8, wherein the image value is generated by an equation:

$$imagevalue = a_1 \times \frac{E_n}{Ave(E_n)} + a_2 \times \frac{V_n}{Ave(V_n)};$$

where:
$E_n$=elasticity for product n;
$V_n$=volume of product n;
$Ave(E_n)$=average elasticity of all products within the category of product n;
$Ave(V_n)$=average volume of all products within the category of product n; and
$a_1$ and $a_2$=constants greater than zero.

10. The method as recited in claim 1, further comprising:
receiving a list of client key value items; and
comparing the client key value items to the identified at least one key value item.

11. The method as recited in claim 1, further comprising:
analyzing data by a processor and determining demand coefficients including the elasticity values from the analyzed data, wherein the analyzing comprises:
reducing a processing time of the processor performing the analyzing by aggregating products within the data and processing the aggregated products as a single product.

12. The method as recited in claim 1, wherein controlling processing time of the processor generating the markdown plan further comprises:
selectively excluding cross elasticity models to produce the demand coefficients with the lesser degree of accuracy based on the quantity of products being processed to reduce the processing requirements.

13. A roles analysis system for analyzing the role of a product, useful in conjunction with a pricing optimization system, the roles analysis system comprising:
a volume analyzer configured to receive volume data for a plurality of products, wherein the volume data is sales volume for each product of the plurality of products over a given timeframe, and further wherein each product of the plurality of products is assigned to one of a plurality of product categories;
an elasticity analyzer, including a processor, configured to receive elasticity values for the plurality of products;
a plotting engine, including a processor, configured to compare the elasticity value and the volume data for each product of the plurality of products, and wherein the plotting engine is further configured to generate a role analysis for each product utilizing the comparison of the elasticity value and the volume data, wherein the generating a role analysis includes calculating an image value for each product by applying at least one constant value to a combination of the elasticity value for said product divided by an average elasticity value for the product category corresponding to said product, and the volume of the product divided by an average volume for the product category corresponding to said product, and identifying at least one key value item of the plurality of products based upon the image value; and
a markdown plan tuner, including a processor, configured to generate a markdown plan including a set of prices, promotions and schedules based on the image values and demand coefficients, wherein generating the markdown plan includes:
monitoring processing of the processor of the markdown plan tuner to detect increased processing requirements; and
controlling processing time of the processor of the markdown plan tuner in response to detection of increased processing requirements by selectively adjusting performance of operations to produce the demand coefficients with a lesser degree of accuracy based on a quantity of products being processed to reduce the processing requirements, wherein the increased processing requirements generate the demand coefficients with more accuracy than the reduced processing requirements.

14. The roles analysis system recited in claim 13, wherein the volume analyzer is further configured to determine category sales volume for each of the plurality of product categories, and wherein the elasticity analyzer is further configured to determine category elasticity for each of the plurality of product categories, and wherein the plotting engine is further configured to compare category sales volume and category elasticity for each of the plurality of product categories, and wherein the plotting engine is further configured to generate a category role analysis for each of the plurality of product categories utilizing the comparison of the category elasticity and the category sales volume.

15. The roles analysis system recited in claim 13, wherein the sales volume is at least one of an average sales volume, a normalized volume, and a max volume modifier for each product of the plurality of products over a given timeframe.

16. The roles analysis system recited in claim 13, wherein the elasticity analyzer is further configured to generate a relative elasticity for each product using the received elasticity values, and wherein the volume analyzer is further configured to generate a relative volume for each product using the sales volume.

17. The roles analysis system recited in claim 16, wherein the role analysis for each product includes classifying each product into one of a product role, and wherein the product roles include assortment completers, niche products, image items and profit drivers.

18. The roles analysis system recited in claim 17, wherein the assortment completer role is populated with products which have high relative elasticity and low relative volume, and wherein the niche product role is populated with products which have low relative elasticity and low relative volume, and wherein the image item role is populated with products which have high relative elasticity and high relative volume, and wherein the profit driver role is populated with products which have low relative elasticity and high relative volume.

19. The roles analysis system recited in claim 16, wherein the generating the role analysis for each product includes plotting the plurality of products on a graph of relative elasticity along one axis and relative volume on another axis.

20. The roles analysis system recited in claim 16, wherein the image value is generated by combining at least one of relative elasticity, normalized elasticity, maximum elasticity and average elasticity with at least one of relative volume, normalized volume, maximum volume and average volume.

21. The roles analysis system recited in claim 20, wherein the image value is generated by an equation:

$$imagevalue = a_1 \times \frac{E_n}{Ave(E_n)} + a_2 \times \frac{V_n}{Ave(V_n)};$$

where:
$E_n$=elasticity for product n;
$V_n$=volume of product n;
$Ave(E_n)$=average elasticity of all products within the category of product n;
$Ave(V_n)$=average volume of all products within the category of product n; and
$a_1$ and $a_2$=constants greater than zero.

22. The roles analysis system recited in claim 13, further comprising a key value item plotter configured to receive a list of client key value items, and compare the client key value items to the identified at least one key value item.

23. A computer storage product for analyzing product roles comprising:
a non-transitory computer readable medium having computer readable program code embodied therewith, the computer readable program code comprising computer readable program code when executed by a processor configured to:
receive volume data for a plurality of products, wherein the volume data is sales volume for each product of the plurality of products over a given timeframe, and further wherein each product of the plurality of products is assigned to one of a plurality of product categories;
receive elasticity values for the plurality of products;
compare the elasticity value and the volume data for each product;
generate a role analysis for each product of the plurality of products utilizing the comparison of the elasticity value and the volume data, wherein the generating a role analysis includes calculating an image value for each product by applying at least one constant value to a combination of the elasticity value for said product divided by an average elasticity value for the product category corresponding to said product, and the volume of the product divided by an average volume for the product category corresponding to said product, and identifying at least one key value item of the plurality of products based upon the image value; and
generate a markdown plan including a set of prices, promotions and schedules based on the image values and demand coefficients, wherein generating the markdown plan includes:
monitoring processing of the processor generating the markdown plan to detect increased processing requirements; and
controlling processing time of the processor generating the markdown plan in response to detection of increased processing requirements by selectively adjusting performance of operations to produce the demand coefficients with a lesser degree of accuracy based on a quantity of products being processed to reduce the processing requirements wherein the increased processing requirements generate the demand coefficients with more accuracy than the reduced processing requirements.

24. The computer storage product recited in claim 23, wherein the computer readable program code further comprises computer readable program code configured to:
determine category sales volume for each of the plurality of product categories;
determine category elasticity for each of the plurality of product categories;
compare category sales volume and category elasticity for each of the plurality of product categories; and
generate a category role analysis for each of the plurality of product categories utilizing the comparison of the category elasticity and the category sales volume.

25. The computer storage product recited in claim 23, wherein the sales volume is at least one of an average sales volume, a normalized volume, and a max volume modifier for each product of the plurality of products over a given timeframe.

26. The computer storage product recited in claim 23, wherein the computer readable program code further comprises computer readable program code configured to:
generate a relative elasticity for each product using the received elasticity values; and
generate a relative volume for each product using the sales volume.

27. The computer storage product recited in claim 26, wherein the role analysis for each product includes classifying each product into one of a product role, and wherein the product roles include assortment completers, niche products, image items and profit drivers.

28. The computer storage product recited in claim 27, wherein the assortment completer role is populated with products which have high relative elasticity and low relative volume, and wherein the niche product role is populated with products which have low relative elasticity and low relative volume, and wherein the image item role is populated with products which have high relative elasticity and high relative volume, and wherein the profit driver role is populated with products which have low relative elasticity and high relative volume.

29. The computer storage product recited in claim 26, wherein the generating the role analysis for each product includes plotting the plurality of products on a graph of relative elasticity along one axis and relative volume on another axis.

30. The computer storage product recited in claim 26, wherein the image value is generated by combining at least one of relative elasticity, normalized elasticity, maximum elasticity and average elasticity with at least one of relative volume, normalized volume, maximum volume and average volume.

31. The computer storage product recited in claim 30, wherein the image value is generated by an equation:

$$imagevalue = a_1 \times \frac{E_n}{Ave(E_n)} + a_2 \times \frac{V_n}{Ave(V_n)};$$

where:
$E_n$=elasticity for product n;
$V_n$=volume of product n;
$Ave(E_n)$=average elasticity of all products within the category of product n;
$Ave(V_n)$=average volume of all products within the category of product n; and
$a_1$ and $a_2$=constants greater than zero.

32. The computer storage product recited in claim 23, wherein the computer readable program code further comprises computer readable program code configured to:
receive a list of client key value items; and
compare the client key value items to the identified at least one key value item.

* * * * *